US012704760B2

(12) United States Patent
Kim et al.

(10) Patent No.: US 12,704,760 B2
(45) Date of Patent: Aug. 11, 2026

(54) CAMERA MODULE

(71) Applicant: LG INNOTEK CO., LTD., Seoul (KR)

(72) Inventors: Hyun Soo Kim, Seoul (KR); Han Ul Kwon, Seoul (KR); Yun Ho Noh, Seoul (KR); Jeong Gi You, Seoul (KR); Kap Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 654 days.

(21) Appl. No.: 17/759,813

(22) PCT Filed: Jan. 27, 2021

(86) PCT No.: PCT/KR2021/001102
§ 371 (c)(1),
(2) Date: Jul. 29, 2022

(87) PCT Pub. No.: WO2021/153997
PCT Pub. Date: Aug. 5, 2021

(65) Prior Publication Data

US 2023/0146369 A1 May 11, 2023

(30) Foreign Application Priority Data

Jan. 29, 2020 (KR) ........................ 10-2020-0010525
Jan. 29, 2020 (KR) ........................ 10-2020-0010531

(51) Int. Cl.
*G02F 1/29* (2006.01)
*G03B 17/12* (2021.01)
(Continued)

(52) U.S. Cl.
CPC ............... *G02F 1/29* (2013.01); *G03B 17/12* (2013.01); *G03B 5/00* (2013.01); *G03B 13/36* (2013.01);
(Continued)

(58) Field of Classification Search
CPC .. G02F 1/29; G03B 17/12; G03B 5/00; G03B 13/36; G03B 30/00; G03B 2205/0007;
(Continued)

(56) References Cited

U.S. PATENT DOCUMENTS 10,437,133 B2 * 10/2019 Ha ...................... H04N 23/682
2009/0190232 A1 7/2009 Craen et al.
(Continued)

FOREIGN PATENT DOCUMENTS

JP 2013-138223 A 7/2013
JP 5990655 B2 8/2016
(Continued)

OTHER PUBLICATIONS

International Search Report dated Apr. 29, 2021 in International Application No. PCT/KR2021/001102.
(Continued)

*Primary Examiner* — William R Alexander
*Assistant Examiner* — Alaina Marie Swanson
(74) *Attorney, Agent, or Firm* — SALIWANCHIK, LLOYD & EISENSCHENK

(57) ABSTRACT

An embodiment comprises a substrate, a lens barrel arranged on the substrate, and a lens unit arranged in the lens barrel, wherein: the lens unit includes a liquid lens unit; the liquid lens unit includes a holder, a liquid lens which is arranged in the holder and which includes an electrode, and a terminal unit arranged in the holder and electrically connected to the liquid lens; the terminal unit includes a first part coupled to the electrode of the liquid lens, a second part arranged in the holder, and a third part for connecting the first part and the second part; and the width of the third part is smaller than the width of the first part.

19 Claims, 49 Drawing Sheets

(51) Int. Cl.

| | |
|---|---|
| *G03B 5/00* | (2021.01) |
| *G03B 13/36* | (2021.01) |
| *G03B 30/00* | (2021.01) |
| *H04N 23/54* | (2023.01) |

(52) U.S. Cl.
CPC ...... *G03B 30/00* (2021.01); *G03B 2205/0007* (2013.01); *H04N 23/54* (2023.01)

(58) Field of Classification Search
CPC .......... G03B 3/10; H04N 23/54; H04N 23/55; H04N 23/57; G02B 3/12
USPC .......................................................... 359/315
See application file for complete search history.

(56) References Cited

U.S. PATENT DOCUMENTS

| | | | | |
|---|---|---|---|---|
| 2010/0123814 | A1 | 5/2010 | Tseng et al. | |
| 2017/0315274 | A1* | 11/2017 | Park | G02B 27/646 |
| 2019/0179132 | A1* | 6/2019 | Kang | G02B 26/0875 |

FOREIGN PATENT DOCUMENTS

| | | | | | |
|---|---|---|---|---|---|
| JP | 5996672 | B2 | | 9/2016 | |
| KR | 10-2012-0079029 | A | | 7/2012 | |
| KR | 10-2018-0088237 | A | | 8/2018 | |
| KR | 10-2018-0110796 | A | | 10/2018 | |
| KR | 10-2019-0089600 | A | | 7/2019 | |
| KR | 20190089600 | A | * | 7/2019 | |
| KR | 10-2019-0091719 | A | | 8/2019 | |
| KR | 10-2019-0127442 | A | | 11/2019 | |
| WO | WO-2018182348 | A1 | * | 10/2018 | G02B 26/005 |

OTHER PUBLICATIONS

Office Action dated Jan. 22, 2025 in Korean Application No. 10-2020-0010525.

Office Action dated Jan. 22, 2025 in Korean Application No. 10-2020-0010531.

* cited by examiner

CAMERA MODULE

CROSS-REFERENCE TO RELATED APPLICATIONS

This application is the U.S. national stage application of International Patent Application No. PCT/KR2021/001102, filed Jan. 27, 2021, which claims the benefit under 35 U.S.C. § 119 of Korean Application Nos. 10-2020-0010531, filed Jan. 29, 2020; and 10-2020-0010525, filed Jan. 29, 2020; the disclosures of each of which are incorporated herein by reference in their entirety.

TECHNICAL FIELD

Embodiments relate to a camera module and an optical device including the same.

BACKGROUND ART

Portable devices require camera modules or optical devices that have high resolution, are small, and have various photographing functions. Examples of the various photographing functions may include at least one of an optical zoom-in/zoom-out function, an auto-focusing (AF) function, or a hand-tremor compensation or optical image stabilization (OIS) function.

In order to implement the various photographing functions, a camera module or an optical device may include a liquid lens unit. The liquid lens unit may perform auto-focusing and hand-tremor compensation functions by electrically adjusting the curvature of an interface between two types of liquids.

DISCLOSURE

Technical Problem

Embodiments provide a camera module capable of improving the reliability of a conductive connection between a terminal unit and an electrode of a liquid lens and an optical device including the same.

In addition, embodiments provide a camera module capable of improving the reliability of a conductive connection between a terminal unit and an electrode of a liquid lens and improving the reliability of a conductive connection between the terminal unit and a conductive portion of a lens holder and an optical device including the same.

Technical Solution

A camera module according to an embodiment includes a substrate, a lens barrel disposed on the substrate, and a lens unit disposed on the lens barrel. The lens unit includes a liquid lens unit. The liquid lens unit includes a holder, a liquid lens disposed in the holder and including an electrode, and a terminal unit disposed on the holder and conductively connected to the liquid lens. The terminal unit includes a first portion coupled to the electrode of the liquid lens, a second portion disposed on the holder, and a third portion interconnecting the first portion and the second portion. The third portion has a width smaller than the width of the first portion.

The camera module may include a conductive adhesive member disposed between the first portion and the electrode of the liquid lens.

The third portion of the terminal unit may include at least one curved portion or bent portion.

The third portion of the terminal unit may include portions having different widths from each other.

One end of the third portion, connected to the first portion of the terminal unit, may have a width smaller than the width of the other end of the third portion, connected to the second portion of the terminal unit.

The third portion of the terminal unit may include a first region connected to the first portion, a second region connected to the second portion, and a third region interconnecting the first region and the second region. Each of the first region and the second region may include a bent or curved portion. The second region may have a linear shape.

The third portion may include a portion increasing in width and a portion decreasing in width in a direction from the first region toward the second region. The width of the third portion may be 1.25 to 1.5 times the thickness of the third portion. The width of the third portion may be less than the length of the third portion from one end of the third portion, connected to the first portion, to the other end of the third portion, connected to the second portion.

The camera module may include a lens holder disposed on the substrate and coupled to the lens barrel. The camera module may include a sensor base disposed between the lens holder and the substrate.

One end of the second portion of the terminal unit may protrude from the side surface of the holder. The camera module may include a conductive member disposed on the lens holder, and one end of the second portion of the terminal unit may be conductively connected to the conductive member.

A camera module according to another embodiment may include a substrate, a lens barrel disposed on the substrate, and a lens unit disposed on the lens barrel. The lens unit may include a liquid lens unit. The liquid lens unit may include a holder, a liquid lens disposed in the holder and including an electrode, and a terminal unit disposed on the holder and conductively connected to the liquid lens. The terminal unit may include a first portion coupled to the electrode of the liquid lens, a second portion disposed on the holder, and a third portion interconnecting the first portion and the second portion. The third portion may include at least one curved portion or bent portion.

A camera module according to still another embodiment may include a substrate, a lens holder disposed on the substrate, a lens barrel coupled to the lens holder, a holder disposed on the lens barrel, a liquid lens disposed in the holder and including an electrode, a first conductive portion disposed on the lens holder, a first terminal unit disposed on the holder and coupled to the first conductive portion, and a second terminal unit connecting the first terminal unit to the electrode of the liquid lens. The second terminal unit may include a first portion coupled to the electrode of the liquid lens, a second portion coupled to the first terminal unit, and a third portion interconnecting the first portion and the second portion. The third portion may include at least one curved portion or bent portion.

The camera module according to the still other embodiment may include a first conductive adhesive member disposed between the first portion of the second terminal unit and the electrode of the liquid lens. The second portion of the second terminal unit may include a hole, and may include a second conductive adhesive member disposed in the hole to couple the first terminal unit to the second terminal unit. The hole may include an opening, the opening in the hole may be open toward a second side surface of the second portion of the second terminal unit, which is located opposite a first side surface thereof, and the first side surface may be one side surface of the second portion that is connected to the third portion of the second terminal unit. The first terminal unit may include a first portion coupled to the second terminal unit and a second portion protruding from the side surface of the holder.

The camera module according to the still other embodiment may include a third conductive adhesive member disposed between the second portion of the first terminal unit and the first conductive portion. The second portion of the first terminal unit may have a recess formed in the side surface thereof, and the second conductive adhesive member may be in contact with the recess.

The camera module according to the still other embodiment may include a second conductive portion spaced apart from the first conductive portion and disposed on the lens holder and a thermistor including an electrode coupled to the second conductive portion. At least one recess may be formed in at least one of a first side surface and a second side surface of the second conductive portion, which are located opposite each other.

The camera module according to the still other embodiment may include a cover including an upper plate, a side plate, and a bore formed in the upper plate. The lens holder and the sensor base may be disposed in the cover. The upper plate of the cover may include a first surface, a second surface, and a first inclined portion interconnecting the first surface and the second surface. The lens barrel may include a second inclined portion formed at an upper portion thereof so as to correspond to the first inclined portion.

Advantageous Effects

According to the embodiments, since a terminal unit has a leg structure formed such that a portion thereof has a smaller width than another portion thereof, it is possible to inhibit a conductive connection between the terminal unit and an electrode of a liquid lens from becoming defective due to expansion or contraction of a conductive adhesive member, thus ensuring the reliability of the conductive connection between the terminal unit and the electrode of the liquid lens.

In addition, according to the embodiments, it is possible to improve the reliability of the conductive connection between the terminal unit and the electrode of the liquid lens and the reliability of a conductive connection between the terminal unit and a conductive portion of a lens holder.

DESCRIPTION OF DRAWINGS

FIG. 3 is a cross-sectional view taken along line AB in the camera module in FIG. 1.

FIG. 9 is a perspective view of a second terminal unit.

FIG. 10B illustrates a terminal unit according to still another embodiment.

FIG. 10C illustrates a terminal unit according to still another embodiment.

FIG. 10D illustrates a terminal unit according to still another embodiment.

FIG. 2513 illustrates a first conductive adhesive member for coupling the first terminal unit and the second terminal unit in FIG. 25A to each other.

BEST MODE

Figure 1:
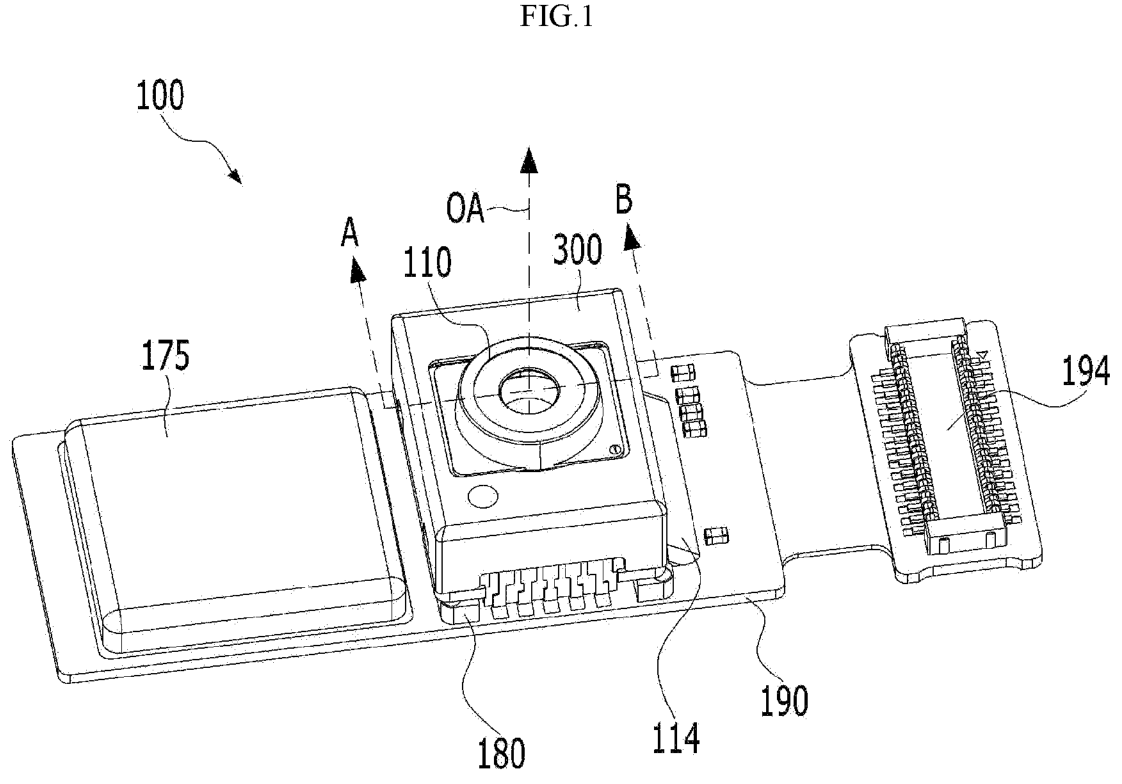
FIG. 1 is a perspective view of a camera module according to an embodiment.

Hereinafter, exemplary embodiments of the present disclosure will be described in detail with reference to the accompanying drawings.

The technical spirit of the disclosure is not limited to the embodiments to be described, and may be implemented in various other forms, and one or more of the components may be selectively combined and substituted for use without exceeding the scope of the technical spirit of the disclosure.

In addition, terms (including technical and scientific terms) used in the embodiments of the disclosure, unless specifically defined and described explicitly, are to be interpreted as having meanings that may be generally understood by those having ordinary skill in the art to which the disclosure pertains, and meanings of terms that are commonly used, such as terms defined in a dictionary, should be interpreted in consideration of the context of the relevant technology.

Further, the terms used in the embodiments of the disclosure are for explaining the embodiments and are not intended to limit the disclosure. In this specification, the singular forms may also include plural forms unless otherwise specifically stated in a phrase, and in the case in which "at least one (or one or more) of A, B, or C" is stated, it may include one or more of all possible combinations of A, B, and C.

In addition, in describing the components of the embodiments of the disclosure, terms such as "first", "second", "A", "B", "(a)", and "(b)" can be used. Such terms are only for distinguishing one component from another component, and do not determine the nature, sequence, or procedure of the corresponding constituent elements.

In addition, when it is described that a component is "connected", "coupled" or "joined" to another component, the description may include not only being directly "connected", "coupled" or "joined" to the other component but also being "connected", "coupled" or "joined" by another component between the component and the other component. In addition, in the case of being described as being formed or disposed "above (on)" or "below (under)" another component, the description includes not only the case where the two components are in direct contact with each other, but also the case where one or more other components are formed or disposed between the two components. In addition, when expressed as "above (on)" or "below (under)", it may refer to a downward direction as well as an upward direction with respect to one element.

Hereinafter, a lens moving apparatus, a camera module, and an optical device including the same according to embodiments will be described with reference to the accompanying drawings. For convenience of description, the embodiments will be described using the Cartesian coordinate system (x,y,z), but the embodiments are not limited thereto, and may be described using other coordinate systems. In the respective drawings, the x-axis and the y-axis may be directions perpendicular to the z-axis, which is an optical-axis direction, the z-axis direction, which is the optical-axis direction, may be referred to as a "first direction", the x-axis direction may be referred to as a "second direction", and the y-axis direction may be referred to as a "third direction". For example, the optical-axis direction may be a direction parallel to an optical axis OA.

The camera module according to the embodiment may perform an "auto-focusing function". Here, the auto-focusing function is a function of automatically focusing an image of a subject on the surface of an image sensor.

In addition, the camera module according to the embodiment may perform a "hand-tremor compensation function". Here, the hand-tremor compensation function is a function of inhibiting the contour of a captured still image from being blurred due to vibration caused by shaking of a hand of a user when capturing the still image.

In addition, a "terminal" may alternatively be referred to as a "pad", an "electrode", a "conductive layer" or a "bonding portion".

Figure 2:
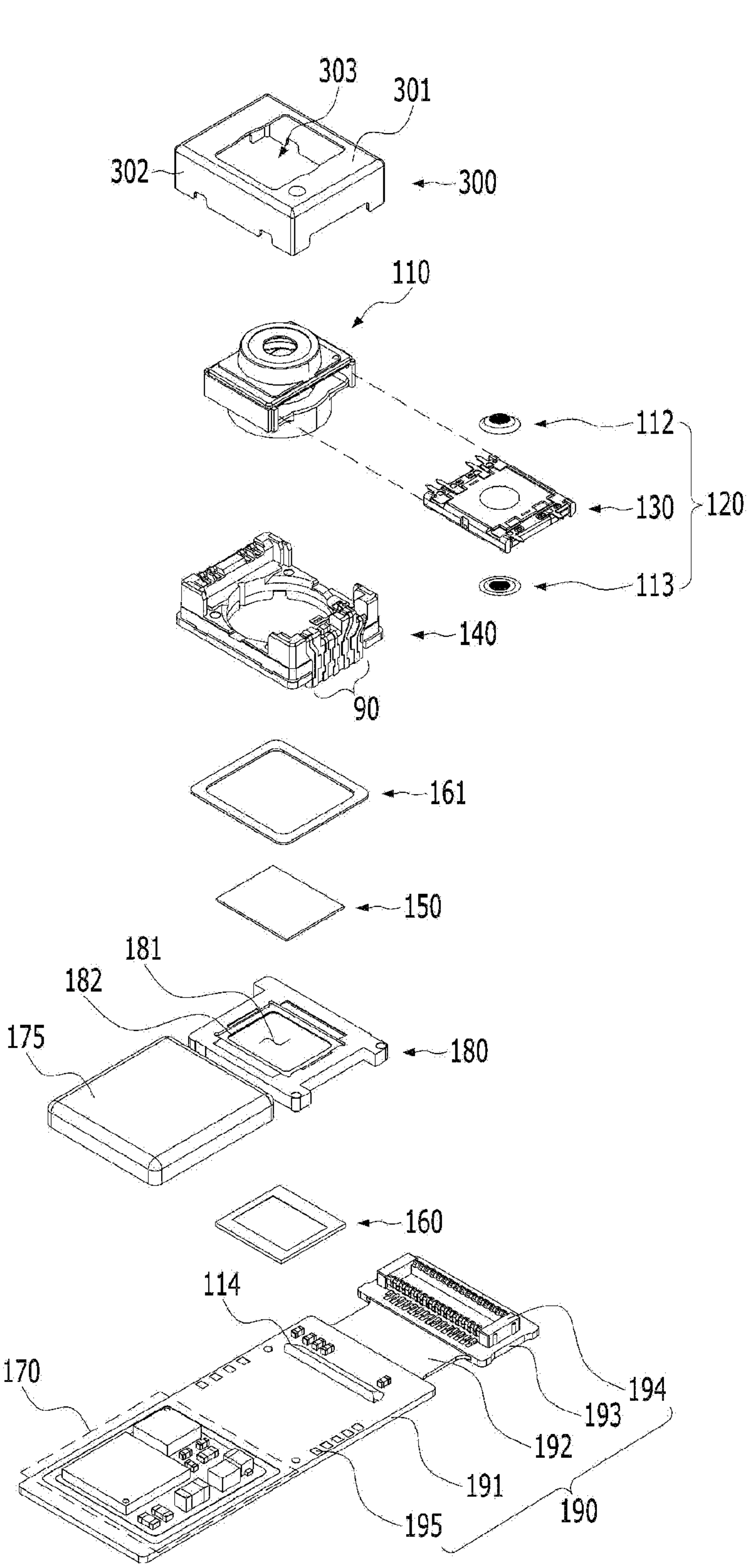
FIG. 2 is an exploded view of the camera module in FIG. 1.
Figure 3:
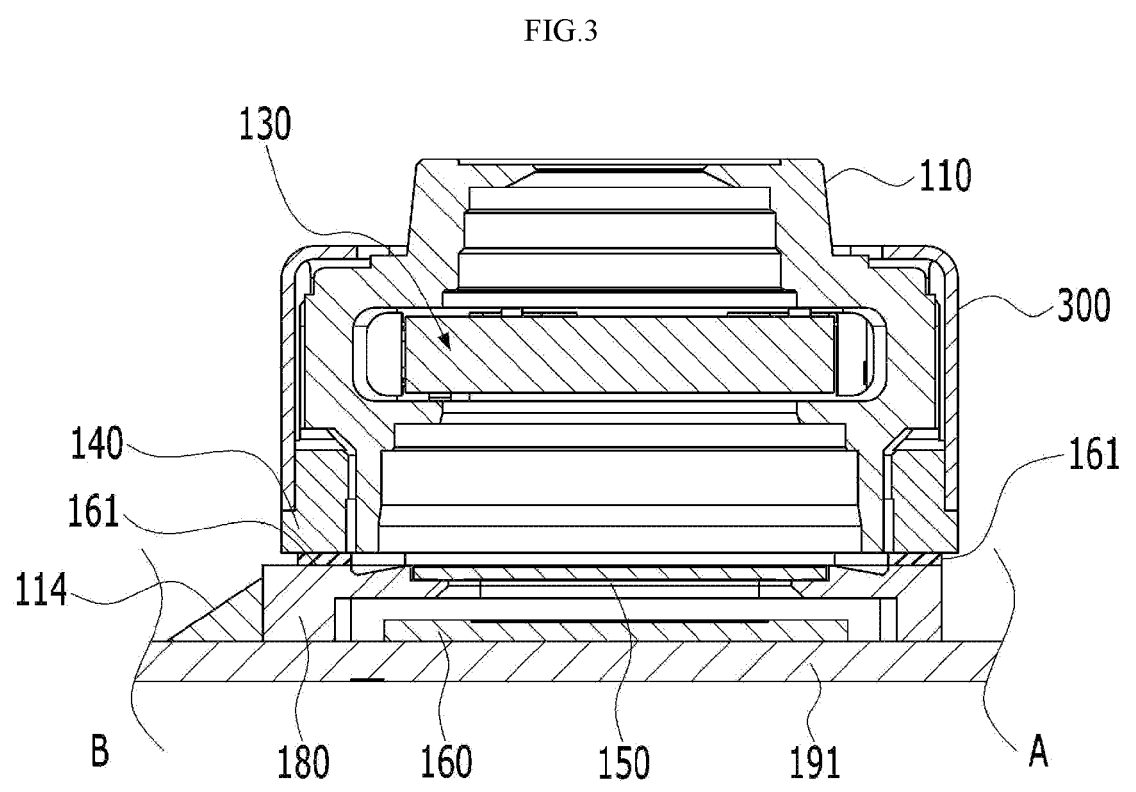

FIG. 1 is a perspective view of a camera module 100 according to an embodiment, FIG. 2 is an exploded view of the camera module 100 in FIG. 1, and FIG. 3 is a cross-sectional view taken along line AB in the camera module 100 in FIG. 1.

Referring to FIGS. 1 to 3, the camera module 100 may include a lens barrel 110 and a lens assembly 120 disposed or mounted on the lens barrel 110. In addition, the camera module 100 may include an image sensor 160 disposed under the lens barrel 110.

The camera module 100 may include a thermistor 45.

The camera module 100 may further include a lens holder 140 for accommodating the lens barrel 110. The lens holder 140 may alternatively be referred to as a "base".

The lens holder 140 may be disposed on a substrate 190, and the lens barrel 110 may be coupled to the lens holder 140.

The camera module 100 may further include a filter 150.

The camera module 100 may further include a sensor base 180 on which the filter 150 is disposed or mounted. The sensor base 180 may alternatively be referred to as a "holder".

The camera module 100 may further include a substrate 190.

In addition, the camera module 100 may further include a circuit element 170 disposed or mounted on the substrate 190.

In addition, the camera module 100 may further include a cover 300.

The substrate 190 may be a printed circuit board (PCB).

The substrate 190 may be disposed under the sensor base 180, and may include a first substrate 191, a second substrate 192 connected to the first substrate 191, a third substrate 193 connected to the second substrate 192, and a connector 194 connected to the third substrate 193.

In an example, the circuit element 170 may be disposed or mounted on the first substrate 191. In addition, the substrate 190 may include at least one terminal 195 disposed or formed on the first substrate 191. In an example, the terminal 195 of the substrate 190 may be provided in a plural number, and the plurality of terminals 195 of the substrate 190 may correspond to, face, or overlap conductive members 90 in the optical-axis direction, and may be conductively connected to the conductive members 9.

The sensor base 180 and the image sensor 160 may be disposed on the first substrate 191. In an example, each of the first substrate 191 and the third substrate 192 may be a rigid printed circuit board, and the second substrate 192 may be a flexible printed circuit board conductively connecting the first substrate 191 to the third substrate 193, but the disclosure is not limited thereto. In another embodiment, at least one of the first to third substrates may be a rigid printed circuit board or a flexible printed circuit board. In still another embodiment, the first to third substrates may be integrated into a single substrate.

The image sensor 160 may be disposed or mounted on the substrate 190. In an example, the image sensor 160 may be disposed or mounted on the upper surface of the first substrate 191, and may be conductively connected to the substrate 190.

The optical axis of the image sensor 160 and the optical axis of the lens assembly 120 may be in alignment with each other. The image sensor 160 may include an effective image area (or an active area), may convert light radiated onto the effective image area (or the active area) into an electrical signal, and may output the converted electrical signal.

The circuit element 170 may be conductively connected to the first substrate 191, and may constitute a controller for controlling the image sensor 160 and a first lens unit 130. In an example, the circuit element 170 may include at least one of at least one capacitor, a memory, a controller, a sensor, or an integrated circuit (IC).

The camera module 100 may further include a cover 175, which is disposed on the first substrate 191 and covers the circuit element 170 in order to protect the circuit element 170.

The sensor base 180 may be disposed on the substrate 190. In an example, the sensor base 180 may be disposed on the upper surface of the first substrate 191, and may be attached or coupled to the upper surface of the first substrate 191. In an example, the sensor base 180 may be disposed between the substrate 190 and the lens holder 140.

The camera module 100 may be disposed between the sensor base 180 and the substrate 190, and may include an adhesive (not shown) for attaching or fixing the sensor base 180 to the upper surface of the substrate 190.

The sensor base 180 may surround the image sensor 160 to protect the image sensor 160 from external foreign substances or impacts, and may include a bore 181 formed therein to expose the effective image area (or the active area) of the image sensor 160. In an example, the bore 181 may be a through-hole formed through the sensor base 180 in the direction of the optical axis OA.

In addition, the sensor base 180 may be provided on the upper surface thereof with a seating portion 182 on which the filter 150 is seated. The seating portion 182 may have a height difference in the optical-axis direction with respect to the upper surface of the sensor base 180, and may be formed so as to surround the bore 181. In an example, the seating portion 182 may take the form of a recess depressed into the upper surface of the sensor base 180, but the disclosure is not limited thereto. In another embodiment, the seating portion may take the form of a protruding portion protruding from the upper surface of the sensor base 180.

A portion of the lower surface of the sensor base 180 may be depressed so as to define a space or a seating recess (not shown) in which to dispose the image sensor 160.

In addition, the sensor base 180 may be disposed on the first substrate 191, and may be spaced apart from the circuit element 170 so as not to overlap the circuit element 170 in the optical-axis direction. In another embodiment, the sensor base 180 may be omitted.

The lens moving apparatus 100 may further include a support portion 114 disposed on the substrate 190 to support one side surface of the sensor base 180. The support portion 114 may be disposed on the first substrate 191, and may be in contact with, attached to, or fixed to one side surface of the sensor base 180 and the upper surface of the first substrate 191.

The filter 150 may be disposed on the sensor base 180. In an example, the filter 150 may be disposed on the seating portion 182 in the sensor base 180, and may be located above the effective image area (or the active area) of the image sensor 160.

The filter 150 may be disposed between the lens assembly 120 and the image sensor 160, and may filter light within a specific wavelength range, among the light that has passed through the lens assembly 120. The filter 150 may be, for example, an infrared (IR) cut filter for blocking infrared radiation or an ultraviolet (UV) cut filter for blocking ultraviolet radiation, but the embodiments are not limited thereto. In an example, the filter 150 may include at least one of an infrared cut filter or an ultraviolet cut filter.

The lens holder 140 may be disposed on the substrate 190. In an example, the lens holder 140 may be disposed on the sensor base 180. In an example, the lower surface of the lens holder 140 may be coupled to the upper surface of the sensor base 180. The lens holder 140 may be disposed in the cover 300. The lens holder 140 may be formed of an insulating material.

The lens holder 140 may be disposed between the lens assembly 120 and the substrate 190. In an example, the lens holder 140 may be disposed between the first lens unit 130 and the first substrate 191.

The conductive members 90 may be disposed on the lens holder 140. Drive signals (e.g. drive voltages) provided from the substrate 190 may be transmitted to the first lens unit 130 through the conductive members 90, and a signal related to detection of temperature, which is output from the thermistor 45, may be transmitted to the substrate 190 through the conductive members 90.

An adhesive 161 may be disposed between the sensor base 180 and the lens holder 140, and the sensor base 180 and the lens holder 140 may be coupled to each other by the adhesive 161.

In an example, the adhesive 161 may be disposed between the tipper surface of the sensor base 180 and the lower surface of the lens holder 140, and the sensor base 180 and the lens holder 140 may be coupled or attached to each other by the adhesive 161. In another example, the adhesive 161 may be disposed between the side surface of the sensor base 180 and the lens holder 140. In an example, the adhesive 161 may seal the gap between the sensor base 180 and the lens holder 140.

In addition to the adhesive 161, the camera module 100 according to the embodiment may further include an adhesive for bonding the lens barrel 110 to the lens holder 140 and an adhesive for bonding a holder 80 of the first lens unit 130 to the lens holder 140.

The lens assembly 120 may be mounted or disposed on the lens barrel 110. The lens assembly 120 may alternatively be referred to as a "lens module". In another embodiment, the lens module may include the lens barrel 110 and the lens assembly 120.

The lens assembly 120 may include the first lens unit 130 including a liquid lens. In an example, the lens assembly 120 may include the first lens unit 130, a second lens unit 112, and a third lens unit 113.

The first lens unit 130 may include an optical unit, and the optical unit may include at least one lens. The optical unit may collect an input light signal reflected from a subject through the at least one lens and may transmit the input light signal to the image sensor 160.

In an example, the first lens unit 130 may include a variable lens. The variable lens may be a variable focus lens. Further, the variable lens may be a lens that is adjustable in focus.

The variable lens may be at least one of a liquid lens, a polymer lens, a liquid crystal lens, a voice coil motor (VCM)-type lens, or a shape memory alloy (SMA)-type lens.

Here, the liquid lens may include a liquid lens including a single type of liquid and a liquid lens including two types of liquids. The focus of the liquid lens including a single type of liquid may be changed by controlling a membrane disposed at a position corresponding to the liquid. For example, the focus of the liquid lens may be changed by pressing the membrane using the electromagnetic force between a magnet and a coil. The liquid lens including two types of liquids may include a conductive liquid and a non-conductive liquid, and may control the interface formed between the conductive liquid and the non-conductive liquid using a voltage applied to the liquid lens.

In addition, the focus of the polymer lens may be changed by controlling a polymer material using a driver such as a piezo actuator.

In addition, the focus of the liquid crystal lens may be changed by controlling a liquid crystal using electromagnetic force.

In addition, the focus of the VCM-type lens may be changed by controlling a solid lens or a lens assembly including a solid lens using the electromagnetic force between a magnet and a coil.

In addition, the focus of the SMA-type lens may be changed by controlling a solid lens or a lens assembly including a solid lens using a shape memory alloy.

In addition, the "optical unit" may include a filter that transmits light within a specific wavelength range. For example, the filter that transmits light within a specific wavelength range may include an IR pass filter. In addition, the optical unit may include an optical plate. In this case, the optical plate may be, for example, a light-transmissive plate.

The controller of the camera module 100 or a controller 830 of an optical device 200A may control the variable lens of the optical unit to shift an input light signal on the image sensor by a predetermined moving distance. The controller may shift the optical path of the input light signal using the variable lens of the optical unit.

In an example, in the lens assembly 120, the first lens unit 130 may alternatively be referred to as a "liquid lens unit", the second lens unit 112 may alternatively be referred to as a "first solid lens unit", and the third lens unit 113 may alternatively be referred to as a "second solid lens unit".

In another embodiment, at least one of the second and third lens units 111 and 112 may be omitted from the lens assembly. In still another embodiment, the lens assembly 120 may include the lens barrel 110 in FIG. 2.

The first lens unit 130 may include a liquid lens 50.

Figure 4:
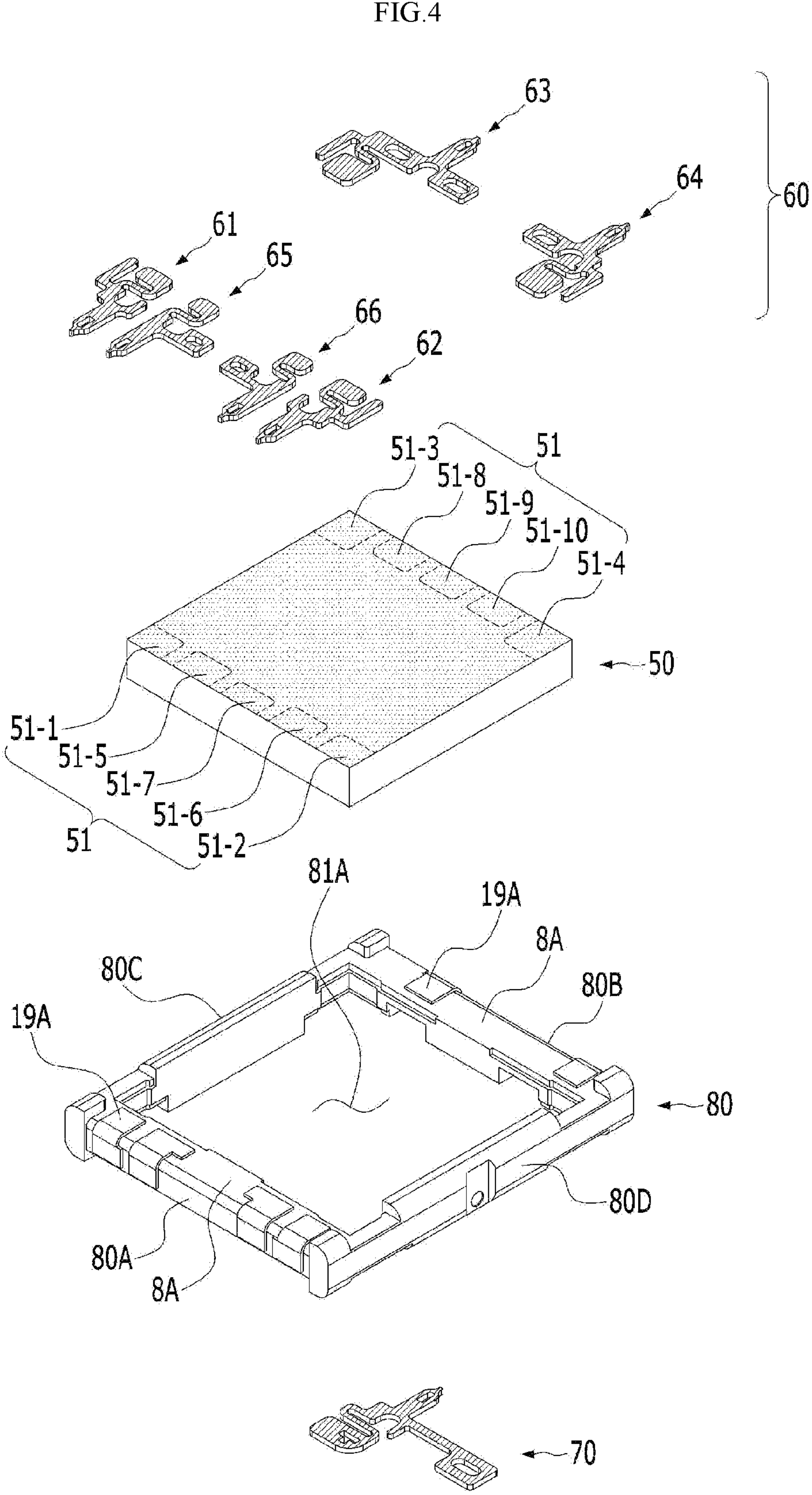
FIG. 4 is an exploded view of a first lens unit.
Figure 5:
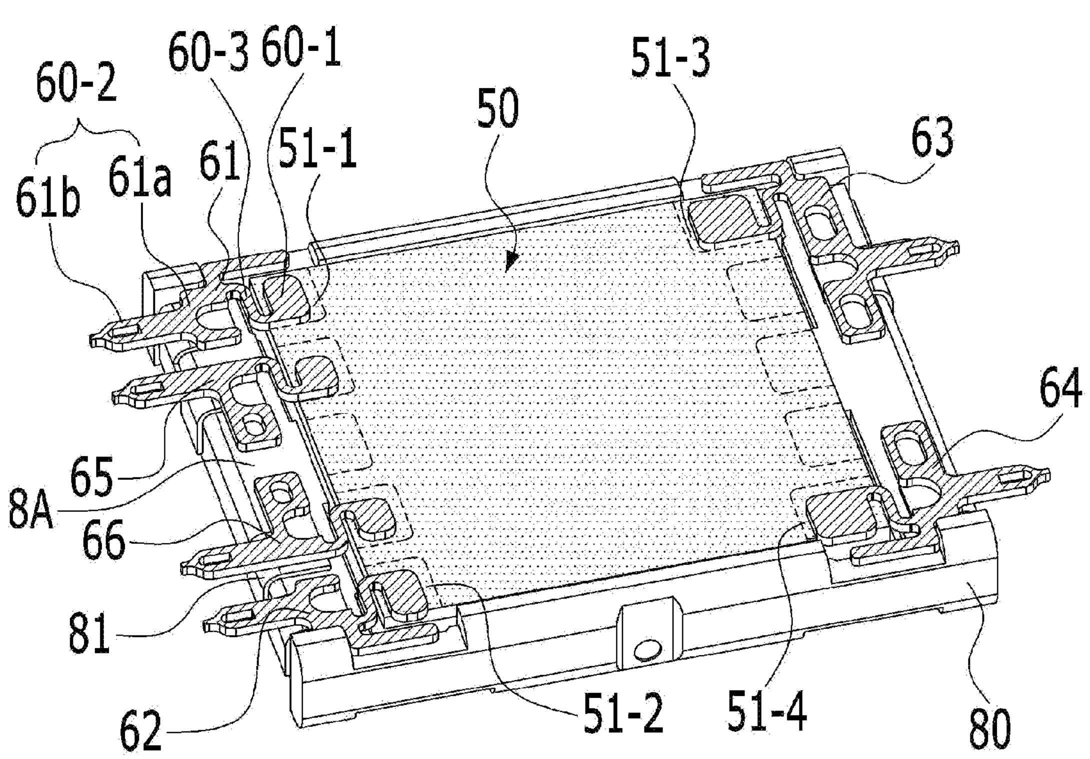
FIG. 5 is a top view of the first lens unit.
Figure 6:
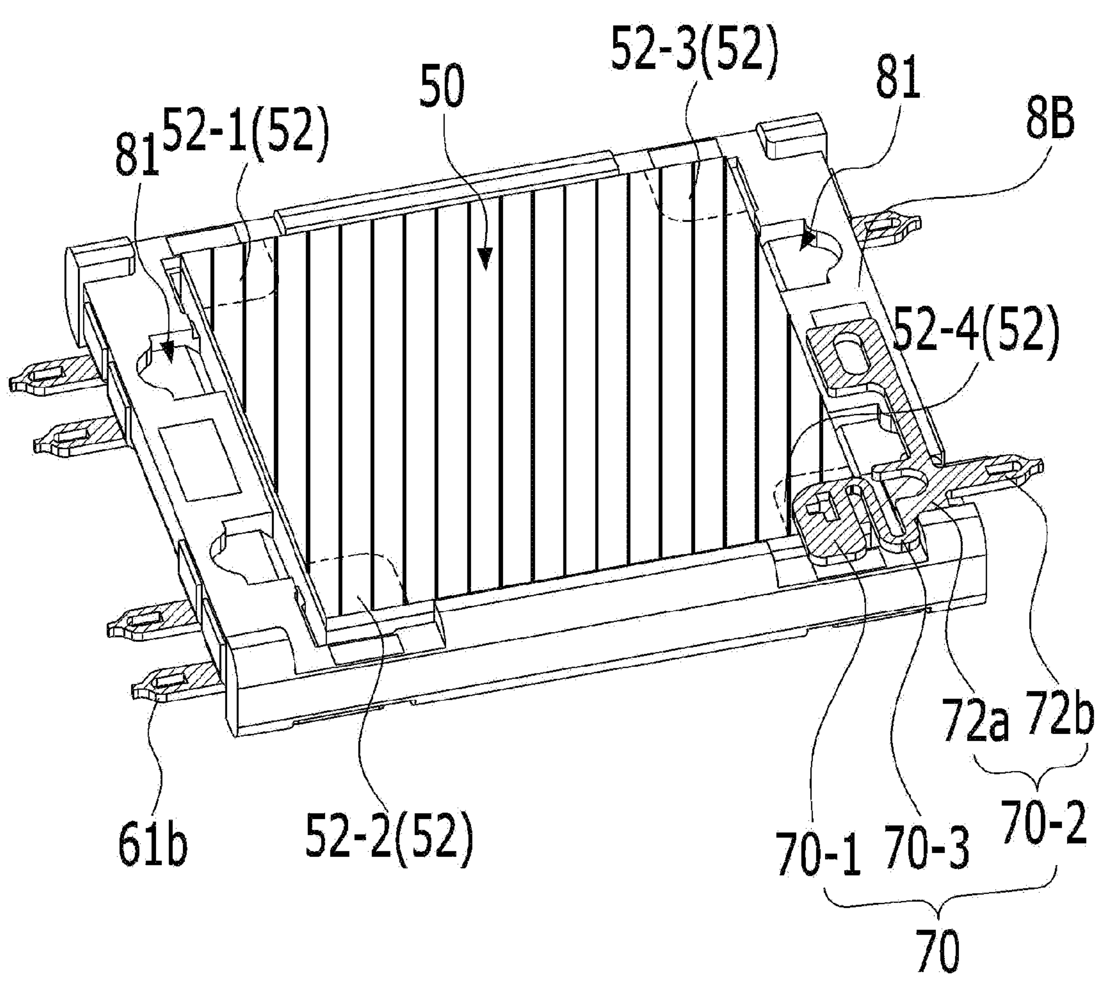
FIG. 6 is a bottom view of the first lens unit.
Figure 7:
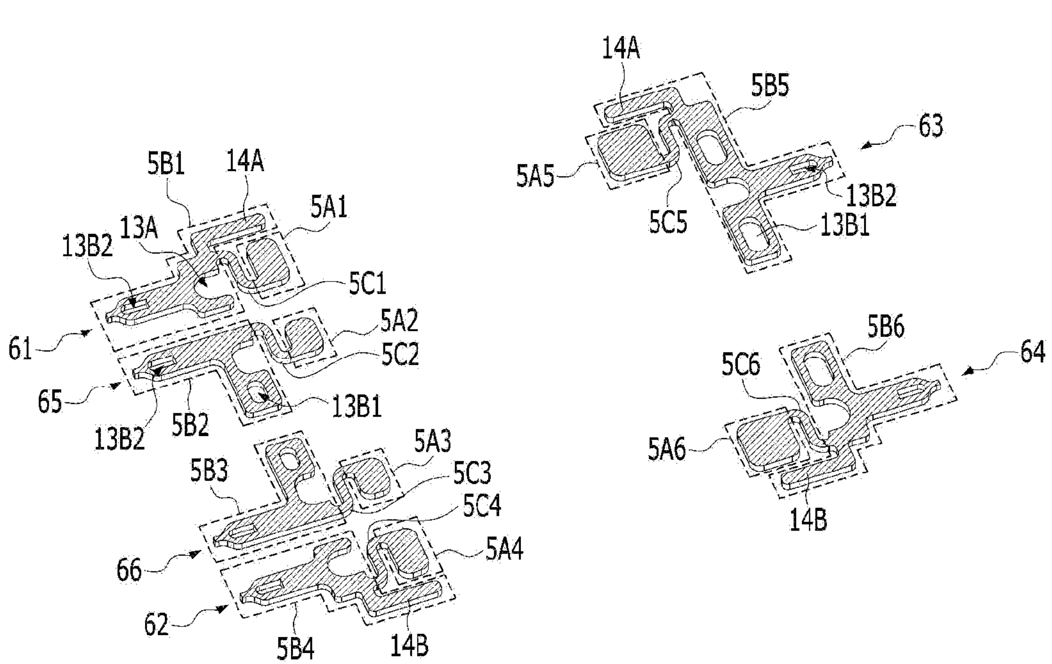
FIG. 7 is a perspective view of a first terminal unit.
Figure 8:
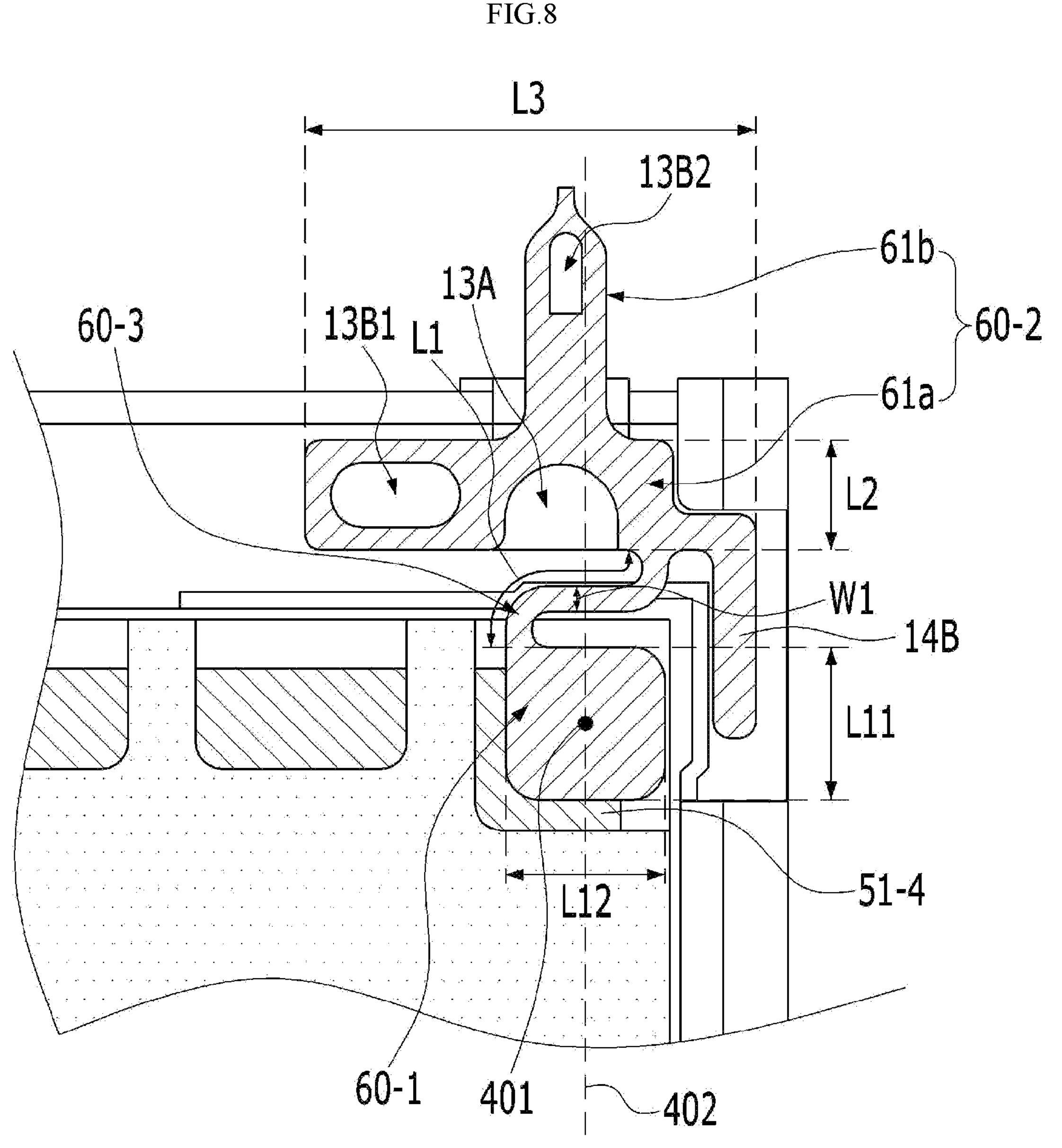
FIG. 8 is an enlarged view of any one terminal of the first terminal unit.
Figure 9:
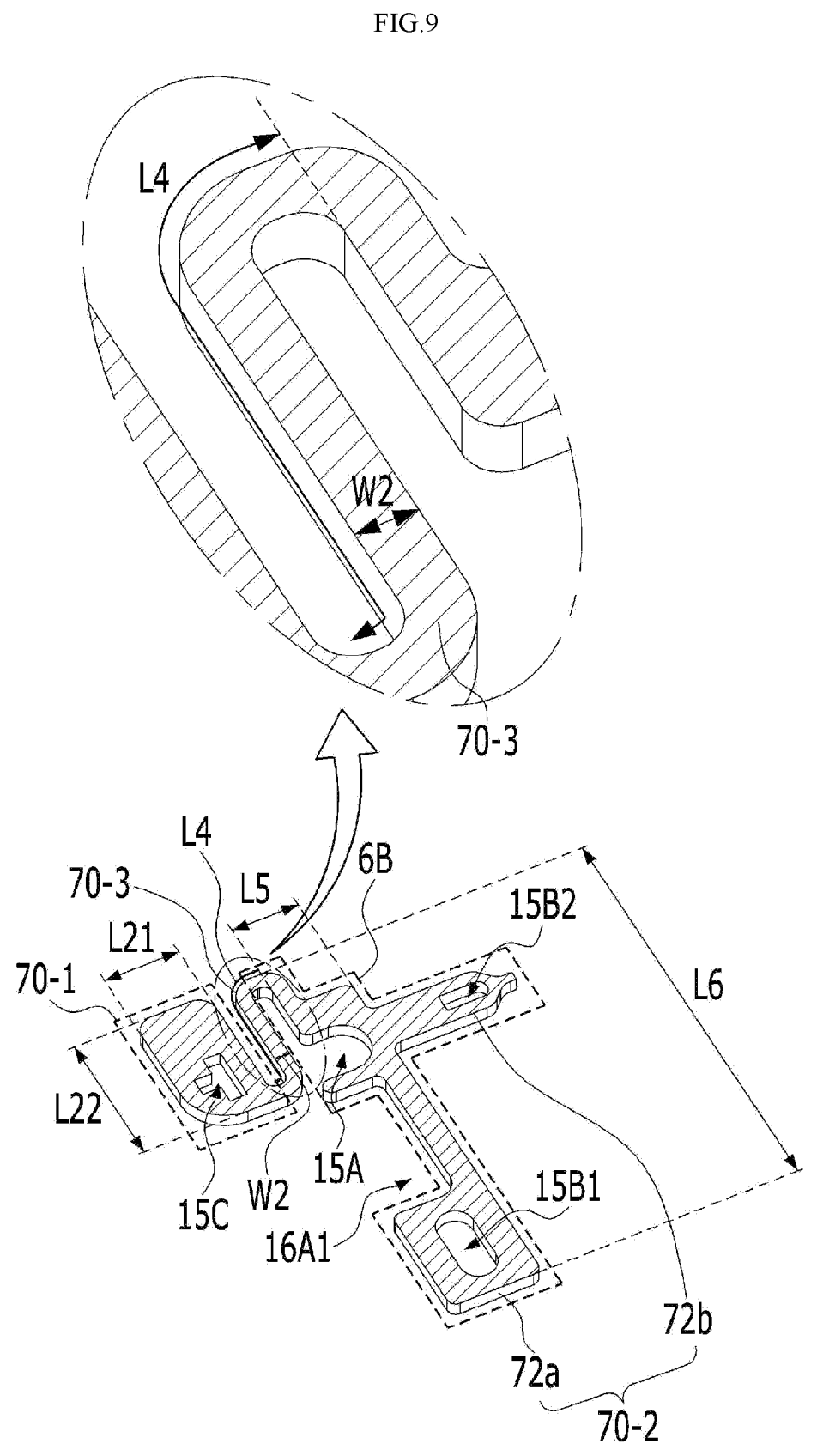

FIG. 4 is an exploded view of the first lens unit 130, FIG. 5 is a top view of the first lens unit 130, FIG. 6 is a bottom view of the first lens unit 130, FIG. 7 is a perspective view of a first terminal unit 60, FIG. 8 is an enlarged view of any one terminal of the first terminal unit 60, and FIG. 9 is a perspective view of a second terminal unit 70.

Referring to FIGS. 4 to 9, the first lens unit 130 may include a liquid lens 50, terminal units 60 and 70, and a holder 80. In another embodiment, the holder 80 may be omitted from the first lens unit.

The liquid lens 50 may be disposed between the lens of the second lens unit 112 and the lens of the third lens unit 113, and may be spaced apart from the lens of the second lens unit 112 and the lens of the third lens unit 113 in the optical-axis direction.

The liquid lens 50 may include a liquid lens region, which contains different types of liquids, a first electrode 51, and a second electrode 52. The first electrode 51 may alternatively be referred to as an "upper electrode", and the second electrode 52 may alternatively be referred to as a "lower electrode".

The liquid lens region may contain a first liquid that is conductive and a second liquid that is non-conductive, and an interface may be formed between the first liquid and the second liquid.

The liquid lens 50 may include at least one heater, which generates heat in response to a drive signal (or a control signal). The heater may be implemented in the form of a resistor capable of generating heat in response to a drive signal (or a control signal), but the disclosure is not limited thereto.

The first electrode 51 may be disposed on a first surface (e.g. an upper surface) of the liquid lens 50, and the second electrode 52 may be disposed on a second surface (e.g. a lower surface) of the liquid lens 50 that is opposite the first surface thereof. The first electrode 51 and the second electrode 52 may be provided separately from each other, or may be independent electrodes.

The first electrode 51 may include a plurality of first electrodes 51-1 to **51-*n* (where "n" is a natural number greater than 1 (n>1), for example, n=10), which are spaced apart from each other. In an example, the first electrode 51 may include $1\text{-}1^{st}$ to $1\text{-}10^{th}$ electrodes 51-1 to 51-10**.

In an example, the plurality of first electrodes 51 to 54 may be individual terminals or individual electrodes, but the disclosure is not limited thereto. In another embodiment, at least two of the plurality of first electrodes may be connected to each other to constitute a common electrode.

The plurality of first electrodes 51-1 to 51-10 may be disposed near the liquid lens region. A drive signal for deforming the interface between the first liquid and the second liquid may be provided to the first electrode 51 and the second electrode 52.

The first electrode 51 may include first electrodes disposed on four corners of the first surface (e.g. the upper surface) of the liquid lens 50.

For example, each of the $1\text{-}1^{st}$ to $1\text{-}4^{th}$ electrodes 51-1 to 51-4 may be formed or disposed on a corresponding one of the four corners of the first surface (e.g. the upper surface) of the liquid lens 50.

Each of the plurality of first electrodes 51-1 to 51-10 may be exposed from the first surface (e.g. the upper surface) of the liquid lens 50. In an example, each of the plurality of first electrodes 51-1 to 51-10 may include a portion that is exposed from the first surface (e.g. the upper surface) of the liquid lens 50.

In an example, each of the plurality of first electrodes 51-1 to 51-10 may be formed so as to be spaced apart from the outer surface of the liquid lens 50.

In an example, the upper surface of each of the plurality of first electrodes 51-1 to 51-10 and the upper surface of the liquid lens 50 may have a height difference with respect to each other in the optical-axis direction, but the disclosure is not limited thereto. In an example, the height of the tipper surface of each of the plurality of first electrodes 51-1 to 51-10 may be lower than the height of the upper surface of the liquid lens 50.

In an example, the first electrodes 51-1 to 51-10 may be electrically or physically separated from each other.

A separate drive signal may be provided to each of at least two of the first electrodes 51-1 to 51-10.

In an example, a first drive signal (or a first control signal) may be applied across the 1-1$^{st}$ electrode 51-1 and the first common electrode. A second drive signal (or a second control signal) may be applied across the 1-2$^{nd}$ electrode 51-2 and the first common electrode. A third drive signal (or a third control signal) may be applied across the 1-3$^{rd}$ electrode 51-3 and the first common electrode. A fourth drive signal (or a fourth control signal) may be applied across the 1-4$^{th}$ electrode 51-4 and the first common electrode. In an example, the first common electrode may be the second electrode 52.

In an example, each of the first to fourth drive signals may take the form of voltage or current. In this case, each of the 1-1$^{st}$ to 1-4$^{th}$ electrodes 51-1 to 51-4 may correspond to a separate positive (+) electrode for controlling the liquid lens 50, and the second electrode 52 may be a common negative (−) electrode for controlling the liquid lens.

In the liquid lens 50, the interface formed between the first liquid (e.g. the conductive liquid) and the second liquid (e.g. the non-conductive liquid) may be deformed in response to the first to fourth drive signals, and the focal length of the liquid lens 50 may be controlled by the deformed interface. In this way, at least one of the AF function or the OIS function may be performed with respect to the lens assembly 120.

The second electrode 52 may include at least one electrode.

In an example, the second electrode 52 may include a plurality of second electrodes 52-1 to 52-4. In an example, the second electrode 52 may include 2-1$^{st}$ to 2-4$^{th}$ electrodes 52-1 to 52-4. However, the number of second electrodes is not limited to four. In another embodiment, the number of second electrodes may be one or two or more.

The 2-1$^{st}$ to 2-4$^{th}$ electrodes 52-1 to 52-4 may be exposed to the second surface of the liquid lens 50. In an example, each of the 2-1$^{st}$ to 2-4$^{th}$ electrodes 52-1 to 52-4 may include a portion that is exposed to the second surface of the liquid lens 50. Here, the second surface of the liquid lens 50 may be the surface opposite the first surface of the liquid lens 50.

The 2-1$^{st}$ to 2-4$^{th}$ electrodes 52-1 to 52-4 may be formed or disposed on four corners of the second surface (e.g. the lower surface) of the liquid lens 50, but the disclosure is not limited thereto. In another embodiment, the second electrode may be disposed on the side of the second surface of the liquid lens.

In an example, any one of the 2-1$^{st}$ to 2-4$^{th}$ electrodes 51-1 to 51-4 (e.g. the 2-4$^{th}$ electrode 52-4) may be a first common electrode, for example, a common negative (−) electrode, with respect to the 1-1$^{st}$ to 1-4$^{th}$ electrodes 51-1 to 51-4 for controlling the liquid lens. In an example, a ground voltage may be provided to the first common electrode (e.g. 52-4), but the disclosure is not limited thereto.

In an example, the 2-1$^{st}$ to 2-4$^{th}$ electrodes 51-1 to 51-4 may form one and the same common electrode (e.g. the first electrode), but the disclosure is not limited thereto.

In another embodiment, another one of the 2-1$^{st}$ to 2-4$^{th}$ electrodes 51-1 to 51-4 may be an individual electrode, an individual terminal, or a second common electrode, which is independent of the first common electrode. In an example, the first common electrode and the second common electrode may be electrically and physically separated or isolated from each other, but the disclosure is not limited thereto. In another embodiment, the first common electrode and the second common electrode may be connected to each other or may be integrally formed with each other.

In an embodiment, epoxy may be applied through separation spaces between the liquid lens 50 and the solid lenses of the second and third lens units 112 and 113, and active alignment of the liquid lens 50 may be performed.

In another embodiment, the functions or roles of the first electrode 51 and the second electrode 52 of the liquid lens 50 may be inverted. That is, for example, the second electrodes may be individual terminals that play the role of the above-described first electrodes.

The first electrode 51 and the second electrode 52 may be formed of a conductive material, for example, a conductive metal, but the disclosure is not limited thereto.

The holder 80 accommodates or supports the liquid lens 50 and the terminal units 60 and 70.

The holder 80 may have a hole 81A formed therein to accommodate the liquid lens 50. In an example, the hole 81A may be formed through the holder 80 in the optical-axis direction. The liquid lens 50 may be disposed or seated in the hole 81A in the holder 80.

The holder 80 may have a shape that enables the same to be mounted on the first barrel portion 110A of the lens barrel 110.

Referring to FIG. 5, the terminal units 60 and 70 may be disposed on the holder 80.

The terminal units 60 and 70 may be conductively connected to the liquid lens 50.

In an example, the terminal units 60 and 70 may be connected to at least one of the first electrode 51 or the second electrode 52 of the liquid lens 50 by means of a conductive adhesive member. For example, the conductive adhesive member may include at least one of solder or a conductive adhesive (e.g. conductive epoxy).

The terminal units 60 and 70 may include a first terminal unit 60, which is disposed on the upper portion, the upper end, or the upper surface of the holder 80, and a second terminal unit 70, which is disposed on the lower portion, the lower end, or the lower surface of the holder 80.

The terminal units 60 and 70 connect the electrodes 51 and 52 of the liquid lens 50 to the conductive members 90 of the lens holder 140.

In an example, one ends of the terminal units 60 and 70 may be coupled to the electrodes 5I and 52 of the liquid lens 50 by means of a conductive adhesive member 68 (refer to FIG. 13A), and the other ends of the terminal units 60 and 70 may be coupled to the conductive members 90 of the lens holder 140.

In an example, the terminal units 60 and 70 may conductively connect the electrodes 51 and 52 of the liquid lens 50 to the conductive members 90 of the lens holder 140.

The first terminal unit 60 may include at least one first terminal.

For example, the first terminal unit 60 may include a plurality of first terminals 61 to 66, which are spaced apart from each other. For example, the first terminal unit 60 may include 1-1$^{st}$ to 1-6$^{th}$ terminals 61 to 66.

The second terminal unit 70 may include at least one second terminal. In an example, the second terminal unit 70 may include one second terminal, but the disclosure is not limited thereto. In another embodiment, the second terminal unit may include two or more second terminals.

At least a portion of the first terminal unit 60 may be disposed on the upper surface 8A of the holder 80. In an example, at least a portion of the first terminal unit 60 may be disposed on a protruding portion 19A formed on the upper surface 8A of the holder 80. In another embodiment, at least a portion of the first terminal unit 60 may be disposed in a recess formed in the upper surface of the holder 80.

At least a portion of the second terminal unit 70 may be disposed on the lower surface 8B of the holder 80. In another embodiment, at least a portion of the second terminal unit may be disposed in a recess formed in the lower surface 8B of the holder 80.

Each of the terminal units 60 and 70 may have a structure in which a separate terminal or conductor is coupled or bonded to the holder 80, but the disclosure is not limited thereto. In another embodiment, the terminal units 60 and 70 and the holder 80 may be formed through insert injection molding.

In an example, each of the 1-$1^{st}$ to 1-$4^{th}$ terminals 61 to 64 may be coupled to a corresponding one of the 1-$1^{st}$ to 1-$4^{th}$ electrodes 51-1 to 51-4 of the liquid lens 50.

In addition, in an example, each of the 1-$5^{th}$ and 1-$6^{th}$ terminals 65 and 66 may be coupled to a corresponding one of the 1-$5^{th}$ and 1-$6^{th}$ electrodes 51-5 and 51-6 of the liquid lens 50.

In an example, the second terminal 70 may be coupled to any one of the 2-$1^{st}$ to 2-$4^{th}$ terminals 52-1 to 52-4.

One end of the first terminal unit 60 may be coupled to the first electrode 51, and the other end of the first terminal unit (or the first terminal) may protrude from the side surfaces 80A to 80D of the holder 80.

Referring to FIG. 5, the first terminal unit 60 may include a first portion 60-1 coupled to the first electrode 51, a second portion 60-2 disposed on the holder 80, and a third portion 60-3 interconnecting the first portion 60-1 and the second portion 60-2.

The first portion 60-1 may be conductively connected to the first electrode 51. In an example, the first portion 60-1 may be connected to the first electrode 51 by means of the conductive adhesive 68 (refer to FIGS. 13A and 13B), such as conductive epoxy or Ag epoxy.

The third portion 60-3 may alternatively be referred to as a "connection portion". Although FIG. 5 illustrates only the first portion 60-1, the second portion 60-2, and the third portion 60-3 of the first terminal 61 of the first terminal unit 60, the description of the first to third portions 60-1, 60-2, and 60-3 of the first terminal 61 may also apply to the other terminals 62 to 66 of the first terminal unit 60.

In addition, the second portion 60-2 of the first terminal unit 60 may include a first region 61*a*, which is disposed on the tipper surface 8A of the holder 80, and a second region 61*b*, which is connected to the first region 61*a* and protrudes from the side surfaces 80A and SOB of the holder 80.

The second region 61*b* may extend and protrude in a direction opposite the direction from the second portion 60-2 toward the first portion 60-1. In an example, the second region 61*b* may be spaced apart from the holder 80.

The first portion 60-1 of the first terminal unit 60 may overlap the first electrode 51 of the liquid lens 50 in the direction of the optical axis OA.

Referring to FIG. 8, one end of the third portion 60-3 of the first terminal unit 60 may be connected or coupled to part of the first portion 60-1.

In an example, one end of the third portion 60-3 may be connected or coupled to any one corner or any one edge of the first portion 60-1.

In an example, one end of the third portion 60-3 may be connected or coupled to any one of the corners (or the edges) of the first portion 60-1 that are adjacent to or face the third portion 60-3 (or the second portion 60-2).

Although the third portion 60-3 is illustrated in FIG. 8 as being connected or coupled to the right corner of the first portion 60-1 when viewed in the direction from the third portion (or the second portion) toward the first portion, the disclosure is not limited thereto. In another embodiment, the third portion 60-3 may be connected or coupled to the left corner (or the left edge) of the first portion 60-1.

In still another embodiment, one end of the third portion 60-3 may be connected or coupled to any one outer surface or any one outer side of the first portion 60-1 that is adjacent to or faces the third portion 60-3 (or the second portion 60-2), and may be spaced apart from the corners of the first portion 60-1.

In an example, the other end of the third portion 60-3 may be connected or coupled to part of the second portion 60-2.

In an example, referring to FIG. 8, one end of the third portion 60-3 and the other end of the third portion 60-3 may be located opposite each other with respect to a reference line 402. The reference line 402 may be a straight line that passes through the center 401 of the first portion 60-1 and is parallel to the direction from the first portion 60-1 toward the second portion 60-2 or to the lengthwise direction of the first portion 60-1.

The width W1 of the third portion 60-3 of the first terminal unit 60 is less than the length L1 of the third portion 60-3 of the first terminal unit 60. In this case, the length L1 of the third portion 60-3 may be the length in the direction in which the third portion 60-3 extends from one end of the third portion 60-3, which is connected to the first portion 60-1, to the other end of the third portion 60-3, which is connected to the second portion 60-2. In addition, the width W1 of the third portion 60-3 may be the length of the third portion 60-3 in a direction perpendicular to the direction in which the third portion 60-3 extends.

The third portion 60-3 may include at least one curved portion or bent portion.

For example, the third portion 60-3 may take the form of a leg, and may have the shape of a line that is bent or curved at least once.

The width W1 of the third portion 60-3 may be smaller than the width of the first portion 60-1.

In an example, the width of the first portion 60-1 may be the length L1 of the first portion 60-1 in the lengthwise direction or the length L12 of the first portion 60-1 in the crosswise direction.

Alternatively, in another example, the width of the first portion 60-1 may be the diameter (e.g. the minimum diameter) of the first portion 60-1. In this case, the diameter of the first portion 60-1 may be the length of a straight line that passes through two opposite points on the outer circumferential surface of the first portion 60-1 and the center of the first portion 60-1. In an example, the minimum diameter may be the smallest diameter, among the diameters of the first portion 60-1.

In an example, the width W1 of the third portion 60-3 may be less than the length L11 (or the minimum length) of the first portion 60-1 in the first horizontal direction (or the lengthwise direction) (W1<L11).

In an example, the width W1 of the third portion 60-3 may be less than the length L12 (or the minimum length) of the first portion 60-1 in the second horizontal direction (or the crosswise direction) (W1<L12).

In an example, the area of the upper surface (or the lower surface) of the third portion 60-3 may be smaller than the area of the upper surface or the lower surface of the first portion 60-1.

In addition, the width W1 of the third portion 60-3 may be smaller than the width of the second portion 60-2. For example, the width of the second portion 60-2 may be the length L3 of the second portion 60-2 in the crosswise direction or the length L2 of the second portion 60-2 in the lengthwise direction.

Alternatively, in another example, the width of the second portion 60-2 may be the diameter (e.g. the minimum diameter) of the second portion 60-2. In this case, the diameter of the second portion 60-2 may be the length of a straight line that passes through two opposite points on the outer circumferential surface of the second portion 60-2 and the center of the second portion 60-2. In an example, the minimum diameter may be the smallest diameter, among the diameters of the second portion 60-2.

In an example, the width W1 of the third portion 60-3 may be smaller than the width of the first region 61*a* of the second portion 60-2.

In an example, the width W1 of the third portion 60-3 may be less than the length L2 (or the minimum length) of the second portion 60-2 in the first horizontal direction (or the lengthwise direction) (W1<L2). In an example, the width W1 of the third portion 60-3 may be less than the length L2 (or the minimum length) of the first region 61*a* in the first horizontal direction (or the lengthwise direction).

In an example, the width W1 of the third portion 60-3 may be less than the length L3 (or the minimum length) of the second portion 60-2 in the second horizontal direction (or the crosswise direction) (W1<L3). In an example, the width W1 of the third portion 60-3 may be less than the length L3 (or the minimum length) of the first region 61*a* in the second horizontal direction (or the crosswise direction).

In an example, the area of the upper surface (or the lower surface) of the third portion 60-3 may be smaller than the area of the upper surface or the lower surface of the second portion 60-2.

The first portion 60-1 of the first terminal unit 60 may include a 1-1$^{st}$ portion, which overlaps the first electrode 51 of the liquid lens 50 in the optical-axis direction, and a 1-2$^{nd}$ portion, which does not overlap the first electrode 51 in the optical-axis direction. In this case, the area of the upper surface (or the lower surface) of the 1-2$^{nd}$ portion may be smaller than the area of the upper surface (or the lower surface) of the 1-1$^{st}$ portion. In another embodiment, the first portion of the first terminal unit 60 may not include the 1-2$^{nd}$ portion.

In an example, the width W1 of the third portion 60-3 may be smaller than the width of the 1-1$^{st}$ portion of the first terminal unit 60. In addition, in an example, the width W1 of the third portion 60-3 may be less than the length (or the minimum length) of the 1-1$^{st}$ portion in the first horizontal direction (or the lengthwise direction). In addition, in an example, the width W1 of the third portion 60-3 may be less than the length (or the minimum length) of the 1-1$^{st}$ portion in the second horizontal direction (or the crosswise direction).

Since the width W1 of the third portion 60-3 of the first terminal unit 60 is less than the length L11 of the first portion 60-1 in the first horizontal direction and/or the length L12 of the first portion 60-1 in the second horizontal direction, it is possible to reduce the stiffness of the terminal unit 60, thereby inhibiting electrical reliability from being deteriorated by thermal expansion or contraction of the conductive adhesive member 68 (e.g. Ag epoxy).

Referring to FIGS. 6 and 9, the second terminal unit 70 may include a first portion 70-1 coupled to the second electrode 52, a second portion 70-2 disposed on the holder 80, and a third portion 70-3 interconnecting the first portion 70-1 and the second portion 70-2. The third portion 70-3 may alternatively be referred to as a “connection portion”.

The first portion 70-1 of the second terminal unit 70 may be conductively connected to the second electrode 52.

In an example, the first portion 70-1 may be coupled to the second electrode 52 by means of a conductive adhesive (e.g. conductive epoxy or Ag epoxy).

The first portion 70-1 may have a hole 15*c* formed therein. The hole 15*c* may be a through-hole formed through the first portion 70-1, and may expose a portion of the second electrode 52.

The contact area between the conductive adhesive, the first portion 70-1, and the first electrode 51 may be increased by the hole 15C, whereby bonding strength may be increased and electrical reliability may be improved.

The shape of the hole 15C viewed from above may be any of various shapes such as, for example, a polygonal shape, a circular shape, and a T-shape.

Although not shown in FIG. 7, similar to the hole 15C in the second terminal unit 70 in FIG. 9, a hole may be formed in the first portion 60-1 of the first terminal unit 60.

Although FIG. 6 illustrates the case in which one second terminal unit 70 has the first portion 70-1, the second portion 70-2, and the third portion 70-3, the disclosure is not limited thereto. In the case in which the second terminal unit 70 includes a plurality of second terminals, the description of the first to third portions 70-1, 70-2, and 70-3 of the second terminal 70 may also apply to each of the plurality of second terminals.

In addition, the second portion 70-2 of the second terminal unit 70 may include a first region 72*a*, which is disposed on the lower surface 8B of the holder 80, and a second region 72*b*, which is connected to the first region 72*a* and protrudes from the side surface (e.g. 80B) of the holder 80.

The second region 72*b* of the second terminal unit 70 may be spaced apart from the holder 80, and may extend and protrude in a direction opposite the direction from the second portion 70-2 toward the first portion 70-1.

The first portion 70-1 of the second terminal unit 70 may overlap the second electrode 52 of the liquid lens 50 in the direction of the optical axis OA. In an example, the first portion 70-1 of the second terminal unit 70 may overlap the 2-4$^{th}$ electrode 52-4 of the liquid lens 50 in the direction of the optical axis OA.

The description made with reference to FIG. 8 may also apply to each of the first terminals 61 to 66 in FIG. 7.

Referring to FIG. 9, the width W2 of the third portion 70-3 of the second terminal unit 70 is less than the length L4 of the third portion 70-3 of the second terminal unit 70 (W2<L4). In this case, the length L4 of the third portion 70-3 may be the length in the direction in which the third portion 70-3 extends from one end of the third portion 70-3, which is connected to the first portion 70-1, to the other end of the third portion 70-3, which is connected to the second portion 70-2. In addition, the width W2 of the third portion 70-3 may be the length of the third portion 70-3 in a direction perpendicular to the direction in which the third portion 70-3 extends.

The third portion 70-3 may include at least one curved portion or bent portion.

For example, the third portion 70-3 may take the form of a leg, and may have the shape of a line that is bent or curved at least once.

The width W2 of the third portion 70-3 may be smaller than the width of the first portion 70-1. The width of the first portion 70-1 may be the length of the first portion 70-1 in the crosswise direction or the lengthwise direction.

In an example, the width W2 of the third portion 70-3 may be less than the length L22 (or the minimum length) of the first portion 70-1 in the first horizontal direction (or the lengthwise direction) (W1<L22).

In an example, the width W2 of the third portion 70-3 may be less than the length L21 (or the minimum length) of the first portion 70-1 in the second horizontal direction (or the crosswise direction) (W1<L21).

In an example, the area of the upper surface (or the lower surface) of the third portion 70-3 may be smaller than the area of the upper surface or the lower surface of the first portion 70-1.

In addition, the width W2 of the third portion 70-3 may be smaller than the width of the second portion 70-2. For example, the width of the second portion 70-2 may be the length of the second portion in the crosswise direction or the lengthwise direction.

In an example, the width W2 of the third portion 70-3 may be smaller than the width of the first region 72*a* of the second portion 70-2.

In an example, the width W2 of the third portion 70-3 may be less than the length L6 (or the minimum length) of the second portion 70-2 in the first horizontal direction (or the lengthwise direction) (W1<L6). In an example, the width W2 of the third portion 70-3 may be less than the length L6 (or the minimum length) of the first region 72*a* in the first horizontal direction (or the lengthwise direction).

In an example, the width W2 of the third portion 70-3 may be less than the length L5 (or the minimum length) of the second portion 70-2 in the second horizontal direction (or the crosswise direction) (W1<L5). In an example, the width W2 of the third portion 70-3 may be less than the length L5 (or the minimum length) of the first region 72*a* in the second horizontal direction (or the crosswise direction).

In an example, the area of the upper surface (or the lower surface) of the third portion 70-3 may be smaller than the area of the upper surface or the lower surface of the second portion 70-2.

The first portion 70-1 of the second terminal unit 70 may include a 1-3$^{rd}$ portion, which overlaps the second electrode 52 of the liquid lens 50 in the optical-axis direction, and a 1-4$^{th}$ portion, which does not overlap the second electrode 52 in the optical-axis direction. In this case, the area of the upper surface (or the lower surface) of the 1-4$^{th}$ portion may be smaller than the area of the upper surface (or the lower surface) of the 1-3$^{rd}$ portion. In another embodiment, the first portion of the second terminal unit 70 may not include the 1-4$^{th}$ portion.

In an example, the width W2 of the third portion 70-3 may be smaller than the width of the 1-3$^{rd}$ portion of the second terminal unit 70. In addition, in an example, the width W2 of the third portion 70-3 may be less than the length (or the minimum length) of the 1-3$^{rd}$ portion in the first horizontal direction (or the lengthwise direction). In addition, in an example, the width W2 of the third portion 70-3 may be less than the length (or the minimum length) of the 1-3$^{rd}$ portion in the second horizontal direction (or the crosswise direction).

Since the width W2 of the third portion 70-3 of the second terminal unit 70 is less than the length L22 of the first portion 70-1 in the first horizontal direction and/or the length L21 of the first portion 70-1 in the second horizontal direction, it is possible to reduce the stiffness of the terminal unit 70, thereby electrical reliability from being deteriorated by thermal expansion or contraction of the conductive adhesive member 68 (e.g. Ag epoxy).

In the terminal units 60 and 70, the term "terminal unit" may alternatively be referred to as a "lead unit", a "connection terminal unit", an "electrode unit", or a "conductive unit".

The terminal units 60 and 70 may protrude from the side surfaces 80A and 80B of the holder 80.

In an example, one end 61*b* of each of the 1-1$^{st}$, 1-2$^{nd}$, 1-5$^{th}$, and 1-6$^{th}$ terminals 61, 62, 65, and 66 may protrude from the first side surface 80A of the holder 80, and one end of each of the 1-3$^{rd}$ and 1-4$^{th}$ terminals 63 and 64 and the second terminal unit 70 may protrude from the second side surface 80B of the holder 80. In an example, the first side surface 80A and the second side surface 80B of the holder 80 may be outer surfaces located opposite each other.

In an example, the 1-5$^{th}$ terminal 65 and the 1-6$^{th}$ terminal 66 may be disposed between the 1-1$^{st}$ terminal 61 and the 1-2$^{nd}$ terminal 62.

The terminal units 60 and 70 may be spaced apart from the conductive member 90, and the terminal units and the conductive member may be coupled and conductively connected to each other by means of a conductive adhesive member.

One end of the first terminal unit 60, for example the first portion 60-1, may be coupled to the first electrode 51 of the lens 50 by means of the conductive adhesive member 68. In addition, the other end of the first terminal unit 60, for example the second region 61*b*, may be coupled to conductive portions 91-1 to 91-4 of the conductive member 90 by means of a conductive adhesive member 69 (refer to FIG. 13B).

In addition, one end of the second terminal unit 70, for example the first portion 70-1, may be coupled to the second electrode 52 of the liquid lens 50 by means of a conductive adhesive member. In addition, the other end of the second terminal unit 70, for example the second region 72*b*, may be coupled to a conductive portion (e.g. 91-7) of the conductive member 90 by means of a conductive adhesive member.

The other ends 61*b* and 72*b* of the terminal units 60 and 70 may protrude from the holder 80.

The other ends 61*b* and 72*b* of the terminal units 60 and 70 may be spaced apart from the conductive member 90, and may overlap the conductive member 90 in the vertical direction or the optical-axis direction. A conductive adhesive member 69 may be disposed between the other ends 61*b* and 72*b* of the terminal units 60 and 70 and the conductive member 90. The vertical direction may be parallel to the optical-axis direction.

The first terminal unit 60 may include at least one first terminal disposed on a first side of the upper surface of the holder 80, and may include at least one first terminal disposed on a second side of the upper surface of the holder 80.

In an example, the four first terminals 61, 62, 65, and 66 of the first terminal unit 60 may be disposed on the first side of the upper surface of the holder 80, and the two first terminals 63 and 64 may be disposed on the second side of the upper surface of the holder 80, opposite the first side thereof. Here, the first side of the upper surface of the holder 80 may be a region on the upper surface of the holder 80 that is adjacent to the first side surface 80A of the holder 80, and the second side of the upper surface of the holder 80 may be another region on the upper surface of the holder 80 that is adjacent to the second side surface 80B of the holder 80. The first side surface 80A and the second side surface 80B of the holder 80 may be located opposite each other.

In an example, the four first terminals 61, 62, 65, and 66 may be disposed on one side or the first side of the upper surface of the holder 80, and the other two first terminals 63 and 64 may be disposed on the other side or the second side of the upper surface of the holder 80.

In an example, the second terminal unit 70 may be disposed on at least one of one side (e.g. a first side) or the other side (e.g. a second side) of the lower surface 8B of the holder 80. Here, the first side of the lower surface of the holder 80 may be a region on the lower surface of the holder 80 that is adjacent to the first side surface 80A of the holder 80, and the second side of the lower surface of the holder 80 may be another region on the lower surface of the holder 80 that is adjacent to the second side surface 80B of the holder 80.

The conductive member 90 may include a plurality of conductive portions 91-1 to 91-9.

Figure 13A:
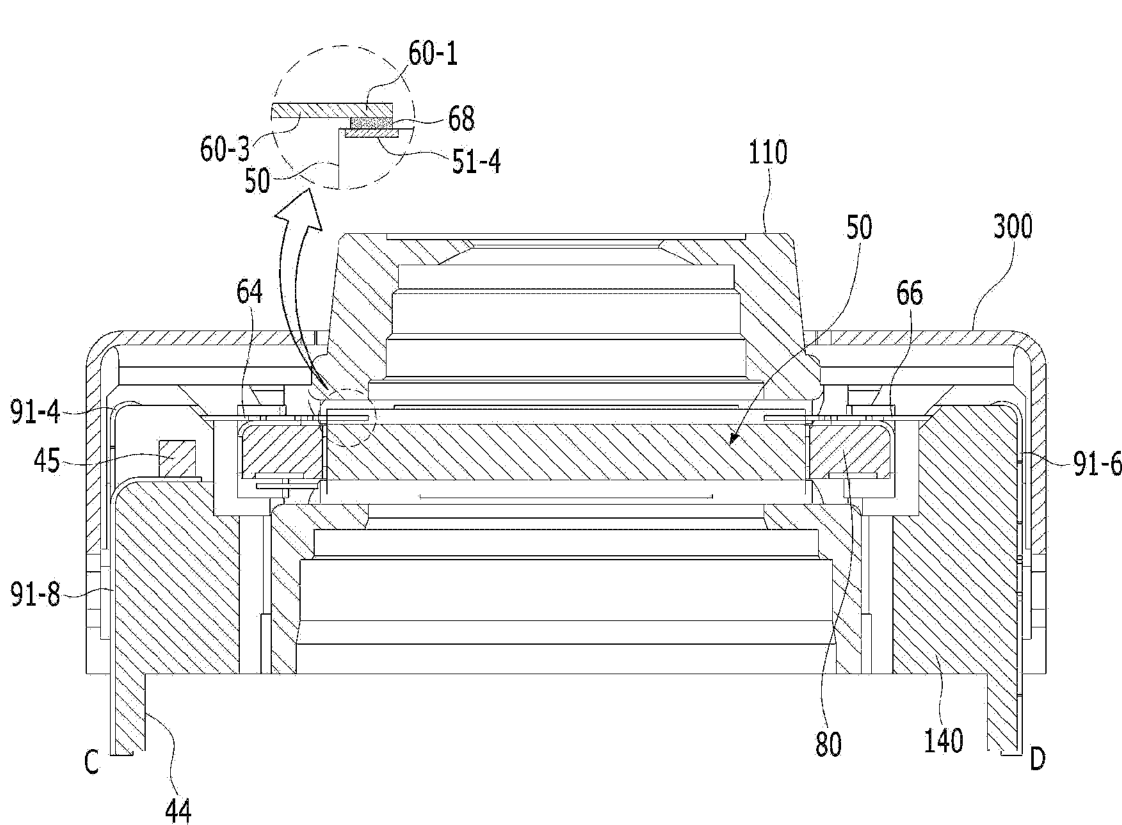
FIG. 13A is a cross-sectional view taken along line CD in the first lens unit and the lens holder in FIG. 11.
Figure 13B:
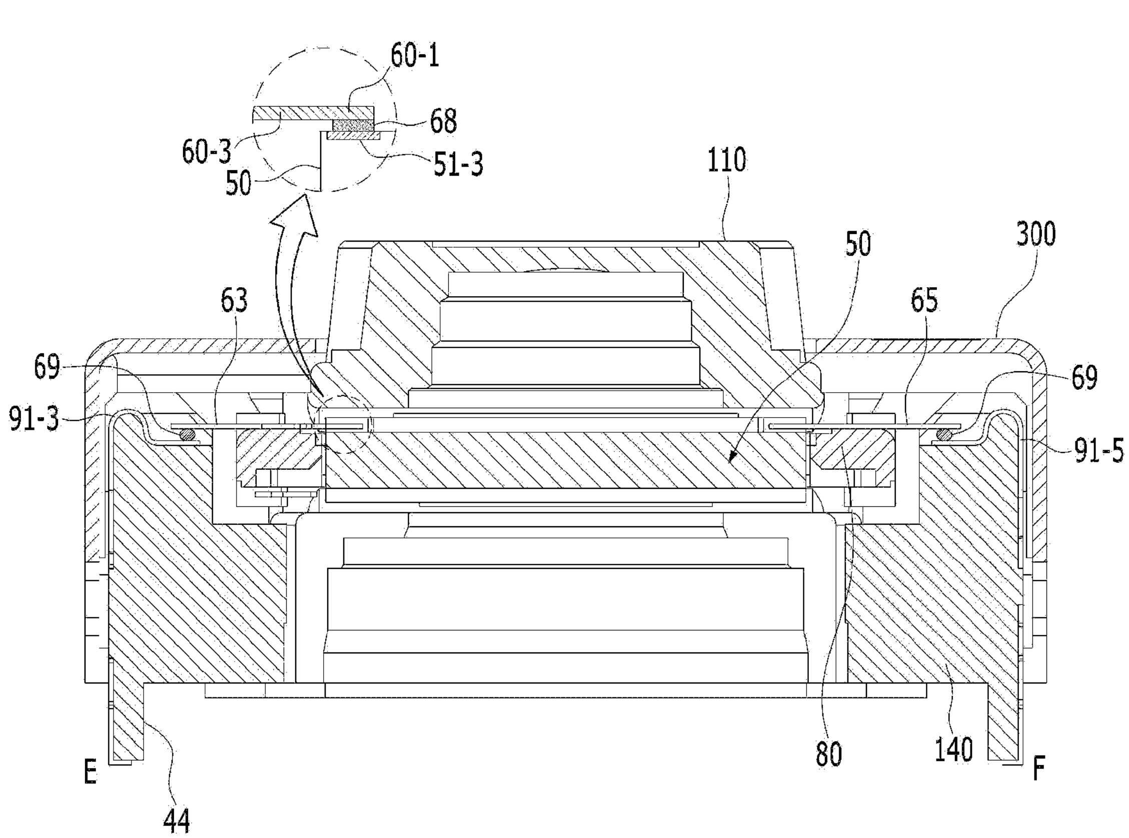
FIG. 13B is a cross-sectional view taken along line EF in the first lens unit and the lens holder in FIG. 11.

In an example, the conductive member 90 may include conductive portions 91-1 to 91-6 corresponding to the first terminals 61 to 66 of the first terminal unit 60, and each of the conductive portions 91-1 to 91-6 may be coupled and conductively connected to a corresponding one of the first terminals 61 to 66 by means of the conductive adhesive member 69 (refer to FIG. 13B).

The conductive member 90 may include a conductive portion 91-7 corresponding to the second terminal unit 70, and the conductive portion 91-7 may be coupled and conductively connected to the second terminal unit 70 by means of the conductive adhesive member.

Referring to FIGS. 5 to 7, in an example, each of the plurality of first terminals 61 to 66 of the first terminal unit 60 may include a respective one of first portions 5A1 to 5A6 connected or coupled to the first electrode 51, a respective one of second portions 5B1 to 5B6 disposed on the holder 80, and a respective one of third portions 5C1 to 5C1 interconnecting the first portions 5A1 to 5A6 and the second portions 5B1 to 5B6.

In addition, each of the second portions 5B1 to 5B6 may include a first region 60-1, which is disposed on the upper surface 8A of the holder 80, and a second region 60-2, which is connected to the first region 60-1 and protrudes from the side surface of the holder 80.

At least a portion of each of the first portions 5A1 to 5A6 of the first terminals 61 to 66 may overlap a corresponding one of the first electrodes 51-1 to 51-6 of the liquid lens 50 in the optical-axis direction.

The second portion 60-2 of the first terminal unit 60 may include an extension portion 14A extending toward a third side or a fourth side of the upper surface of the holder 80.

In an example, each of the second portions 5B1 and 5B3 of one or more (e.g. 61 and 63) of the first terminals 61 to 66 may include an extension portion 14A extending toward the third side of the upper surface 8A of the holder 80. Alternatively, in an example, each of the second portions 5B2 and 5B4 of another one or more (e.g. 62 and 64) of the first terminals 61 to 66 may include an extension portion 14B extending toward the fourth side of the upper surface of the holder 80.

The third side of the upper surface of the holder 80 may be still another region on the upper surface of the holder 80 that is adjacent to the third side surface 80C of the holder 80, and the fourth side of the upper surface of the holder 80 may be still another region on the upper surface of the holder 80 that is adjacent to the fourth side surface 80D of the holder 80. The third side and the fourth side of the upper surface of the holder 80 may be located opposite each other between the first side and the second side of the upper surface of the holder 80. The third side surface 80C and the fourth side surface 80D of the holder 80 may be located opposite each other.

The second portion 60-2 of the first terminal unit 60 may have one or more holes or recesses 13A and 13B1 formed therein.

Each of one or more second portions 5B1 to 5B6 of the first terminals 61 to 66 may have one or more holes or recesses 13A and 13B1 formed therein.

In an example, the first region 61*a* of each of the second portions 5131 to 5B6 may have a first hole (or a first recess) 13A formed therein.

In an example, the first hole 13A may be formed so as to be adjacent to the other end of the third portion 60-3, which is connected to the first region 61*a* of the second portion 60-2.

The first region 61*a* of each of the second portions 5B1 to 536 of the first terminal unit 60 may be coupled, fixed, or attached to the upper surface 8A of the holder 80 by means of an adhesive. The first hole (or the first recess) 13A may increase the contact area between the adhesive, the second portions 5131 to 5B6 of the first terminal unit, and the upper surface of the holder 80, thereby increasing the bonding strength between the holder 80 and the first terminal unit 60.

The first hole 13A may have a structure including an opening that is open toward each of the third portions 5C1 to 5C6 (or each of the first portions 5A1 to 5A6) of the first terminal unit 60, and the adhesive may be smoothly introduced into the gap between the holder 80 and the first terminal unit 60 through the opening, whereby the holder 80 and the first terminal unit 60 may be easily bonded to each other. The first hole 13A may have, for example, a semicircular shape, a semi-elliptical shape, or a polygonal shape, but the disclosure is not limited thereto. In another embodiment, the first hole may take the form of a through-hole.

In addition, in an example, the first region 61*a* of each of the second portions 5B1 to 5B6 of the first terminal unit 60 may have a second hole 13B1 formed therein so as to be spaced apart from the first hole 13A.

The second hole 13B1 may take the form of a through-hole formed through each of the second portions 5B1 to 5B6 of the first terminal unit 60, but the disclosure is not limited thereto. In another embodiment, the second hole may take the form of a hole having the same shape as the first hole 13A or a shape similar thereto.

In an example, the second region 61*b* of each of the second portions 5B1 to 5B6 may have at least one hole and/or at least one recess formed therein.

In an example, the second region 61*b* of each of the second portions 5B to 5*f*6 may have a third hole 13B2 formed therein. The third hole 13B2 may be spaced apart from the first hole 13A and the second hole 13B1, and may be a through-hole formed through the second region 61*b* of each of the second portions 5B1 to 5B6, but the disclosure is not limited thereto.

In another embodiment, the third hole may take the form of a hole having an opening. In an example, the third hole may have the same structure as the first hole or a structure similar thereto.

The third hole 13B2 may increase the contact area between the conductive adhesive member 69, the second region 61*b* of each of the second portions 5B1 to 5B6, and a corresponding one of the conductive portions 91-1 to 91-6 of the conductive member 90, thereby improving the coupling strength between the first terminal unit 60 and the conductive member 90 and the reliability of the conductive connection therebetween.

The second region 61*b* of the second portion 60-2 of the first terminal unit 60 may have the shape of a straight line, and a distal end or one end of the second region 61*b* may include a region that gradually decreases in width in the direction from the first region 61*a* toward the second region 61*b*, but the disclosure is not limited thereto. In another embodiment, a distal end or one end of the second region 61*b* may have a constant or uniform width.

In another embodiment, the second region of the second portion 60-2 of the first terminal unit 60 may take the form of a line including a curved shape or a bent shape.

In still another embodiment, at least part of the second portion 60-2 of the first terminal unit 60 may include a curved portion or a bent portion. That is, in an example, the second region of the second portion 60-2 of the first terminal unit 60 may include a portion that is curved or bent in the crosswise direction of the holder 80.

Referring to FIGS. 6 and 9, in an example, the second terminal unit 70 may include a first portion 70-1 connected or coupled to the second electrode 52, a second portion 70-2 disposed on the holder 80, and a third portion 70-3 interconnecting the first portion 70-1 and the second portion 70-2.

In addition, the second portion 70-2 may include a first region 72*a*, which is disposed on the lower surface 8B of the holder 80, and a second region 72*b*, which is connected to the first region 72*a* and protrudes from the side surface SOB of the holder 80.

At least part of the first portion 70-1 of the second terminal unit 70 may overlap a corresponding one (e.g. 52-4) of the second electrodes 52-1 to 52-4 of the liquid lens 50 in the optical-axis direction.

The second portion 70-2 of the second terminal unit 70 may have at least one hole or recess formed therein.

In an example, the first region 72*a* of the second portion 70-2 may have a first hole (or a first recess) 15A formed therein.

The first region 72*a* of the second portion 70-2 of the second terminal unit 70 may be coupled, fixed, or attached to the lower surface 8B of the holder 80 by means of an adhesive. The first hole (or the first recess) 15A may increase the contact area between the adhesive, the second portion 70-2 of the second terminal unit 70, and the lower surface 8B of the holder 80, thereby increasing the bonding strength between the holder 80 and the second terminal unit 70.

The first hole 15A may have a structure including an opening that is open toward the third portion 70-3 (or the first portion 70-1) of the second terminal unit 70, and the adhesive may be smoothly introduced into the gap between the holder 80 and the second terminal unit 70 through the opening, whereby the holder 80 and the second terminal unit 70 may be easily bonded to each other. The first hole 15A may have, for example, a semicircular shape, a semi-elliptical shape, or a polygonal shape, but the disclosure is not limited thereto.

In addition, in an example, the first region 72*a* of the second portion 70-2 of the second terminal unit 70 may have a second hole 15B1 formed therein so as to be spaced apart from the first hole 15A. The second hole 15B1 may take the form of a through-hole formed through the second portion 70-2 of the second terminal unit 70, but the disclosure is not limited thereto. In another embodiment, the second hole may take the form of a hole having the same shape as the first hole 15A or a shape similar thereto.

In addition, in an example, the first region 72*a* of the second portion 70-2 of the second terminal unit 70 may have a recess 16A1 or a hole formed therein between the first hole 15A and the second hole 15B1.

In an example, the length of a portion of the first region 72*a* of the second portion 70-2, in which the recess 16A1 is formed, in the second horizontal direction (or the crosswise direction) may be shorter than the length of another portion of the first region 72*a*, which is connected to the third portion 70-3, in the second horizontal direction (or the crosswise direction).

In addition, in an example, the length of a portion of the first region 72*a* of the second portion 70-2, in which the recess 16A1 is formed, in the second horizontal direction (or the crosswise direction) may be shorter than the length of another portion of the first region 72*a*, in which the second hole 15B1 is formed, in the second horizontal direction (or the crosswise direction).

In an example, the second region 72*b* of the second portion 70-2 may have at least one hole or recess formed therein.

In an example, the second region 72*b* of the second portion 70-2 may have a third hole 15B2 formed therein. The third hole 15B2 may be spaced apart from the first hole 15A and the second hole 15B1, and may be a through-hole formed through the second region 72*b* of the second portion 70-2.

The third hole 15B2 may increase the contact area between the conductive adhesive member 69, the second region 72*b* of the second portion 70-2, and the conductive portion 91-7 of the conductive member 90, thereby improving the coupling strength between the second terminal unit 70 and the conductive member 90 and the reliability of the conductive connection therebetween.

The second region 72*b* of the second portion 70-2 of the second terminal unit 70 may have the shape of a straight line, and a distal end or one end of the second region 72*b* may include a region that gradually decreases in width in the direction from the first region 72*a* toward the second region 72*b*, but the disclosure is not limited thereto. In another embodiment, a distal end or one end of the second region 72*b* may have a constant or uniform width.

In still another embodiment, at least pail of the second portion 70-2 of the second terminal unit 70 may include a curved portion or a bent portion.

The holder 80 may have an adhesive injection recess 81 formed therein to receive an adhesive injected thereinto. The adhesive injection recess 81 may be formed in the lower surface of the holder 80. In another embodiment, the adhesive injection recess may be formed in the upper surface of the holder 80.

The second lens unit 112 may be disposed above the first lens unit 130, and may be a region into which light is introduced from outside the lens assembly 120. That is, the second lens unit 112 may be disposed above the first lens unit 130 in the lens barrel 110.

The second lens unit 112 may be implemented using a single lens, or may be implemented using two or more lenses. In an example, the two or more lenses of the second lens unit 110 may be aligned along a center axis to form an optical system.

Here, the center axis may be an optical axis OA of the optical system, which is formed by at least one of the second lens unit 112, the first lens unit, or the third lens unit 113 included in the camera module 100, or may be an axis parallel to the optical axis OA.

The optical axis OA may correspond to the center axis of the effective image area (or the active area) of the image sensor 160. That is, the second lens unit 112, the first lens unit 130, the third lens unit 113, and the image sensor 160 may be disposed so as to be aligned along the optical axis OA through active alignment (AA).

Here, "active alignment" may mean an operation of aligning the optical axes of the first to third lens units 111, 112, and 130 with each other and adjusting an axis or distance relationship between the image sensor 160 and the lens units 111, 112, and 130 in order to acquire an improved image.

In addition, each of the lenses included in the second lens unit 112 may gradually increase in outer diameter in the downward direction (e.g. the −z-axis direction), but the embodiments are not limited thereto.

An exposure lens (not shown) may be provided in front of or on the front surface of the second lens unit 112. In this case, the exposure lens may protrude so as to be exposed outside the lens barrel 110. In order to protect the surface of the exposure lens, a cover glass or a coating layer may be provided in front of the exposure lens.

The third lens unit 113 may be disposed below the first lens unit 130 in the lens barrel 110. The third lens unit 113 may be disposed so as to be spaced apart from the second lens unit 112 in the optical-axis direction (e.g. the z-axis direction).

The light introduced into the second lens unit 112 from outside the camera module 100 may be introduced into the third lens unit 113 through the first lens unit 130. The third lens unit 113 may be implemented using a single lens, or may be implemented using two or more lenses that are aligned along the center axis to form an optical system.

Unlike the first lens unit 130, each of the second lens unit 112 and the third lens unit 113 may be a solid lens, and may be made of glass or plastic. However, the embodiments are not limited to any specific material of each of the second lens unit 112 and the third lens unit 113.

Figure 11:
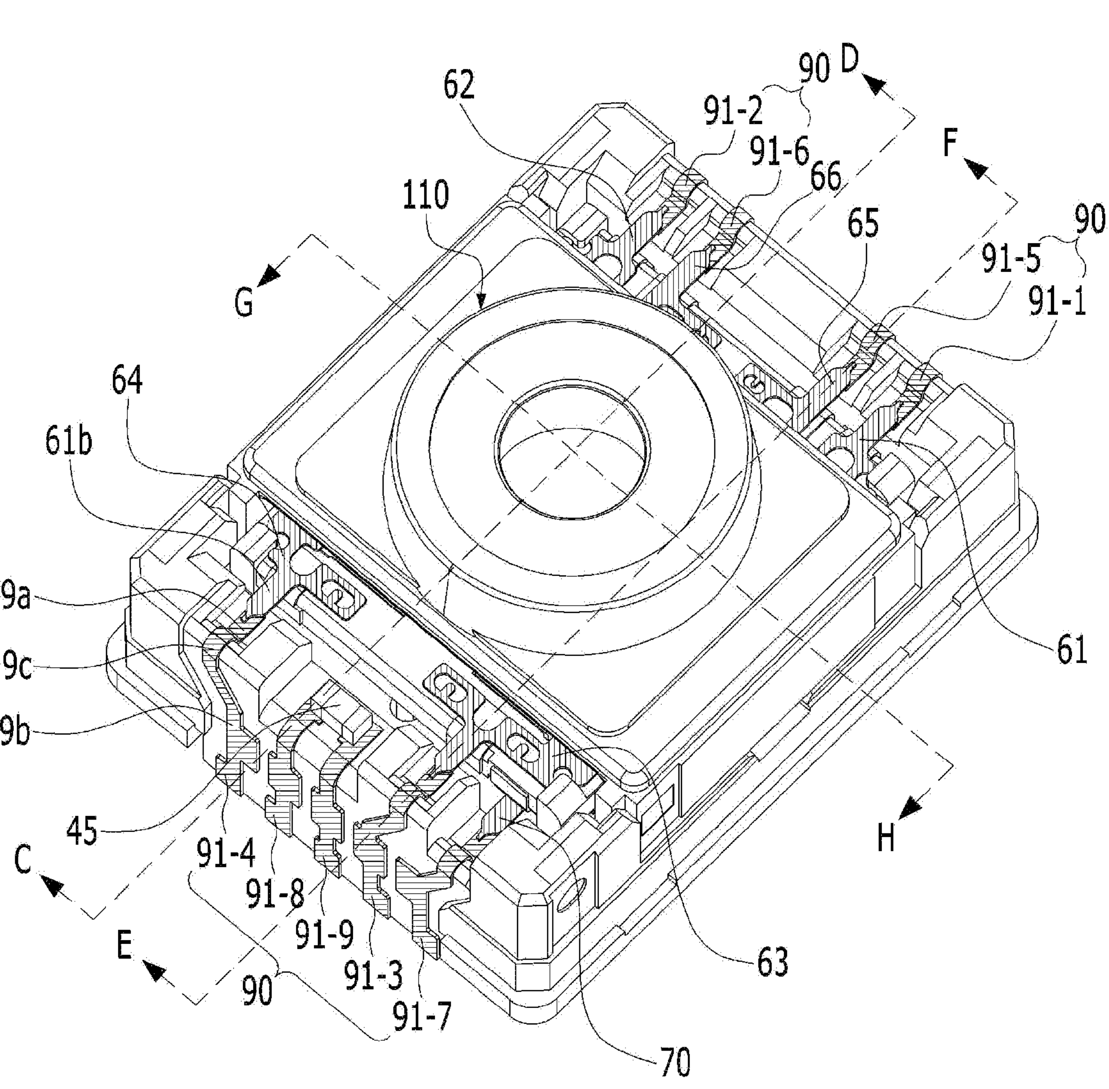
FIG. 11 is a perspective view of a first lens unit, a conductive member, and a lens holder accommodated in a lens barrel.
Figure 12:
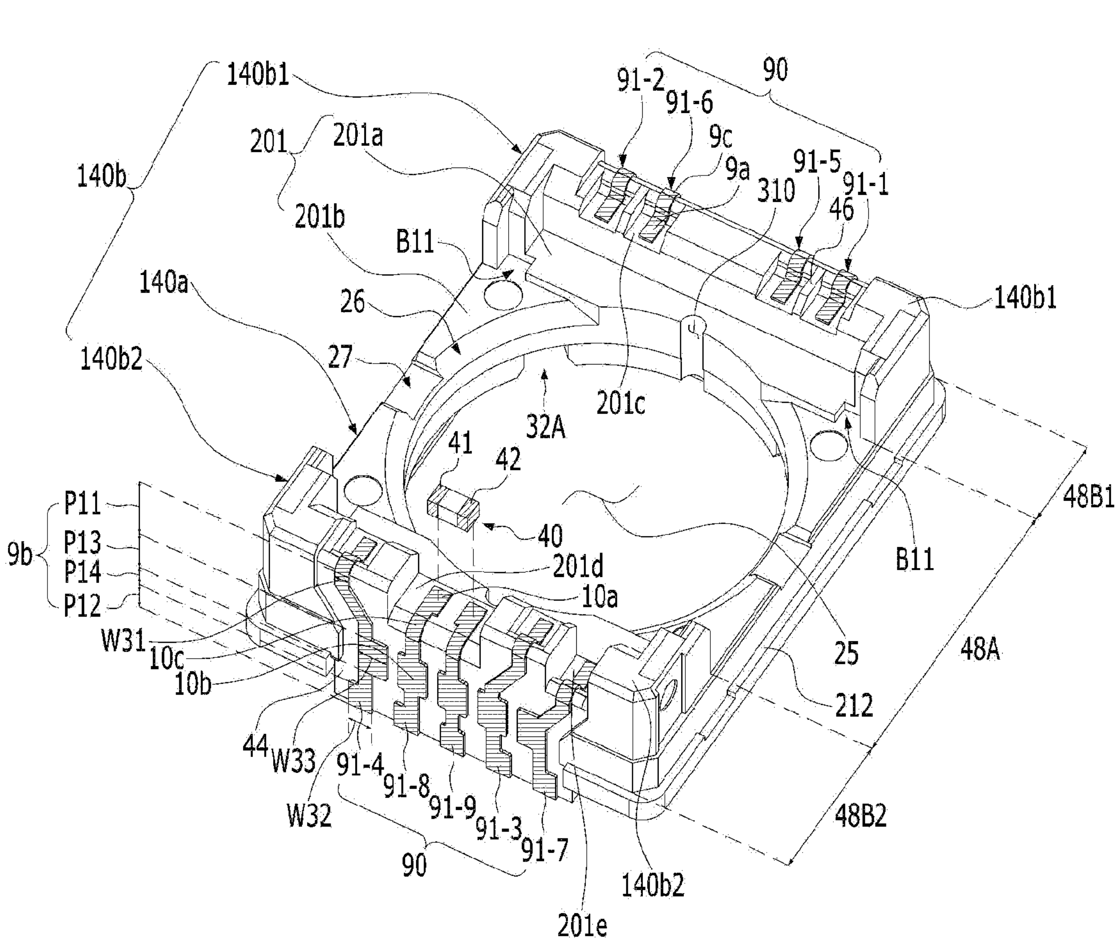
FIG. 12 is a perspective view of the conductive member and the lens holder.
Figure 14:
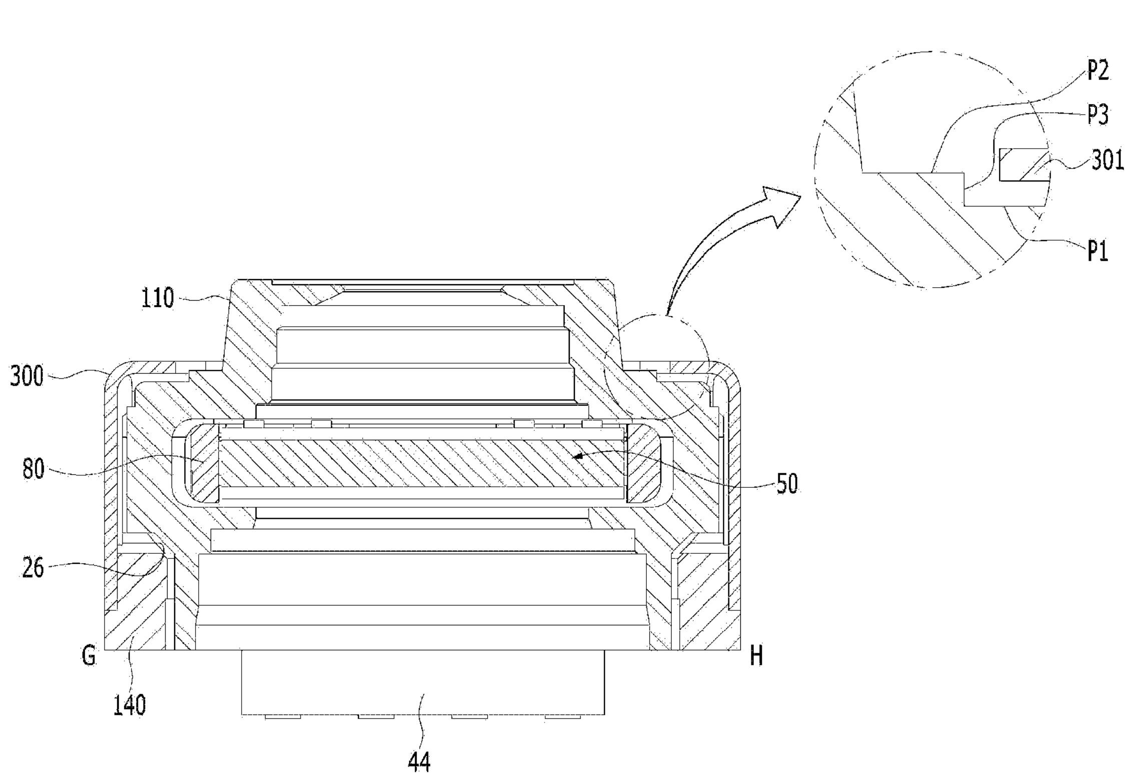
FIG. 14 is a cross-sectional view taken along line GH in the first lens unit and the lens holder in FIG. 11.
Figure 15:
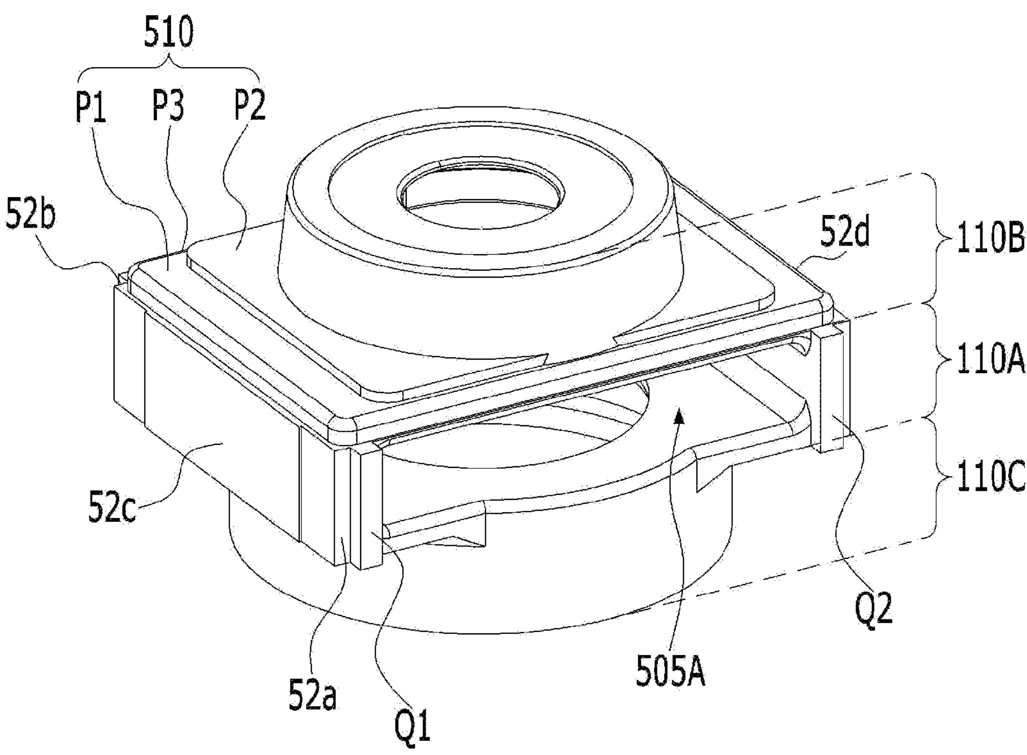
FIG. 15 is a front perspective view of the lens barrel.
Figure 16:
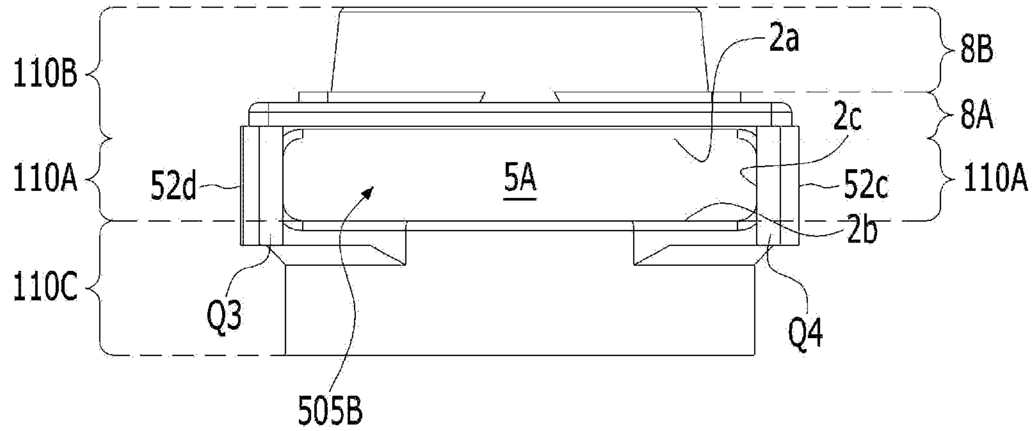
FIG. 16 is a rear side view of the lens barrel in FIG. 15.
Figure 17:
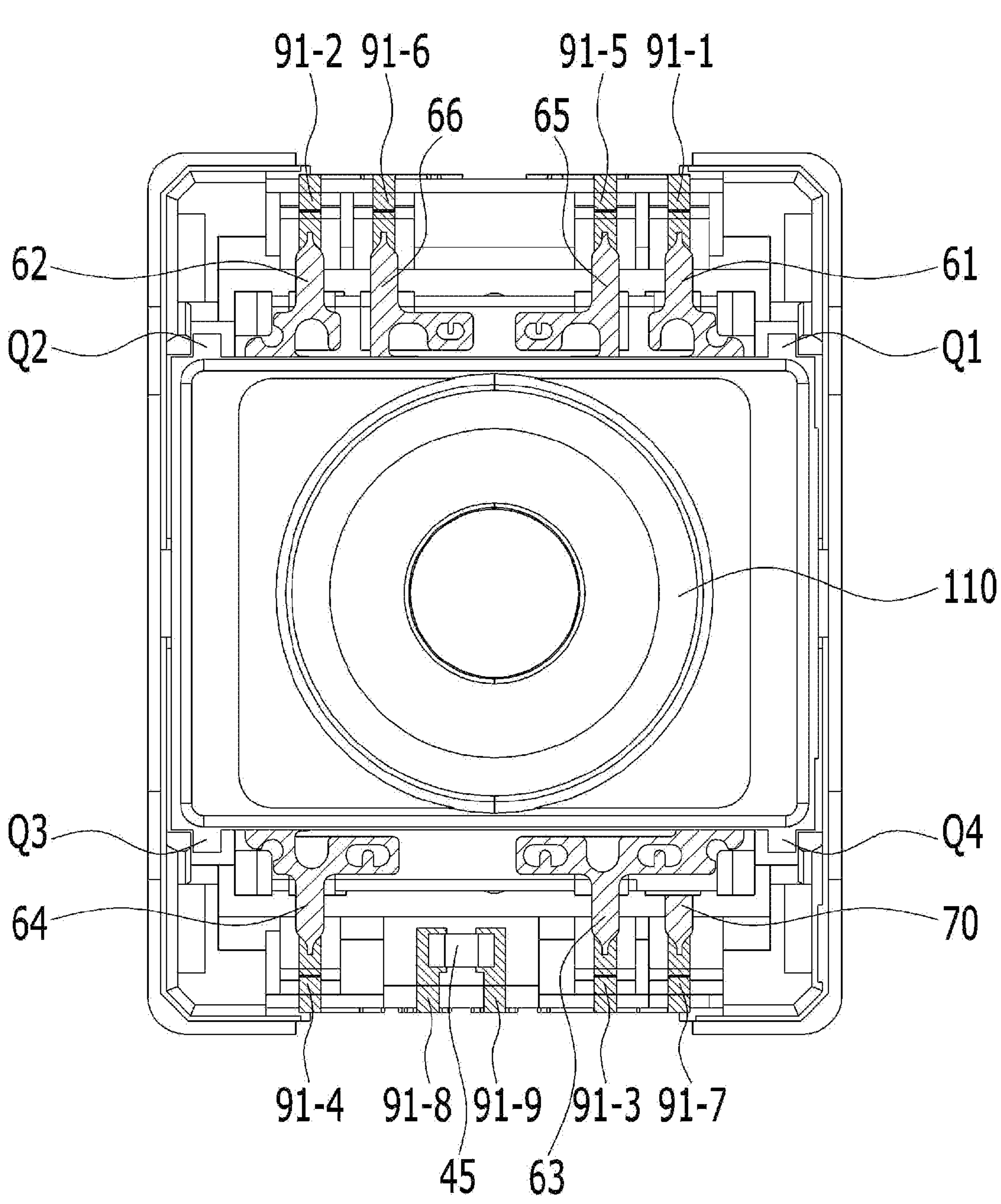
FIG. 17 is a plan view of the lens barrel, the first lens unit, the conductive member, and the lens holder.

FIG. 11 is a perspective view of the first lens unit 130, the conductive member 90, and the lens holder 140 accommodated in the lens barrel 110, FIG. 12 is a perspective view of the conductive member 90 and the lens holder 140, FIG. 13A is a cross-sectional view taken along line CD in the first lens unit 130 and the lens holder 140 in FIG. 11, FIG. 13B is a cross-sectional view taken along line EF in the first lens unit 130 and the lens holder 140 in FIG. 11, FIG. 14 is a cross-sectional view taken along line GH in the first lens unit 130 and the lens holder 140 in FIG. 11, FIG. 15 is a front perspective view of the lens barrel 110, FIG. 16 is a rear side view of the lens barrel 110 in FIG. 15, and FIG. 17 is a plan view of the lens barrel 110, the first lens unit 130, the conductive member 90, and the lens holder 140.

Referring to FIGS. 11 to 17, the lens holder 140 may be disposed under the holder 80, and may accommodate or support the lens barrel 110.

Referring to FIG. 12, the lens holder 140 may include a body 140*a* and at least one protruding portion 140*b*, which protrudes from the upper surface 201 of the body 140*a* in the optical-axis direction.

The body 140*a* may have a hole 25 or a cavity formed therein to allow at least a portion of the lens barrel 110 to be disposed or accommodated therein.

In an example, at least part of a third barrel portion 110C may be disposed in the hole 25 in the lens holder 140.

The hole 25 may have a shape that is the same as or coincides with the shape of at least a portion of the lens barrel 110. The shape of the hole 25 viewed from above may be, for example, a circular shape, an elliptical shape, or a polygonal shape, but the disclosure is not limited thereto. In an example, the hole 25 may be formed through the lens holder 140 in the optical-axis direction.

The protruding portion 140*b* may be provided in a plural number.

In an example, the lens holder 140 may include protruding portions 140*b*1 and 140*b*2, which are located on the upper surface 201 of the body 140*a* so as to be spaced apart from each other.

In an example, the lens holder 140 may include a first protruding portion 140*b*1, which is located at a first side of the body 140*a*, and a second protruding portion 140*b*, which is located at a second side of the body 140*a*. Here, the first side of the body 140*a* may be a region on the upper surface of the body 140*a* that corresponds to the first side or the first side surface 80A of the holder 80, and the second side of the body 140*a* may be a region on the upper surface of the body 140*a* that corresponds to the second side or the second side surface 80B of the holder 80. In an example, the first side and the second side of the body 140*a* may be located opposite each other.

In the embodiment, the lens holder 140 may include a lower surface facing the upper surface of the sensor base 180. The first adhesive 40 may be disposed between the upper surface of the sensor base 180 and the lower surface of the lens holder 140, and may be bonded to the tipper surface of the sensor base 180 and the lower surface of the lens holder 140.

The lens holder 140 may include a partition wall 46 disposed on the body 140*a*.

The partition wall 46 may be disposed on a portion of the body 140*a* that is located between two adjacent conductive portions 91-1 and 91-5, 91-5 and 91-6, or 91-6 and 91-2 disposed on the body 140*a*. In an example, the partition wall 46 may be provided in a plural number.

The plurality of partition walls 46 may be disposed on the upper surface of the body 140*a* so as to be spaced apart from each other, and a portion of at least one conductive portion may be disposed between two adjacent partition walls.

When the second regions 61*b* and 72*b* of the second portions 60-2 and 70-2 of the terminal units 60 and 70 are coupled to the conductive portions 91-1 to 90-9 by means of the conductive adhesive member 69, the partition walls 46 may serve to inhibit an electrical short between adjacent conductive portions.

The body 140*a* of the lens holder 140 may include a first region 48A, in which the hole 25 is formed, and second regions 48B1 and 48B2, in which the protruding portions 140*b* are provided.

In an example, the second region of the body 140*a* may include a 2-1$^{st}$ region 48B1, which is disposed on one side of the first region 48A and in which the first protruding portion 140*b*1 is disposed, and a 2-2$^{nd}$ region 48B2, which is disposed on the opposite side of the first region 48A and in which the second protruding portion 140*b*2 is disposed.

The upper surface 201 of the body 140*a* may include a first surface 201*a* and a second surface 201*b*, which has a height difference with respect to the first surface 201*a*.

In an example, the height of the second surface 201*b* may be lower than the height of the first surface 201*a*. In an example, the distance from the lower surface of the lens holder 140 to the second surface 201*b* may be shorter than the distance from the lower surface of the lens holder 140 to the first surface 201*a*.

In an example, the first surface 201*a* may be at least a portion of the upper surface of the first region 48A of the body 140*a*, and the second surface 201*b* may be at least a portion of the upper surface of the second region 48B of the body 140*a*.

The lens holder 140 may have a recess 27 formed in the second surface 201*b*.

The recess 27 may be recessed in the second surface 201*b* In an example, the recess 27 may be formed adjacent to each of a third side and a fourth side of the body 140*a*. The third side of the body 140*a* may be a region on the upper surface of the body 140*a* that corresponds to the third side or the third side surface 80C of the holder 80, and the fourth side of the body 140*a* may be a region on the upper surface of the body 140*a* that corresponds to the fourth side or the fourth side surface 80D of the holder 80. In an example, the third side and the fourth side of the body 140*a* may be located opposite each other.

The partition walls 46 may be disposed on the upper portions or the upper surfaces of the protruding portions 140*b*1 and 140*b*2.

The lens holder 140 may have recesses (or coupling recesses) 311 formed therein to be coupled to protrusions (or coupling protrusions) Q1 to Q4 of the lens barrel 110.

In an example, the protrusions Q1 to Q4 of the lens barrel 110 may protrude in a direction perpendicular to the optical axis and to the outer side surface of the lens barrel 110.

In an example, the recesses B11 in the lens holder 140 may be recessed in the first surface 201*a* of the lens holder 140. In an example, the recesses B11 may be recessed so as to extend from the first surface 201*a* of the lens holder 140 to the second surface 201*b* thereof.

The recesses B11 in the lens holder 140 may have openings that face the protrusions Q1 to Q4. In an example, the lens barrel 110 may include four protrusions Q1 to Q4, and the lens holder 140 may include four recesses B11 that correspond to or face the four protrusions Q1 to Q4, but the disclosure is not limited thereto. The number of each of the protrusions and the recesses may be one or more.

The lens holder 140 may include a stair 212 or a stepped portion.

The stair 212 may be formed on the outer side surface of the lens holder 140.

The stair 212 may be formed on the lower end of the outer side surface of the lens holder 140.

A side plate 302 of the cover 300 may be disposed on the stair 212. In an example, the stair 212 and the lower end of the side plate 302 of the cover 300 may be coupled to each other, but the disclosure is not limited thereto. In another embodiment, the stair 212 and the lower end of the side plate 302 of the cover 300 may be spaced apart from each other.

The lens holder 140 may have formed therein a recess 32A that serves as a bonding tank, into which an adhesive, for example glue, is applied.

The recess 32A may be formed in the lower surface or the lower portion of the lens holder 140. In an example, the recess 32A may be formed in the lower portion or the lower surface of the first region 48A of the body 140*a*.

In an example, the recess 32A may be formed in the inner circumferential surface or the inner side surface of the lens holder 140, which is defined by the hole 25.

The recess 32A may extend from the lower surface of the lens holder 140, and may be spaced apart from the upper surface of the lens holder 140. An adhesive may be injected into the recess 32A, and the lens holder 140 and the lens barrel 110 may be coupled to each other by means of the injected adhesive.

A vent hole (or a recess) 310, which is a passage through which gas is discharged, may be formed in the inner circumferential surface of the lens holder 140. The vent hole 310 may form a passage between the lens holder 140 and the lens assembly 120 so that the gas generated in the course of curing of the adhesive 40 is discharged to the lens assembly 120.

The conductive member 90 may be disposed on the lens holder 140, and may be conductively connected to the terminal units 60 and 70 of the first lens unit 130. In addition, the conductive member 90 may be conductively connected to the terminals 195 of the substrate 190.

In an example, each of the conductive portions 91-1 to 91-9 of the conductive member 90 may be conductively connected to a corresponding one of the terminals 195 of the substrate 190.

The conductive member 90 may be spaced apart from the cover 300.

The conductive member 90 may include a plurality of conductive portions 91-1 to 91-9, which are spaced apart from each other. Although nine conductive portions are illustrated in FIG. 12, the disclosure is not limited thereto. The conductive member 90 may include any number of conductive portions equal to or greater than one. The conductive portion may alternatively be referred to as a "terminal", a "lead", an "electrode", a "bonding portion", or a "lead frame".

Each of the conductive portions 91-1 to 91-6 of the conductive member 90 may include a first coupling portion 9*a* to be coupled to the second region 61*b* of the second portion 60-2 of the first terminal unit 60, a second coupling portion 9*b* to be connected or coupled to the terminals 195 of the substrate 190, and a connection portion 9*c* interconnecting the first coupling portion 9*a* and the second coupling portion 9*b*.

The conductive portion 91-7 may include a first coupling portion 9*a* to be coupled to the second region 72*b* of the second portion 70-2 of the second terminal unit 70 by means of the conductive adhesive member 69, a second coupling portion 9*b* to be connected or coupled to the terminals 195 of the substrate 190, and a connection portion 9*c* interconnecting the first coupling portion 9*a* and the second coupling portion 9*b*.

In addition, each of the conductive portions 91-8 and 91-9 of the conductive member 90 may include a first coupling portion 10*a* to be coupled to a corresponding one of the first and second electrodes 41 and 42 of the thermistor 45 by means of the conductive adhesive member, a second coupling portion 10*b* to be connected or coupled to the terminals 195 of the substrate 190, and a connection portion 10*c* interconnecting the first coupling portion 10*a* and the second coupling portion 10*b*.

The first coupling portions 9*a* and 10*a* may be in contact with the conductive adhesive member 69.

The conductive adhesive member 69 may include at least one of solder or a conductive adhesive. In an example, the conductive adhesive member 69 may include Ag epoxy. The conductive adhesive member 69 may be disposed between the plurality of partition walls 46 of the lens holder 140.

The first coupling portions 9*a* and 10*a* may be disposed on the protruding portion 140*b* of the lens holder 140. The first coupling portions 9*a* and 10*a* may be disposed on the upper surface of the protruding portion 140*b* of the lens holder 140.

The upper surface of the protruding portion 140*b* may include a first surface 201*c*, a second surface 201*d*, and a third surface 201*e*. In an example, the first surface 201*c* of the upper surface of the protruding portion 140*b* may have a height difference with respect to the first surface 201*a* and the second surface 201*b*.

In an example, the height of the first surface 201*c* of the upper surface of the protruding portion 140*b* may be higher than the height of each of the first surface 201*a* and the second surface 201*b* of the body 140*a*, but the disclosure is not limited thereto. In another embodiment, the first surface 201*c* of the upper surface of the protruding portion 140*b* may be coplanar with the first surface 201*a* of the body 140*a*, or may be coplanar with the second surface 201*b* of the body 140*a*.

The second surface 201*d* of the upper surface of the protruding portion 140*b* may have a first height difference in the optical-axis direction with respect to the first surface 201*c* of the upper surface of the protruding portion, and the third surface 201*e* may have a second height difference in the optical-axis direction with respect to the second surface 201*d*.

In an example, the height of the second surface 201*d* may be lower than the height of the first surface 201*c*, and the height of the third surface 201*e* may be lower than the height of the second surface 201*d*. In another embodiment, the height of the third surface may be higher than or equal to the height of the second surface.

In an example, the first coupling portion 9*a* of each of the conductive portions 91-1 to 91-6, which are coupled to the second region 61*b* of the second portion 60-2 of the first terminal unit 60, may be disposed on the first surface 201*c* of the protruding portion 140*b*.

In an example, the first coupling portion 10*a* of each of the conductive portions 91-8 and 91-9, which are coupled to the terminals 41 and 42 of the thermistor 45, may be disposed on the second surface 201*d* of the protruding portion 140*b*.

In an example, the first coupling portion 9*a* of the conductive portion 91-7, which is coupled to the second region 72*b* of the second portion 70-2 of the second terminal unit 70, may be disposed on the third surface 201*e* of the protruding portion 140*b*.

In an example, the upper surface of the first coupling portion 9*a* may be disposed below the lower surface of the second region 61*b* of the second portion 60-2 of the first terminal unit 60. In addition, the upper surface of the first coupling portion 10*a* may be disposed below the lower surfaces of the first and second electrodes 41 and 42 of the thermistor 45.

The first coupling portions 9*a* of the conductive portions 91-1 to 91-7 may overlap the second regions 61*b* and 72*b* of the second portions 60-2 and 70-2 of the terminal units 60 and 70 in the vertical direction.

The first coupling portions 10*a* of the conductive portions 91-8 and 91-9 may overlap the first and second electrodes 41 and 42 of the thermistor 45 in the vertical direction.

In an example, based on the lower surface of the lens holder 140, the first height of the upper surface of the first coupling portion 10*a* of each of the conductive portions 91-8 and 91-9 may be lower than the second height of the upper surface of the first coupling portion 9*a* of each of the conductive portions 91-1 to 91-6.

In addition, in an example, based on the lower surface of the lens holder 140, the third height of the tipper surface of the first coupling portion 9*a* of the conductive portion 91-7 may be lower than the first height of the upper surface of the first coupling portion 10*a* of each of the conductive portions 91-8 and 91-9 and the second height of the tipper surface of the first coupling portion 9*a* of each of the conductive portions 91-1 to 91-6. In another embodiment, the third height may be equal to or higher than the first height.

In an example, the second coupling portions 9*b* and 10*b* may be disposed on the outer side surface of the lens holder 140, and at least a portion of each of the second coupling portions 9*b* and 10*b* may be exposed from the outer side surface of the lens holder 140. In an example, the second coupling portions 9*b* and 10*b* may be disposed on the outer side surface of the body 140*a* of the lens holder 140 and the outer side surface of the protruding portion 140*b*.

In an example, the second coupling portions 9*b* and 10*b* may protrude below the lower surface of the lens holder 140, but the disclosure is not limited thereto. In another embodiment, the second coupling portion may not protrude below the lower surface of the lens holder 140.

In an example, the lens holder 140 may include a terminal region 44 or a terminal surface, in which the conductive portions are disposed or formed. The terminal region 44 or the terminal surface may protrude below the lower surface of the lens holder 140.

Alternatively, the terminal region 44 may be formed in the shape of a recess that is recessed in the outer side surface of the lens holder 140.

In an example, the second coupling portions 9*b* and 10*b* may include at least one of a linear shape or a curved shape (or a bent shape).

In an example, the connection portion 9*c* may have a curved or bent shape, and may be disposed on the protruding portion 140*b* of the lens holder 140.

Each of the conductive portions 91-1 to 91-9 may be formed such that the width of part thereof is different from the width of the remaining part thereof.

Referring to FIG. 12, each of the second coupling portions 9*b* and 10*b* may include a first portion P11, which is coupled to a corresponding one of the connection portions 9*c* and 10*c*, a second portion P12, which is coupled to the terminal 195 of the substrate 190, and a third portion P13, which is disposed between the first portion P11 and the second portion P12. In addition, the second coupling portion 9*b* may further include a fourth portion P14 interconnecting the second portion P12 and the third portion P13.

In an example, the width W33 of the third portion P13 may be greater than the width W31 of the first portion P11 and the width W32 of the second portion P12. When active alignment is performed, the third portion P13 may be gripped using a gripper in order to apply a drive signal (or drive voltage) to the liquid lens 50 and the thermistor 45. Since the width W33 of the third portion P13 is relatively large (W33>W31 and W33>W32), drive voltage may be stably supplied to the liquid lens 50 while active alignment is performed.

In addition, in an example, the width W32 of the second portion P12 may be greater than the width W31 of the first portion P11. Accordingly, conductive contact between the terminal 195 of the substrate 190 and the conductive portion may be reliably realized.

Although the conductive adhesive member 69 is described as being provided separately from the conductive member 90, the conductive adhesive member 69 may be embodied as a component of the conductive member 90.

In the embodiment, portions of the terminal units 60 and 70 of the first lens unit 130 may be embedded in the conductive adhesive member 69. Accordingly, conductive connection may be achieved without applying external pressure to the terminal units 60 and 70 of the first lens unit 130.

Meanwhile, in the embodiment, it is possible to ensure stable resistance by increasing the contact area of the conductive adhesive member 69 between the terminal units 60 and 70 of the first lens unit 130 and the conductive member 90.

Each of the conductive portions 91-1 to 91-9 of the conductive member 90 may include a conductive layer formed on the surface of the lens holder 140. In this case, the conductive layer may be formed on the surface of the lens holder 140 using a molded interconnection device (MID) technology.

The conductive layer may extend along the upper surface 201 of the lens holder 140 and the outer side surface of the lens holder 140. The conductive layer may be connected at one end thereof to the terminal 195 of the substrate 190, and may be connected at the other end thereof to the terminal units 60 and 70 of the first lens unit 130.

In a modification, the conductive layer of each of the conductive portions 91-1 to 91-9 of the conductive member 90 may be formed on the lens holder 140 through insert injection molding. In an example, the conductive members 91-1 to 91-9 may be formed in a manner such that the same are coupled to the lens holder 140 through insert injection molding.

In a modification, the conductive portions 91-1 to 91-9 of the conductive member 90 may be structured such that separate terminals are bonded to the lens holder 140.

The thermistor 45 may detect the temperature of the camera module 100. For example, the thermistor 45 may detect the temperature of the liquid lens 50, or may inhibit the value of current flowing through the liquid lens from exceeding a predetermined value.

For example, the thermistor 45 may be embodied as a thermistor in which a resistance value varies depending on changes in temperature, but the disclosure is not limited thereto. The thermistor 45 may include a first electrode 41 and a second electrode 42, and a drive signal (e.g. drive voltage or drive current) may be supplied to the first electrode 41 and the second electrode 42.

The first and second electrodes 41 and 42 of the thermistor 45 may be conductively connected to the conductive portions 91-8 and 91-9 via a conductive adhesive member.

In an example, the first and second electrodes 41 and 42 of the thermistor 45 may be coupled to the first coupling portions 10*a* of the conductive portions 91-8 and 91-9 by means of a conductive adhesive member.

The thermistor 45 may be disposed in a recess formed in the center of the second protruding portion 140*b*2. In this case, the bottom surface of the recess may be the second surface 201*d* of the upper surface of the protruding portion 140*b*.

The cover 300 may cover the lens holder 140, and may accommodate the lens holder 140.

The cover 300 may define the external appearance of the camera module 100. The cover 300 may be formed in the shape of a polyhedron, for example, a hexahedron, which is open at the lower surface thereof.

The cover 300 may be a nonmagnetic body. The cover 300 may be made of a metal material.

For example, the cover 300 may be embodied as a metal plate.

The cover 300 may be connected to the ground of the substrate 190. Accordingly, the cover 300 may be grounded. The cover 300 may block electromagnetic interference (EMI). In this case, the cover 300 may be referred to as an "EMI shield can". In another embodiment, the cover 300 may not be conductively connected to the ground of the substrate 190.

The cover 300 may include an upper plate 301 and a side plate 302 extending from the upper plate 301. The upper plate 301 of the cover 300 may have a bore (or a hole) 303 formed therein to expose at least a portion of the lens barrel 110 therethrough.

The side plate 302 of the cover 300 may have a bore formed therein to expose at least a portion of the conductive member 90 therethrough. In an example, the bore in the side plate 302 of the cover 300 may expose the second coupling portion 9*b* of at least one of the conductive portions 91-1 to 91-9.

Referring to FIGS. 15 and 16, the lens barrel 110 may include a first barrel portion 110A in which the first lens unit 130 is disposed or accommodated, a second barrel portion 110B in which the second lens unit 112 is disposed or accommodated, and a third barrel portion 110C in which the third lens unit 113 is disposed or accommodated.

The second barrel portion 110B may be disposed on the first barrel portion 110A, and the third barrel portion 110C may be disposed under the first barrel portion 110A.

The first barrel portion 111A may include a body and an accommodation space 5A defined in the body. The first lens unit 130 may be disposed in the accommodation space 5A in the body of the first barrel portion 110A. The accommodation space 5A may have a shape suitable for accommodating the first lens unit 130. Here, the "accommodation space" may alternatively be referred to as a "space".

In an example, the first barrel portion 110A may include an inner upper surface 2*a*, an inner lower surface 2*b*, and an inner side surface 2*c* interconnecting the inner upper surface 2*a* and the inner lower surface 2*b* in order to define the accommodation space 5A.

The first barrel portion 110A may include a first side surface (or a first outer side surface) 52*a* and a second side surface (or a second outer side surface) 52*b*, which are located opposite each other, and a third side surface (or a third outer side surface) 52*c* and a fourth side surface (or a fourth outer side surface) 52*c*, which interconnect the first side surface 52*a* and the second side surface 52*b* and are located opposite each other. In an example, the accommodation space 5A in the first barrel portion 110A may be defined inside the first to fourth side surfaces 52*a* to 52*d* of the first barrel portion 110A.

At least one of the first side surface 52*a* or the second side surface 52*b* of the first barrel portion 110A may have at least one opening 505A or 505B formed therein to allow the first lens unit 130 to be inserted thereinto or to be assembled thereto.

In an example, as shown in FIGS. 15 and 16, the first barrel portion 110A may have a first opening 505A formed in the first side surface 52*a* and a second opening 505B formed in the second side surface 52*b*.

By virtue of the first and second openings 505A and 505B, the accommodation space 5A in the first barrel portion 110A may be open toward the outside of the body of the first barrel portion 110A.

In an example, one end of the first lens unit 110A may project outside the first opening 505A in the first barrel portion 110A, and the other end of the first lens unit 110A may project outside the second opening 505B in the first barrel portion 110A.

The second barrel portion 110B may protrude from the upper portion of the body of the first barrel portion 110A. In an example, the second barrel portion 110B may protrude from the upper part of the first barrel portion 110A in the optical-axis direction or the upward direction.

In an example, the second barrel portion 110B may include a first body 8A and a second body 8B disposed on the first body 8A.

The upper surface of the first body 8A of the second barrel portion 110B may include a stepped portion 510, which includes a first surface P1, a second surface P2 having a height difference with respect to the first surface P1 in the optical-axis direction, and a third surface P3 interconnecting the first surface P1 and the second surface P2.

The second surface P2 of the upper surface of the first body 8A may be contiguous with the second body 8B, and the first surface P1 of the upper surface of the first body 8A may be contiguous with the upper portion or the upper end of the side surface of the first body 8A.

Referring to FIG. 15, the stepped portion 510 of the second barrel portion 110B may include a first stepped portion disposed on one side of the second body 8B of the second barrel portion 110B and a second stepped portion disposed on the opposite side of the second body 8B of the second barrel portion 110B.

At least part of the second barrel portion 110B may be exposed through the bore 303 in the cover 300. In an example, the second body 8B of the second barrel portion 110B may be exposed through the bore 303 in the cover 300. In an example, the second body 8B of the second barrel portion 110B may project outside the cover 300 through the bore 303 in the cover 300.

In an example, the second surface P2 of the first body 8A of the second barrel portion 110B may be exposed through the bore 303 in the cover 300. In addition, in an example, a region on the first surface P1 that is adjacent to the third surface P3 of the first body 8A of the second barrel portion 1 OB may be exposed through the bore 303 in the cover 300.

The second surface P2 of the first body 8A of the second barrel portion 110B may be located inside the cover 300. In an example, the second surface P2 of the first body 8A of the second barrel portion 110B may be located below the upper surface 301 of the cover 300.

The diameter of the bore 303 in the cover 300 may be larger than the diameter of the outer circumference of the second body 8B.

The inner surface of at least a portion of the upper plate 301 of the cover 300 may face or overlap the first surface P1 of the second barrel portion 110B of the lens barrel 110 in the optical-axis direction.

In an example, the inner surface of a portion of the upper plate 301 of the cover 300, which is adjacent to the bore 303, may face or overlap the first surface P1 of the second barrel portion 110B in the optical-axis direction.

In addition, the upper plate 301 of the cover 300 may not face or overlap the second surface P2 of the second barrel portion 110B in the optical-axis direction.

In addition, referring to FIG. 14, in an example, the inner surface of the upper plate 301 of the cover 300 may be located at a higher position than the first surface P1 of the second barrel portion 110B. In addition, in an example, the inner surface of the upper plate 301 of the cover 300 may be located at a lower position than the second surface P2 of the second barrel portion 110B. In another embodiment, the inner surface of the upper plate 301 of the cover 300 may be located at the same height as the second surface P2 of the second barrel portion 110B. Accordingly, it is possible to avoid spatial interference between the upper plate 301 of the cover 300 and the second surface P2 of the second barrel portion 110B, thus inhibiting an increase in the length (or the height) of the camera module 100 in the optical-axis direction.

That is, spatial interference between the stepped portion 510 and the cover 300 may be inhibited by the bore 303 in the cover 300.

The second body 8B of the second barrel portion 110B may be formed in a cylindrical shape, but the disclosure is not limited thereto. The second body of the second barrel portion may be formed in any of various shapes.

The included angle between the outer side surface of the second body 8B and the second surface P2 of the first body 8A may be an obtuse angle. In an example, the second body 8B may be formed to be inclined with respect to the second surface P2, and thus it is possible to inhibit deformation of an injection-molded product when the injection-molded product is taken out of or separated from a mold in an injection molding process for formation of the lens barrel. In another embodiment, the included angle between the outer side surface of the second body 8B and the second surface P2 of the first body 8A may be a right angle.

The second barrel portion 110B may have an accommodation space formed therein to accommodate the second lens unit 112, and the third barrel portion 110C may have an accommodation space formed therein to accommodate the third lens unit 113.

The inside of the first barrel portion 110A, the inside of the second barrel portion 110B, and the inside of the third barrel portion 110C may communicate with one another.

In an example, the first barrel portion 110A may have a third opening formed therein to allow the accommodation space 5A1 in the first barrel portion 110A and the accommodation space in the second barrel portion 110B to communicate with each other. In an example, the third opening in the first barrel portion 110A may be formed in the inner upper surface 2*a* of the first barrel portion 110A.

In addition, the first barrel portion 110A may have a fourth opening formed therein to allow the accommodation space 5A in the first barrel portion 110A and the accommodation space in the third barrel portion 110C to communicate with each other. In an example, the fourth opening in the first barrel portion 110A may be formed in the inner lower surface 2*b* of the first barrel portion 110A.

In an example, the length of the accommodation space 5A in the first barrel portion 110A in the crosswise direction may be longer than the length of each of the accommodation space in the second barrel portion 110B and the accommodation space in the third barrel portion 1*b*OC in the crosswise direction. Here, the crosswise direction may be a direction that is perpendicular to the optical-axis direction and is oriented toward the fourth side surface 52*d* of the lens barrel 110 from the third side surface 52*c* thereof. In addition, in an example, the accommodation space in the second barrel portion 110B may be smaller than the accommodation space in the third barrel portion 110C, but the disclosure is not limited thereto. In another embodiment, the former may be equal to or larger than the latter.

In addition, in an example, the length of the first lens unit 130 in the crosswise direction may be shorter than the length of the accommodation space 5A in the first barrel portion 110A in the crosswise direction. In addition, in an example, the length of the first lens unit 130 in the lengthwise direction may be longer than the length of the accommodation space 5A1 in the first barrel portion 110 in the lengthwise direction, but the disclosure is not limited thereto. In another embodiment, the former may be equal to the latter. Here, the lengthwise direction may be a direction that is perpendicular both to the optical-axis direction and to the crosswise direction. Alternatively, the lengthwise direction may be a direction that is perpendicular to the optical-axis direction and is oriented toward the second side surface 52*b* of the lens barrel 110 from the first side surface 52*a* thereof.

The second barrel portion 110B may have an opening formed therein to expose at least a portion of the second lens unit 112, for example an uppermost lens, therethrough.

In an example, the inner wall of the second barrel portion 110B, which defines the accommodation space in the second barrel portion 110B, may have at least one stepped structure. The peripheral region of the lens of the second lens unit 112 may be in surface contact with the stepped structure, but the disclosure is not limited thereto.

The third barrel portion 110C may have an opening formed therein to expose at least a portion of the third lens unit 113, for example a lowermost lens, therethrough. In an example, the inner wall of the third barrel portion 110C, which defines the accommodation space in the third barrel portion 110C, may have at least one stepped structure. The peripheral region of the lens of the third lens unit 113 may be in surface contact with the stepped structure, but the disclosure is not limited thereto.

The third surface P3 of the stepped portion 510 of the second barrel portion 110B may overlap the accommodation space 5A in the first lens unit 110A in the optical-axis direction. Accordingly, by virtue of the accommodation space 5A in the first lens unit 110A, it is possible to inhibit the rigidity of the second barrel portion 110B of the lens barrel 110 from being reduced and to increase the rigidity of the second barrel portion 110B.

In addition, in an example, the second body 8B and the second surface P2 of the first body 8A of the second barrel portion 110B may overlap the accommodation space 5A in the first lens unit 110A in the optical-axis direction. Accordingly, by virtue of the accommodation space 5A1 in the first lens unit 110A, it is possible to inhibit the rigidity of the second barrel portion 110B of the lens barrel 110 from being reduced and to increase the rigidity of the second barrel portion 110B.

The height from the first barrel portion 110A to the second surface P2 of the first body 8A of the second barrel portion 110B may be higher than the height from the first barrel portion 110A to the first surface of the first body 8A of the second barrel portion 110B.

Since the second barrel portion 110B includes the stepped portion 510, the area of the outer circumferential surface of the second barrel portion 110B or the area of a cross-section of the second barrel portion 110B taken along line AB may increase due to the stepped portion 510.

Due to the increase in the area of the outer circumferential surface of the second barrel portion 110B or the area of a cross-section of the second barrel portion 110B taken along line AB, the load that is intensively applied to the second barrel portion 110B by external force during an assembly process may be dispersed. Accordingly, the embodiment may inhibit deformation of the lens barrel 110 due to external force applied thereto during an assembly process. Here, the assembly process may include at least one of assembly between the lens barrel 110 and the lens assembly 120 or assembly between the lens barrel 110 and the lens holder 140.

Since the thickness of the first body 8A disposed between the first barrel portion 110A and the second body 8B of the second barrel portion 110B increases due to the stepped portion 510, it is possible to increase the rigidity of the lens barrel 110, thus improving the reliability of the rigidity of the lens barrel 110.

The first barrel portion 110A may include one or more protrusions Q1 to Q4, which protrude from at least one of the first side surface 52*a* or the second side surface 52*b* of the first barrel portion 110A.

The one or more protrusions Q1 to Q4 may protrude in a direction perpendicular to the optical axis.

The first protrusion Q1 may be located on one side of the first opening 505A in the first barrel portion 110A, and the second protrusion Q2 may be located on the opposite side of the first opening 505A in the first barrel portion 110A. In an example, the first opening 505A in the first barrel portion 110A may be disposed between the first protrusion Q1 and the second protrusion Q2.

The third protrusion Q3 may be located on one side of the second opening 505B in the first barrel portion 110A, and the fourth protrusion Q4 may be located on the opposite side of the second opening 505B in the first barrel portion 110A. In an example, the second opening 505B in the first barrel portion 110A may be disposed between the third protrusion Q3 and the fourth protrusion Q4.

Each of the protrusions Q1 to Q4 of the lens barrel 110 may be disposed in or inserted into a corresponding one of the recesses B1 to B4 in the lens holder 140.

When the lens barrel 110 is assembled or coupled to the lens holder 140, the protrusions Q1 to Q4 of the lens barrel 110 may inhibit rotation of the lens barrel 110, or may inhibit rotation of the lens barrel 110 beyond a predetermined angle.

If the protrusions Q1 to Q4 of the lens barrel 110 and the recesses B1 to B4 in the lens holder 140 according to the embodiment are not provided, the lens barrel may be rotated and thus may project outwards from the lens holder 140 during assembly of the lens barrel with the lens holder, and the cover and the lens barrel may collide with each other and thus the lens barrel and/or the cover may be deformed during assembly of the cover with the lens holder. The embodiment may inhibit collision between the lens barrel and the cover, thereby inhibiting the lens barrel and/or the cover from being deformed or damaged.

In order to stabilize the performance of a liquid lens, which is included in a camera module mounted on the front surface of a mobile device, for example, a cellular phone, the size of the liquid lens may be increased. When the size of the liquid lens is increased for this reason, the size of a holder, on which the liquid lens is seated, may also be increased, and the size of an accommodation space in a lens barrel, into which the holder is inserted or mounted, may also be increased.

However, when only the size of the accommodation space is increased without increasing the size of the lens barrel due to restrictions on the size of the camera module mounted on the front surface of the cellular phone, the thickness of a portion of the lens barrel, for example a second lens unit, may be decreased, and thus the rigidity of the lens barrel may be decreased. When the rigidity of the lens barrel is decreased, the lens barrel may undergo deformation or damage caused by external force during assembly of the lens barrel with the lens assembly and assembly of the lens barrel with the lens holder, thereby deteriorating the performance and the reliability of the camera module.

According to the embodiment, by virtue of the stepped portion 510 of the lens barrel 110, the rigidity of the lens barrel 110 may be increased without increasing the size of the camera module. As a result, it is possible to inhibit deformation of the lens barrel due to external force during an assembly process and to inhibit deterioration in the reliability of the camera module.

In the liquid lens 50, an inflection point may occur in operation depending on the temperature. In order to manage the inflection point of the liquid lens 50, the liquid lens 50 may be provided with a temperature sensor for measuring the temperature of the liquid lens 50. Information on the temperature measured by the temperature sensor may be provided to a controller of the camera module, for example, a driver IC. The driver IC may perform control in response to a drive signal using the temperature information in order to manage the inflection point of the liquid lens.

In addition, in order to inhibit deterioration in the performance of the liquid lens 50 due to a decrease in the temperature of the liquid lens 50, the liquid lens 50 may include a heater for controlling the temperature of the liquid lens 50.

Figure 10A:
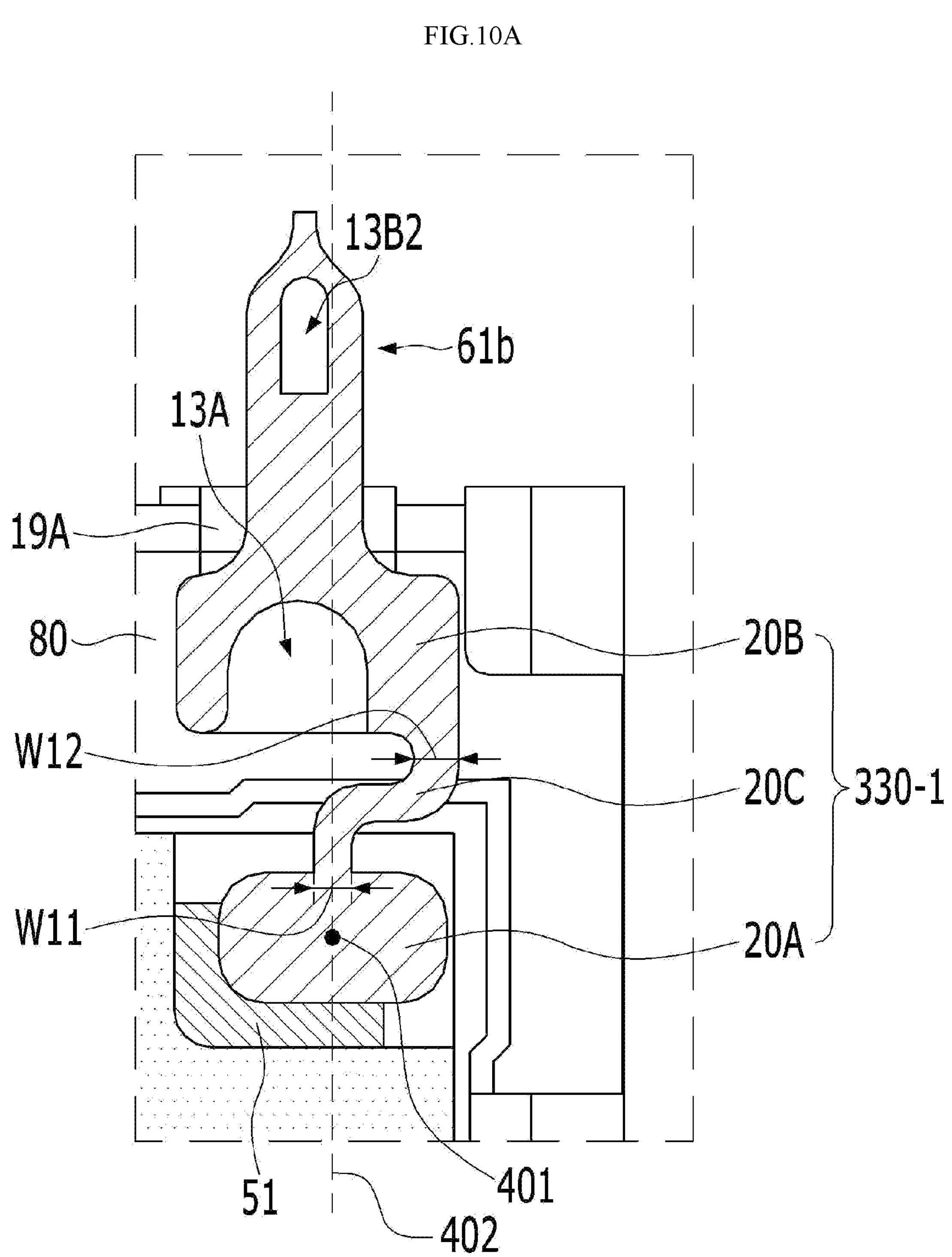
FIG. 10A illustrates a terminal unit according to another embodiment.

FIG. 10A illustrates a terminal unit 330-1 according to another embodiment.

Referring to FIG. 10A, the terminal unit 330-1 may include a first portion 20A coupled to the electrode 51 or 52 of the liquid lens 50, a second portion 20B disposed on the holder 80, and a third portion 20C interconnecting the first portion 20A and the second portion 20B.

The shape of each of the first portions 60-1 and 70-1 of the terminal units 60 and 70 viewed from above in FIGS. 8 and 9 may be a polygonal shape (e.g. a quadrangular shape, a rectangular shape, or a square shape), but the disclosure is not limited thereto.

The shape of the first portion 20A of the terminal unit 330-1 viewed from above in FIG. 10A may be a quadrangular shape (e.g. a rectangular shape) having curved or rounded corners.

In another embodiment, the shape of the first portion of the terminal unit viewed from above may be an elliptical or circular shape.

In FIGS. 8 and 9, the widths W1 and W2 of the third portions 60-3 and 70-3 of the first and second terminal units 60 and 70 may be constant from one ends of the third portions 60-3 and 70-3 to the other ends of the third portions 60-3 and 70-3, but the disclosure is not limited thereto.

As shown in FIG. 10A, the width of part of the third portion 20C of the terminal unit 330-1 may be different from the width of another part of the third portion 20C of the terminal unit 330-1.

In an example, the width W11 of one end of the third portion 20C, which is connected to the first portion 20A, may be smaller than the width W12 of the other end of the third portion 20C, which is connected to the second portion 20B.

In another embodiment, the width of one end of the third portion 20C, which is connected to the first portion 20A, may be larger than the width of the other end of the third portion 20C, which is connected to the second portion 20B. The description of the terminal unit in FIG. 10A may also apply to at least one of the first terminal unit 60 or the second terminal unit 70.

In addition, part of the third portion 20C may be disposed on the holder 80. In an example, one end of the third portion 20C, which is connected to the second portion 20B, and a region adjacent thereto may be disposed on the holder 80.

Referring to FIG. 10A, one end of the third portion 20C may be connected or coupled to the outer surface or the outer side of the first portion 20A, which is adjacent to and faces the third portion 20C (or the second portion 20B), and may be spaced apart from a corner (or an edge) of the first portion 20A.

In an example, when viewed from above, one end of the third portion 20C may overlap the reference line 402. In addition, when viewed from above, the other end of the third portion 20C, which is connected or coupled to the second portion 20B, may be located on one side of the reference line 402, and may not overlap the reference line 402.

In another embodiment, one end of the third portion 20C may be connected or coupled to any one of the corners (or the edges) of the first portion 20A that are adjacent to and face the third portion 20C (or the second portion 20B).

Figure 10B:
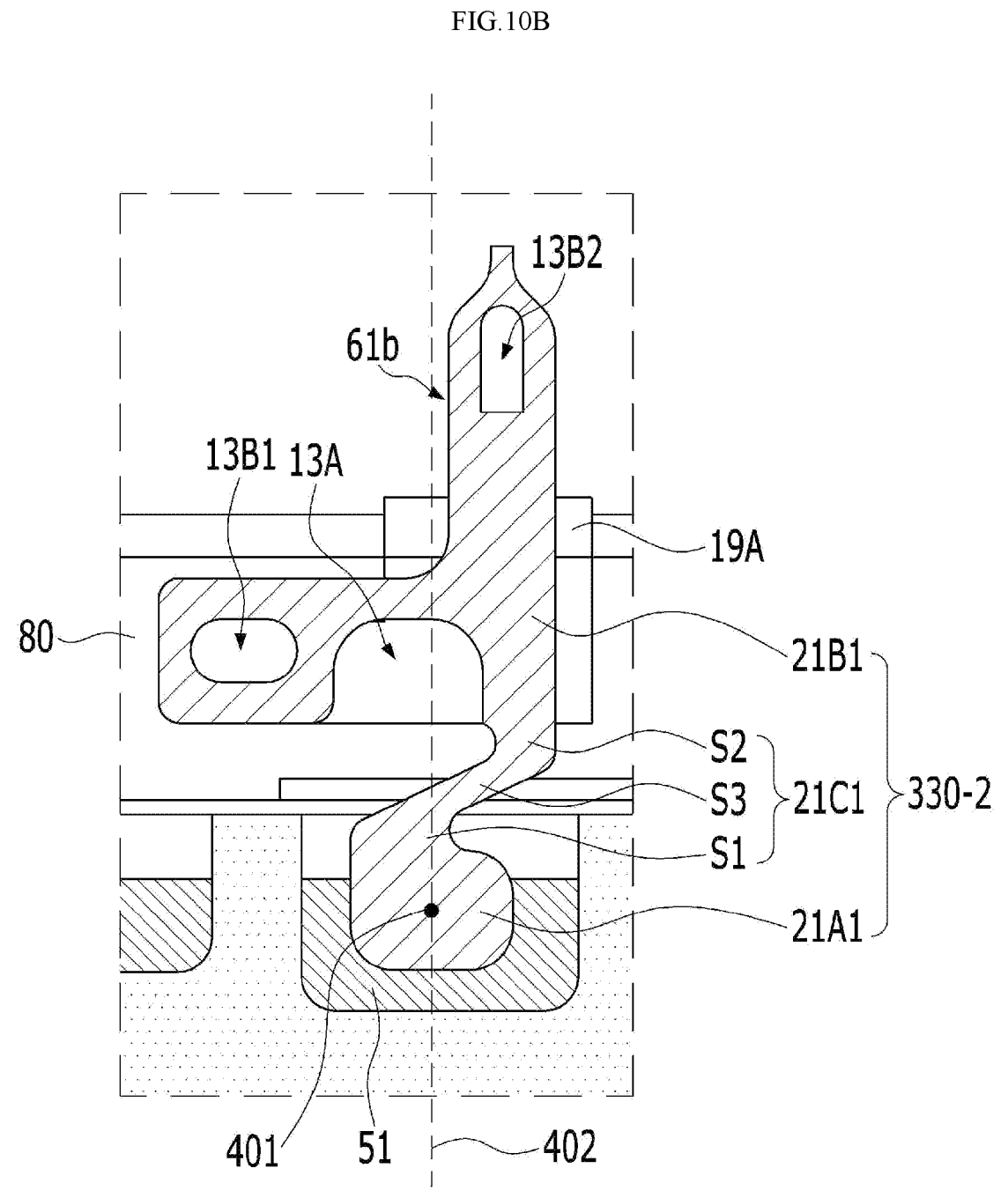

FIG. 10B illustrates a terminal unit 330-2 according to still another embodiment.

Referring to FIG. 10B, the terminal unit 330-2 may include a first portion 21A1 coupled to the electrode 51 or 52 of the liquid lens 50, a second portion 21B1 disposed on the holder 80, and a third portion 21C1 interconnecting the first portion 21A1 and the second portion 21B1.

Referring to FIG. OB, with regard to the shape of the first portion 21A1 viewed from above, reference may be made to the description of the shapes of the first portions 60-1, 70-1, and 20A shown in FIGS. 8, 9, and 10A.

The third portion 21C1 may include at least one linear portion and at least one curved portion or bent portion.

In an example, the third portion 21C1 may include a first region S1 connected to the first portion 21A1, a second region S2 connected to the second portion 21B1, and a third region S3 interconnecting the first region S1 and the second region S2.

Each of the first region S1 and the second region S2 may include a curved or bent portion. The second region may take the form of a straight line or an oblique line, but the disclosure is not limited thereto.

The third portion 21C1 may be formed such that the width thereof gradually decreases and then increases in the direction from the first region S1 toward the second region S2.

In an example, the third portion 21C1 may include a 3-1$^{st}$ portion (e.g. S1), which gradually decreases in width in the direction from the first region S1 toward the second region S2, and a 3-2$^{nd}$ portion (e.g. S2), which gradually increases in width in the direction from the first region S1 toward the second region S2. In addition, the third portion 21C1 may further include a 3-3$^{rd}$ portion (e.g. S3), which is formed between the 3-1$^{st}$ portion (e.g. S1) and the 3-2$^{nd}$ portion (e.g. S2) and has a constant width.

In an example, the width of the first region S1 may be larger than the width of the third region S3, and the width of the second region S2 may be larger than the width of the third region S3.

In addition, part of the third portion 21C1 may be disposed on the holder 80. In an example, one end of the third portion 21C, which is connected to the second portion 21B1, and a region adjacent thereto may be disposed on the holder 80.

One end of the third portion 21C1 may be connected or coupled to any one of two corners (or edges) of the first portion 21A 1 that are adjacent to and face the third portion 20C1 (or the second portion 20B1).

The other end of the third portion 21C1 may be connected or coupled to part of the second portion 21B1.

In an example, one end of the third portion 21C1 and the other end of the third portion 21C1 may be located opposite each other with respect to the reference line 402. When viewed from above, one end of the third portion 21C1 and the other end of the third portion 21C1 may not overlap the reference line 402.

Figure 10C:
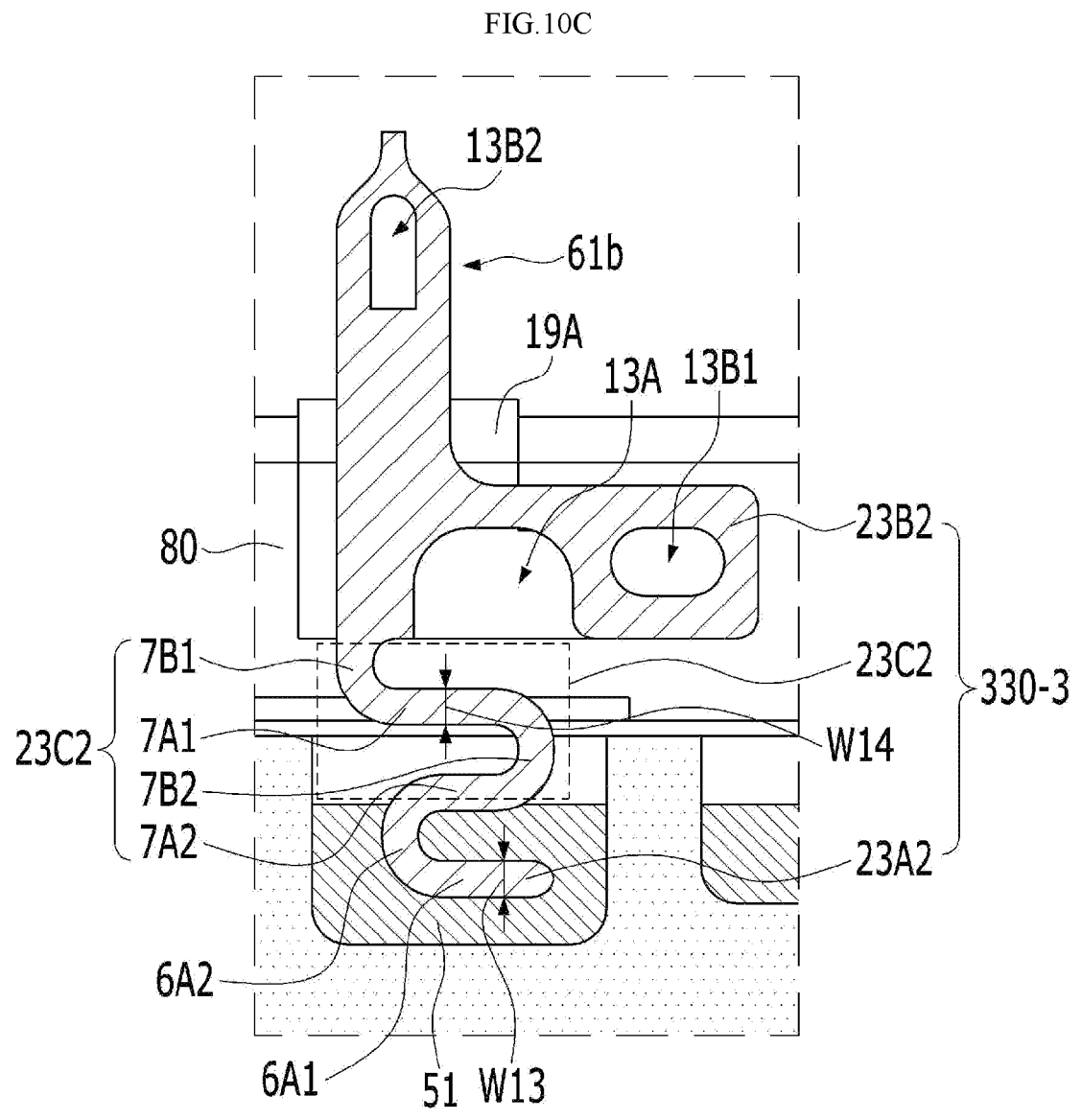

FIG. 10C illustrates a terminal unit 330-3 according to still another embodiment.

Referring to FIC. 10C, the terminal unit 330-3 may include a first portion 21A2 coupled to the electrode 51 or 52 of the liquid lens 50, a second portion 21B2 disposed on the holder 80, and a third portion 21C2 interconnecting the first portion 21A2 and the second portion 21B2.

The first portion 21A2 may include at least one curved, bent, or rounded portion.

The third portion 23C2 may include at least one curved, bent, or rounded portion.

The width W13 of the first portion 21A2 may be equal to the width W14 of the third portion 23C2.

The first portion 21A2 may include at least one linear portion 6A1 and at least one bent portion 6A2. The at least one bent portion 6A2 may be connected to one end of the third portion 23C2.

The at least one linear portion 61A1 of the first portion 21A2 may be parallel to the horizontal direction (e.g. the crosswise direction). Here, the horizontal direction may be a direction that is perpendicular to the direction from the first portion 23A2 toward the second portion 23B2.

The third portion 23C2 may include one or more linear portions 7A1 and 7A2 and one or more bent portions 7131 and 7132.

The linear portions 7A1 and 7A2 of the third portion 23C2 may be parallel to the horizontal direction (e.g. the crosswise direction). In an example, the third portion 23C2 may include a plurality of linear portions 7A1 and 7A2, which are spaced apart from each other, and a plurality of bent portions 7B1 and 7B2, which are spaced apart from each other.

Each of the plurality of linear portions 7A1 and 7A2 may be parallel to the horizontal direction (e.g. the crosswise direction). One (e.g. 7A2) of the linear portions 7A1 and 7A2 may be connected to one end (e.g. 6A2) of the first portion 23A2.

In addition, the bent portion 7B1 may connect one (e.g. 7A1) of the linear portions 7A1 and 7A2 to the second portion 23B2. In addition, the bent portion 7B2 may interconnect the two adjacent linear portions 7A1 and 7A2.

In another embodiment, one of the bent portions of the third portion may be connected to one end of the first portion. In still another embodiment, one of the linear portions of the third portion may be connected to the second portion.

The width of the linear portion and the width of the bent portion may be equal to each other. In another embodiment, the width of the bent portion may be larger than the width of the linear portion. In still another embodiment, the width of the bent portion may be smaller than the width of the linear portion.

Figure 10D:
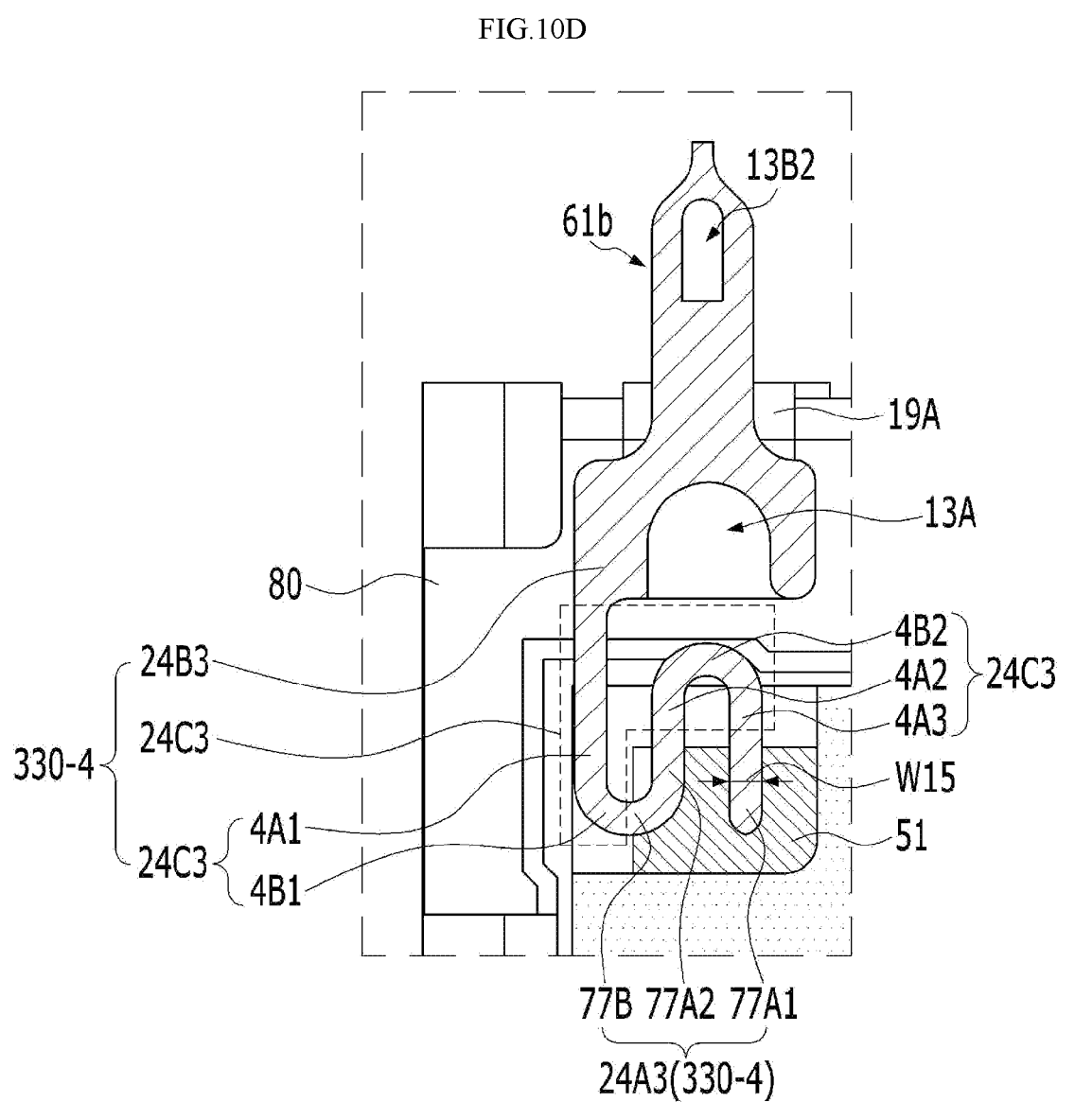

FIG. 10D illustrates a terminal unit 330-4 according to still another embodiment.

Referring to FIG. 10D, the terminal unit 330-4 may include a first portion 21A3 coupled to the electrode 51 or 52 of the liquid lens 50, a second portion 21B3 disposed on the holder 80, and a third portion 21C3 interconnecting the first portion 21A3 and the second portion 21B3.

The first portion 21A3 may include at least one curved, bent, or rounded portion. The third portion 23C3 may include at least one curved, bent, or rounded portion.

The width W15 of the first portion 21A3 may be equal to the width W16 of the third portion 23C3.

The first portion 21A3 may include one or more linear portions 77A1 and 77A2 and at least one bent portion 77B. The at least one bent portion 77B may be connected to one end (e.g. 4A5) of the third portion 23C2.

The one or more linear portions 77A1 and 77A2 of the first portion 21A3 may be parallel to the vertical direction (e.g. the lengthwise direction). Here, the vertical direction may be a direction that is parallel to the direction from the first portion 23A2 toward the second portion 2312. For example, the vertical direction may be a direction perpendicular to the horizontal direction in FIG. 10C.

The third portion 23C3 may include one or more linear portions 4A1, 4A2, and 4A3 and one or more bent portions 4B1 and 4B2.

The linear portions 4A1, 4A2, and 4A3 of the third portion 23C3 may be parallel to the vertical direction (e.g. the lengthwise direction). In an example, the third portion 23C3 may include a plurality of linear portions 4A1, 4A2, and 4A3, which are spaced apart from each other, and a plurality of bent portions 4B1 and 4B2, which are spaced apart from each other.

Each of the plurality of linear portions 4A1, 4A2, and 4A3 may be parallel to the vertical direction.

In an example, one (e.g. 4A1) of the linear portions 4A1, 4A2, and 4A3 may be connected to one end of the second portion 23B3.

In an example, another one (e.g. 4A2) of the linear portions 4A1, 4A2, and 4A3 may be connected to a corresponding one (e.g. 77A2) of the linear portions 77A1 and 77A2 of the first portion 24A3. In addition, in an example, still another one (e.g. 4A3) of the linear portions 4A1, 4A2, and 4A3 may be connected to a corresponding one (e.g. 77A1) of the linear portions 77A1 and 77A2 of the first portion 24A3.

In addition, in an example, the bent portion 4131 of the third portion 24C3 may be connected to the bent portion 77B of the first portion 24A3. In addition, in an example, the bent portion 4132 of the third portion 23C3 may interconnect the two adjacent linear portions 4A2 and 4A3 of the third portion 23C3.

The width of the linear portion of the first portion 24A3 and the width of the bent portion thereof may be equal to each other. In another embodiment, the width of the bent portion of the first portion may be larger than the width of the linear portion thereof. In still another embodiment, the width of the bent portion of the first portion may be smaller than the width of the linear portion thereof.

In addition, the width of the linear portion of the third portion 24C3 and the width of the bent portion thereof may be equal to each other. In another embodiment, the width of the bent portion of the third portion may be larger than the width of the linear portion thereof. In still another embodiment, the width of the bent portion of the third portion may be smaller than the width of the linear portion thereof.

The description of the first hole 13A, the second hole 13B1, the third hole 13B2, and the extension portions 14A and 14B in FIGS. 7 to 9 may apply to the embodiments shown in FIGS. 10A to 10D.

In general, a conductive adhesive member, for example Ag epoxy, may be used for conductive connection between a terminal unit and an electrode of a liquid lens. However, due to thermal expansion or contraction of the conductive adhesive member, the conductive connection between the terminal unit and the electrode of the liquid lens may be deteriorated, or may become defective. Thus, the reliability of the conductive connection between the two components may be reduced. In addition, due to thermal expansion or contraction of the conductive adhesive member (e.g. Ag epoxy), contact resistance between the conductive adhesive member and the terminal unit may vary, leading to deterioration in the reliability of the conductive connection between the two components.

According to the embodiments, since the third portions 60-2 and 70-2 of the terminal units 60 and 70, which are connected to the first portions 60-1 and 70-1 of the terminal units 60 and 70, take the form of a leg, it is possible to reduce the stiffness of the terminal units, thereby inhibiting electrical reliability from being deteriorated by thermal expansion or contraction of the conductive adhesive member (e.g. Ag epoxy). To this end, according to the embodiments, the widths of the third portions 60-2 and 70-2 of the terminal units 60 and 70 may be set to be less than the diameters of the first portions 60-1 and 70-1 of the terminal units 60 and 70.

In an example, in the terminal units 60 and 70, the thicknesses of the first portions 60-1 and 70-1, the thicknesses of the second portions 60-2 and 70-2, and the thicknesses of the third portions 60-3 and 70-3 may be equal to each other. In another embodiment, the thicknesses of the third portions 60-3 and 70-3 may be smaller than the thicknesses of the first portions 60-1 and 70-1 and the thicknesses of the second portions 60-2 and 70-2. In still another embodiment, the thicknesses of the third portions 60-3 and 70-3 may be larger than the thicknesses of the first portions 60-1 and 70-1 and the thicknesses of the second portions 60-2 and 70-2.

For example, the widths W1 of the third portions 60-3 and 70-3 may be 1 to 3 times the thicknesses of the third portions 60-3 and 70-3. For example, the widths W1 of the third portions 60-3 and 70-3 may be 1.2 to 2 times the thicknesses of the third portions 60-3 and 70-3. For example, the widths W1 of the third portions 60-3 and 70-3 may be 1.25 to 1.5 times the thicknesses of the third portions 60-3 and 70-3. Alternatively, for example, the widths W1 of the third portions 60-3 and 70-3 may be 1 to 1.2 times the thicknesses of the third portions 60-3 and 70-3.

When the widths W1 of the third portions 60-3 and 70-3 are less than the thicknesses of the third portions 60-3 and 70-3, the third portions may be easily broken by an impact or the like, leading to electrical disconnection. Further, when the widths W1 of the third portions 60-3 and 70-3 are more than 3 times the thicknesses of the third portions 60-3 and 70-3, it may not be possible to sufficiently reduce the stiffness of the terminal units 60 and 70, thereby deteriorating the reliability of the conductive connection between the terminal units 60 and 70 and the electrodes 51 and 52 of the liquid lens 50.

In order to reduce the stiffness of the terminal units 60 and 70 to thus ensure the reliability of the conductive connection between the terminal units 60 and 70 and the electrodes 51 and 52 of the liquid lens 50, the widths W1 of the third portions 60-3 and 70-3 may be not more than 1.5 times the thickness of the third portions 60-3 and 70-3.

Figure 18:
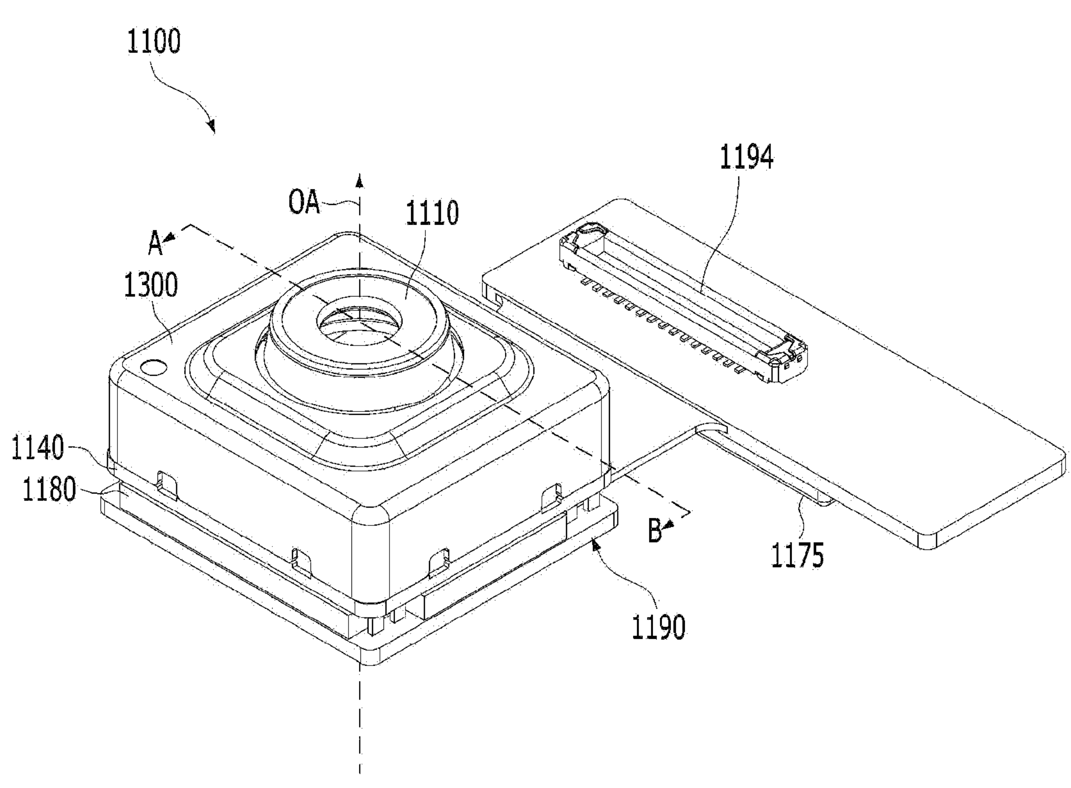
FIG. 18 is a perspective view of a camera module according to another embodiment.
Figure 19:
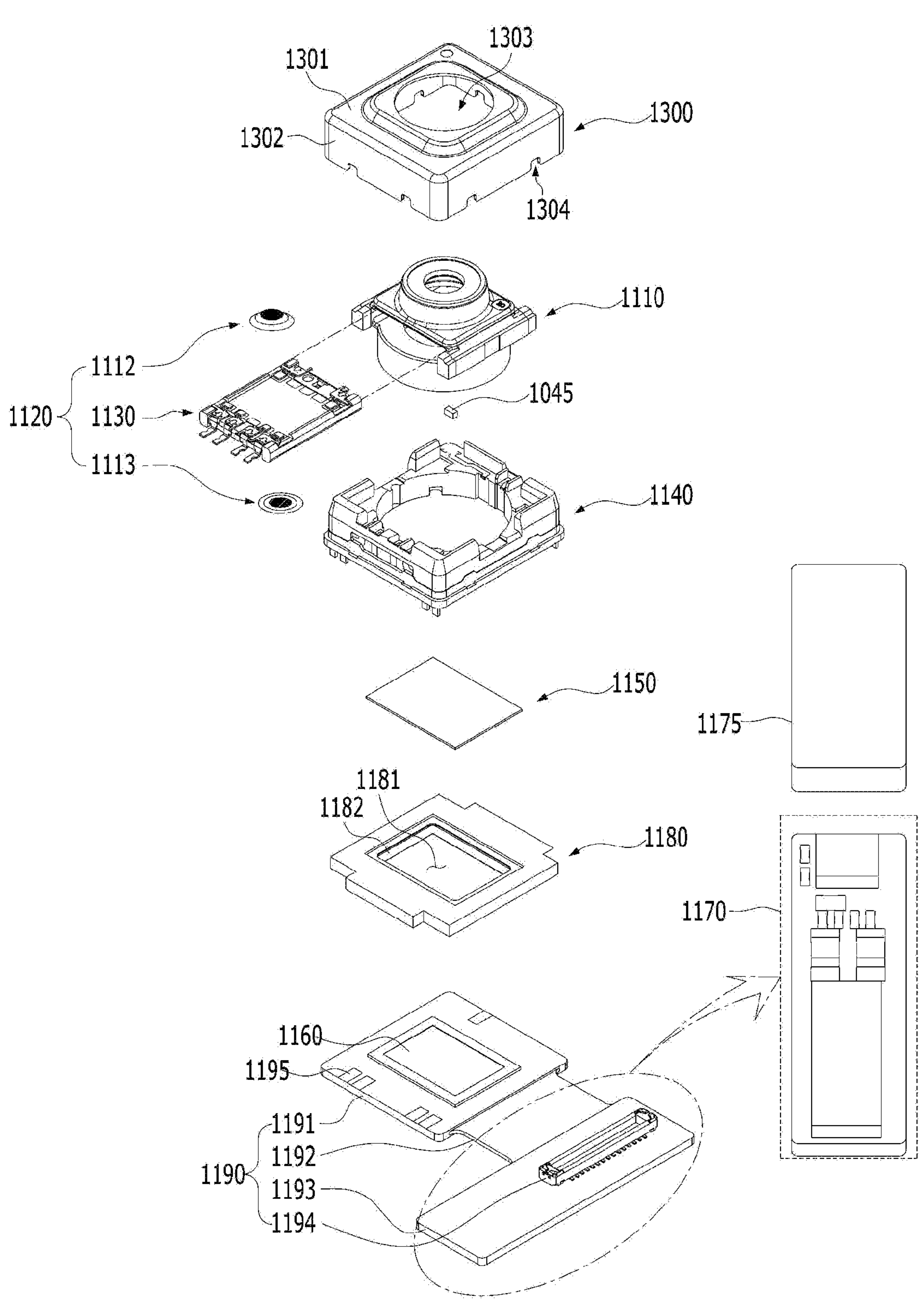
FIG. 19 is an exploded view of the camera module in FIG. 18.
Figure 20:
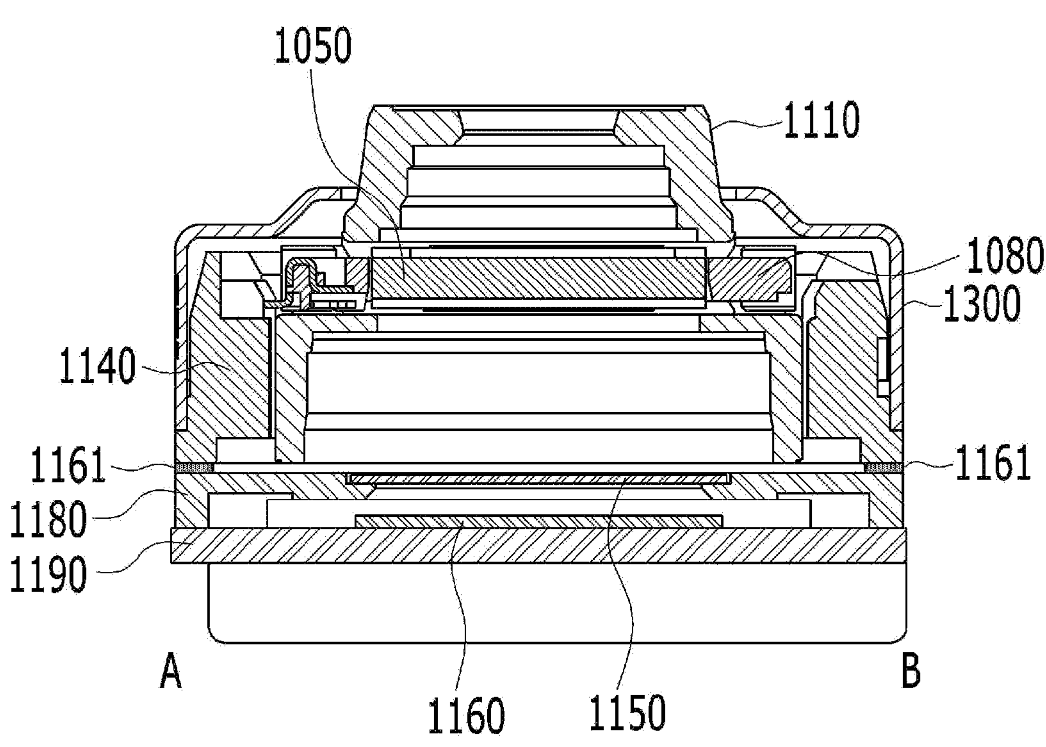
FIG. 20 is a cross-sectional view taken along line AB in the camera module in FIG. 18.

FIG. 18 is a perspective view of a camera module 1100 according to an embodiment, FIG. 19 is an exploded view of the camera module 1100 in FIG. 18, and FIG. 20 is a cross-sectional view taken along line AB in the camera module 1100 in FIG. 18.

Referring to FIGS. 18 to 20, the camera module 1100 may include a lens barrel 1110 and a lens assembly 1120 disposed or mounted on the lens barrel 1110. The camera module 1100 may include a lens holder 1140 for accommodating the lens barrel 1110 and a conductive member 1090 disposed on the lens holder 1140.

In addition, the camera module 1100 may include an image sensor 1160 disposed under the lens barrel 1110.

The camera module 1100 may further include a thermistor 1045.

The lens holder 1140 may alternatively be referred to as a "base".

The lens holder 1140 may be disposed on a substrate 1190, and the lens barrel 1110 may be coupled to the lens holder 1140.

The camera module 1100 may further include a filter 1150.

The camera module 1100 may further include a sensor base 1180 on which the filter 1150 is disposed or mounted. The sensor base 1180 may alternatively be referred to as a "holder".

The camera module 1100 may further include a substrate 1190.

In addition, the camera module 1100 may further include a circuit element 1170 disposed or mounted on the substrate 1190.

In addition, the camera module 1100 may further include a cover 1300.

The substrate 1190 may be a printed circuit board (PCB).

The substrate 1190 may be disposed under the sensor base 1180, and may include a first substrate 1191, a second substrate 1192 connected to the first substrate 1191, a third substrate 1193 connected to the second substrate 1192, and a connector 1194 connected to the third substrate 1193.

In an example, the circuit element 1170 may be disposed or mounted on the first substrate 1191. In addition, the substrate 1190 may include at least one terminal 1195 disposed or formed on the first substrate 1191. In an example, the terminal 1195 of the substrate 1190 may be provided in a plural number, and the plurality of terminals 1195 of the substrate 1190 may correspond to, face, or overlap the conductive member 1090 in the optical-axis direction, and may be conductively connected to the conductive member 1090 via solder or the like.

The sensor base 1180 and the image sensor 1160 may be disposed on the first substrate 1191. In an example, each of the first substrate 1191 and the third substrate 1193 may be a rigid printed circuit board, and the second substrate 1192 may be a flexible printed circuit board conductively connecting the first substrate 1191 to the third substrate 1193, but the disclosure is not limited thereto. In another embodiment, at least one of the first to third substrates may be a rigid printed circuit board or a flexible printed circuit board. In still another embodiment, the first to third substrates may be integrated into a single substrate.

The image sensor 1160 may be disposed or mounted on the substrate 1190. In an example, the image sensor 1160 may be disposed or mounted on the upper surface of the first substrate 1191, and may be conductively connected to the substrate 1190.

The optical axis of the image sensor 1160 and the optical axis of the lens assembly 1120 may be in alignment with each other. The image sensor 1160 may include an effective image area (or an active area), may convert light radiated onto the effective image area (or the active area) into an electrical signal, and may output the converted electrical signal.

The circuit element 1170 may be conductively connected to the first substrate 1191, and may constitute a controller for controlling the image sensor 1160 and a first lens unit 1130. In an example, the circuit element 1170 may include at least one of at least one capacitor, a memory, a controller, a sensor, or an integrated circuit (IC).

The camera module 1100 may further include a cover 1175, which is disposed on the first substrate 1191 and covers the circuit element 1170 in order to protect the circuit element 1170.

The sensor base 1180 may be disposed on the substrate 1190. In an example, the sensor base 1180 may be disposed on the upper surface of the first substrate 1191, and may be attached or coupled to the upper surface of the first substrate 1191. In an example, the sensor base 1180 may be disposed between the substrate 1190 and the lens holder 1140.

The camera module 1100 may be disposed between the sensor base 1180 and the substrate 1190, and may include an adhesive (not shown) for attaching or fixing the sensor base 1180 to the upper surface of the substrate 1190.

The sensor base 1180 may surround the image sensor 1160 to protect the image sensor 1160 from external foreign substances or impacts, and may include a bore 1181 formed therein to expose the effective image area (or the active area) of the image sensor 1160. In an example, the bore 1181 may be a through-hole formed through the sensor base 1180 in the direction of the optical axis OA.

In addition, the sensor base 1180 may be provided on the upper surface thereof with a seating portion 1182 on which the filter 1150 is seated. The seating portion 1182 may have a height difference in the optical-axis direction with respect to the upper surface of the sensor base 1180, and may be formed so as to surround the bore 1181. In an example, the seating portion 1182 may take the form of a recess depressed into the upper surface of the sensor base 1180, but the disclosure is not limited thereto. In another embodiment, the seating portion may take the form of a protruding portion protruding from the upper surface of the sensor base 1180.

A portion of the lower surface of the sensor base 1180 may be depressed so as to define a space or a seating recess (not shown) in which to dispose the image sensor 1160.

In addition, the sensor base 1180 may be disposed on the first substrate 1191, and may be spaced apart from the circuit element 1170 so as not to overlap the circuit element 1170 in the optical-axis direction. In another embodiment, the sensor base 1180 may be omitted.

The filter 1150 may be disposed on the sensor base 1180. In an example, the filter 1150 may be disposed on the seating portion 1182 in the sensor base 1180, and may be located above the effective image area (or the active area) of the image sensor 1160.

The filter 1150 may be disposed between the lens assembly 1120 and the image sensor 1160, and may filter light within a specific wavelength range, among the light that has passed through the lens assembly 1120. The filter 1150 may be, for example, an infrared (IR) cut filter for blocking infrared radiation or an ultraviolet (UV) cut filter for blocking ultraviolet radiation, but the embodiments are not limited thereto. In an example, the filter 1150 may include at least one of an infrared cut filter or an ultraviolet cut filter.

The lens holder 1140 may be disposed on the substrate 1190.

In an example, the lens holder 1140 may be disposed on the sensor base 1180. In an example, the lower surface of the lens holder 1140 may be coupled to the upper surface of the sensor base 1180.

The lens holder 1140 may be disposed in the cover 1300. In addition, the sensor base 1180 may be disposed in the cover.

The lens holder 1140 may be formed of an insulating material.

The lens holder 1140 may be disposed between the lens assembly 1120 and the substrate 1190. In an example, the lens holder 1140 may be disposed between the first lens unit 1130 and the first substrate 1191.

The conductive member 1090 may be disposed on the lens holder 1140. Drive signals (e.g. drive voltages) provided from the substrate 1190 may be transmitted to the first lens unit 1130 through the conductive member 1090, and a signal related to detection of temperature, which is output from the thermistor 1045, may be transmitted to the substrate 1190 through the conductive member 1090.

An adhesive (not shown) may be disposed between the sensor base 1180 and the lens holder 1140, and the sensor base 1180 and the lens holder 1140 may be coupled to each other by the adhesive.

In an example, the adhesive may be disposed between the upper surface of the sensor base 1180 and the lower surface of the lens holder 1140, and the sensor base 1180 and the lens holder 1140 may be coupled or attached to each other by the adhesive. In another example, the adhesive may be disposed between the side surface of the sensor base 1180 and the lens holder 1140. In an example, the adhesive may seal the gap between the sensor base 1180 and the lens holder 1140.

In addition to the above adhesive, the camera module 1100 according to the embodiment may further include an adhesive for bonding the lens barrel 1110 to the lens holder 1140 and an adhesive for bonding a holder 1080 of the first lens unit 1130 to the lens holder 1140.

The lens assembly 1120 may be mounted or disposed on the lens barrel 1110. The lens assembly 1120 may alternatively be referred to as a "lens module". In another embodiment, the lens module may include the lens barrel 1110 and the lens assembly 1120.

The lens assembly 1120 may include the first lens unit 1130 including a liquid lens. In an example, the lens assembly 1120 may include the first lens unit 1130, a second lens unit 1112, and a third lens unit 1113.

The first lens unit 1130 may include an optical unit, and the optical unit may include at least one lens. The optical unit may collect an input light signal reflected from a subject through the at least one lens and may transmit the input light signal to the image sensor 1160.

In an example, the first lens unit 1130 may include a variable lens. The variable lens may be a variable focus lens. Further, the variable lens may be a lens that is adjustable in focus.

The variable lens may be at least one of a liquid lens, a polymer lens, a liquid crystal lens, a voice coil motor (VCM)-type lens, or a shape memory alloy (SMA)-type lens.

Here, the liquid lens may include a liquid lens including a single type of liquid and a liquid lens including two types of liquids. The focus of the liquid lens including a single type of liquid may be changed by controlling a membrane disposed at a position corresponding to the liquid. For example, the focus of the liquid lens may be changed by pressing the membrane using the electromagnetic force between a magnet and a coil. The liquid lens including two types of liquids may include a conductive liquid and a non-conductive liquid, and may control the interface formed between the conductive liquid and the non-conductive liquid using a voltage applied to the liquid lens.

In addition, the focus of the polymer lens may be changed by controlling a polymer material using a driver such as a piezo actuator.

In addition, the focus of the liquid crystal lens may be changed by controlling a liquid crystal using electromagnetic force.

In addition, the focus of the VCM-type lens may be changed by controlling a solid lens or a lens assembly including a solid lens using the electromagnetic force between a magnet and a coil.

In addition, the focus of the SMA-type lens may be changed by controlling a solid lens or a lens assembly including a solid lens using a shape memory alloy.

In addition, the "optical unit" may include a filter that transmits light within a specific wavelength range. For example, the filter that transmits light within a specific wavelength range may include an IR pass filter. In addition, the optical unit may include an optical plate. In this case, the optical plate may be, for example, a light-transmissive plate.

The controller of the camera module 1100 or a controller 830 of an optical device 200A may control the variable lens of the optical unit to shift an input light signal on the image sensor by a predetermined moving distance. The controller may shift the optical path of the input light signal using the variable lens of the optical unit.

In an example, in the lens assembly 1120, the first lens unit 1130 may alternatively be referred to as a "liquid lens unit", the second lens unit 1112 may alternatively be referred to as a "first solid lens unit", and the third lens unit 1113 may alternatively be referred to as a "second solid lens unit".

In another embodiment, at least one of the second and third lens units 1112 and 113 may be omitted from the lens assembly. In still another embodiment, the lens assembly 1120 may include the lens barrel 1110 in FIG. 2.

The first lens unit 1130 may include a liquid lens 1050.

Figure 21:
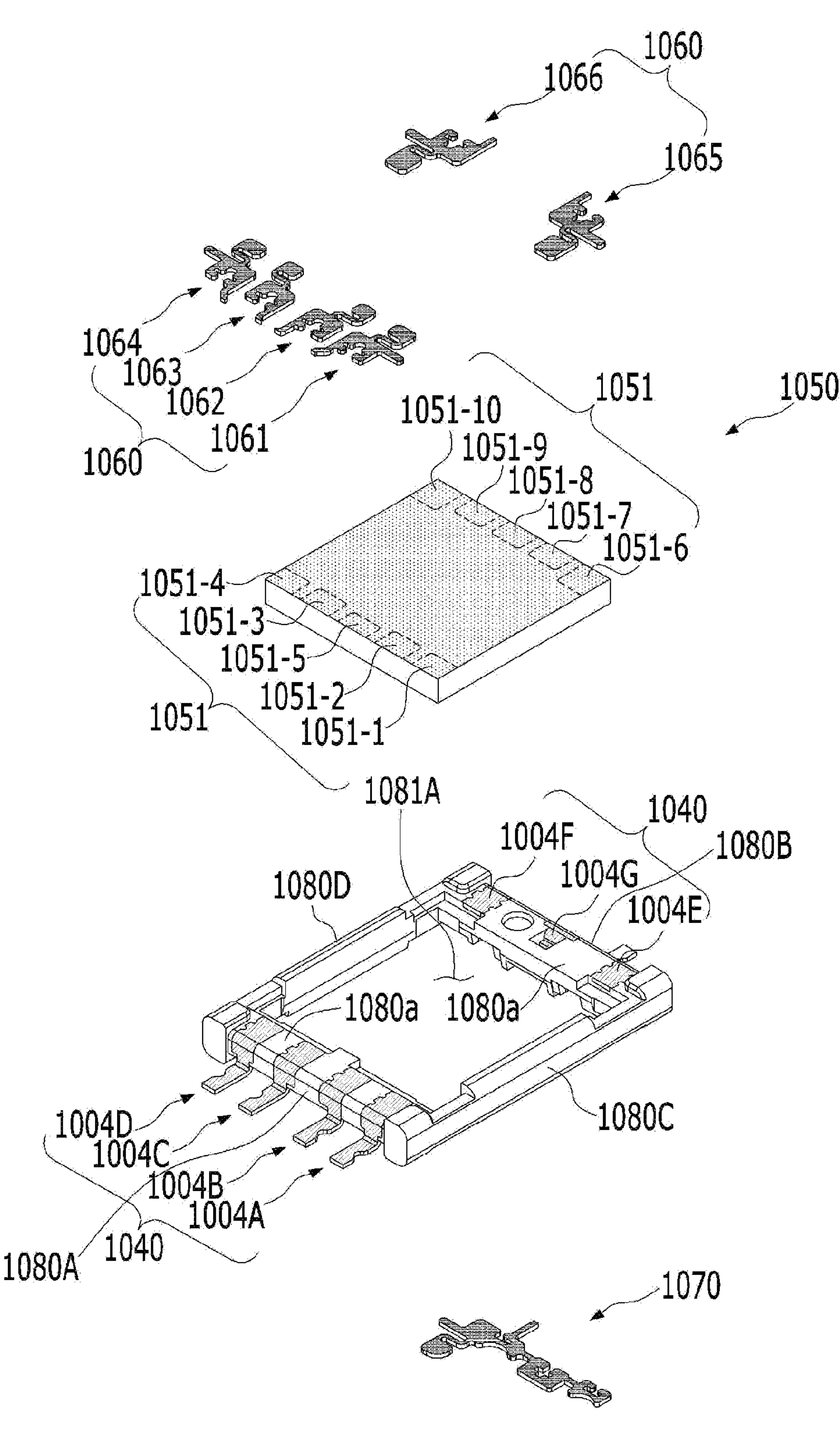
FIG. 21 is an exploded view of the first lens unit.
Figure 22:
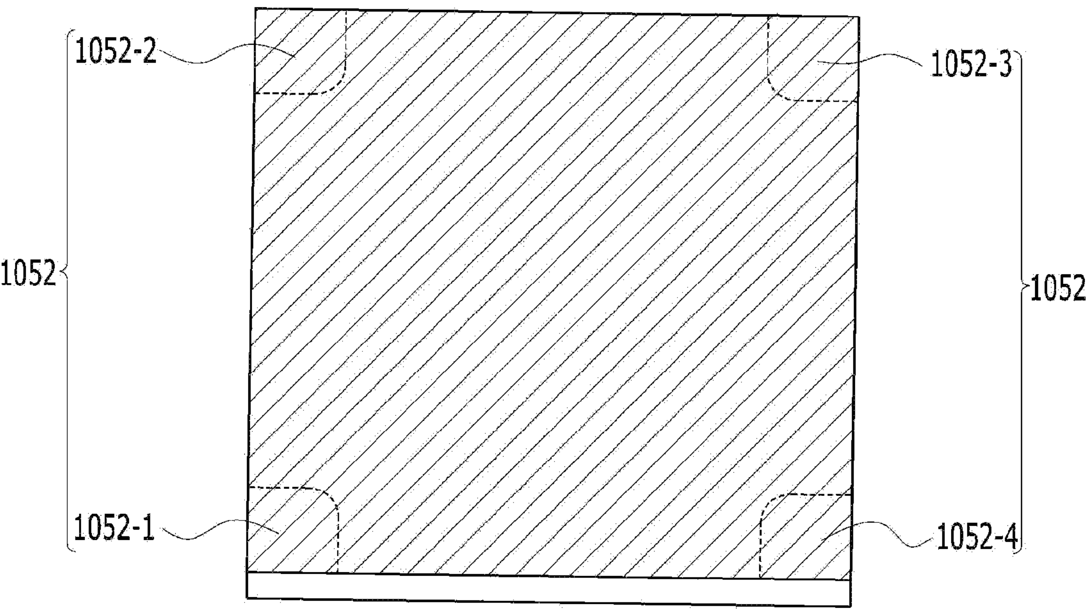
FIG. 22 is a bottom view of a liquid lens.
Figure 23:
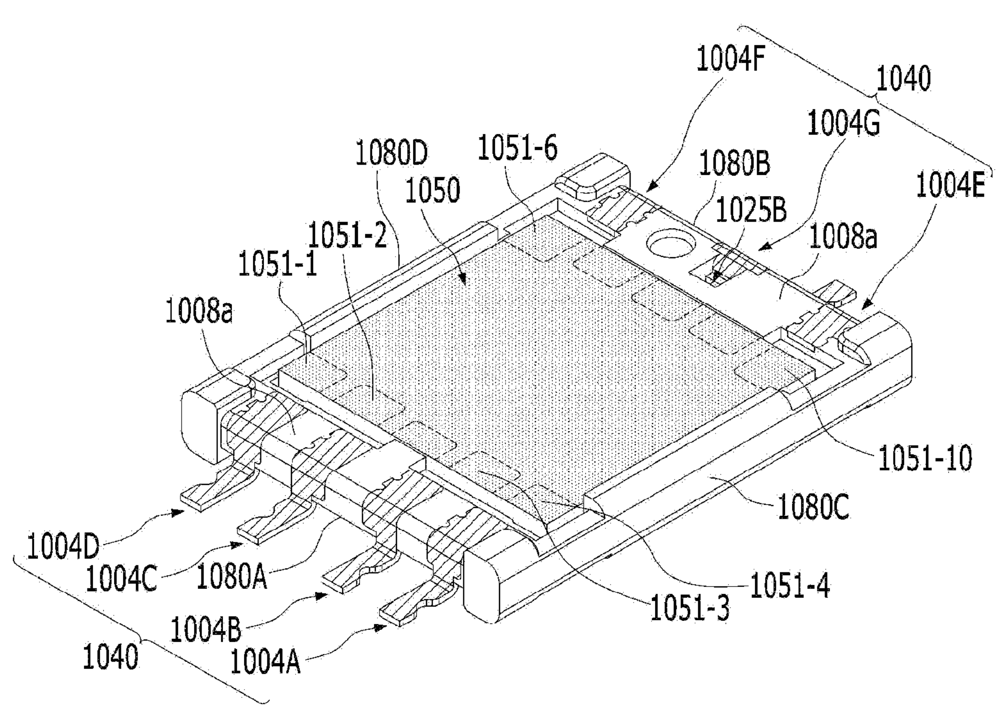
FIG. 23 is an upper perspective view of a holder, the liquid lens, and the first terminal unit of the first lens unit.
Figure 24A:
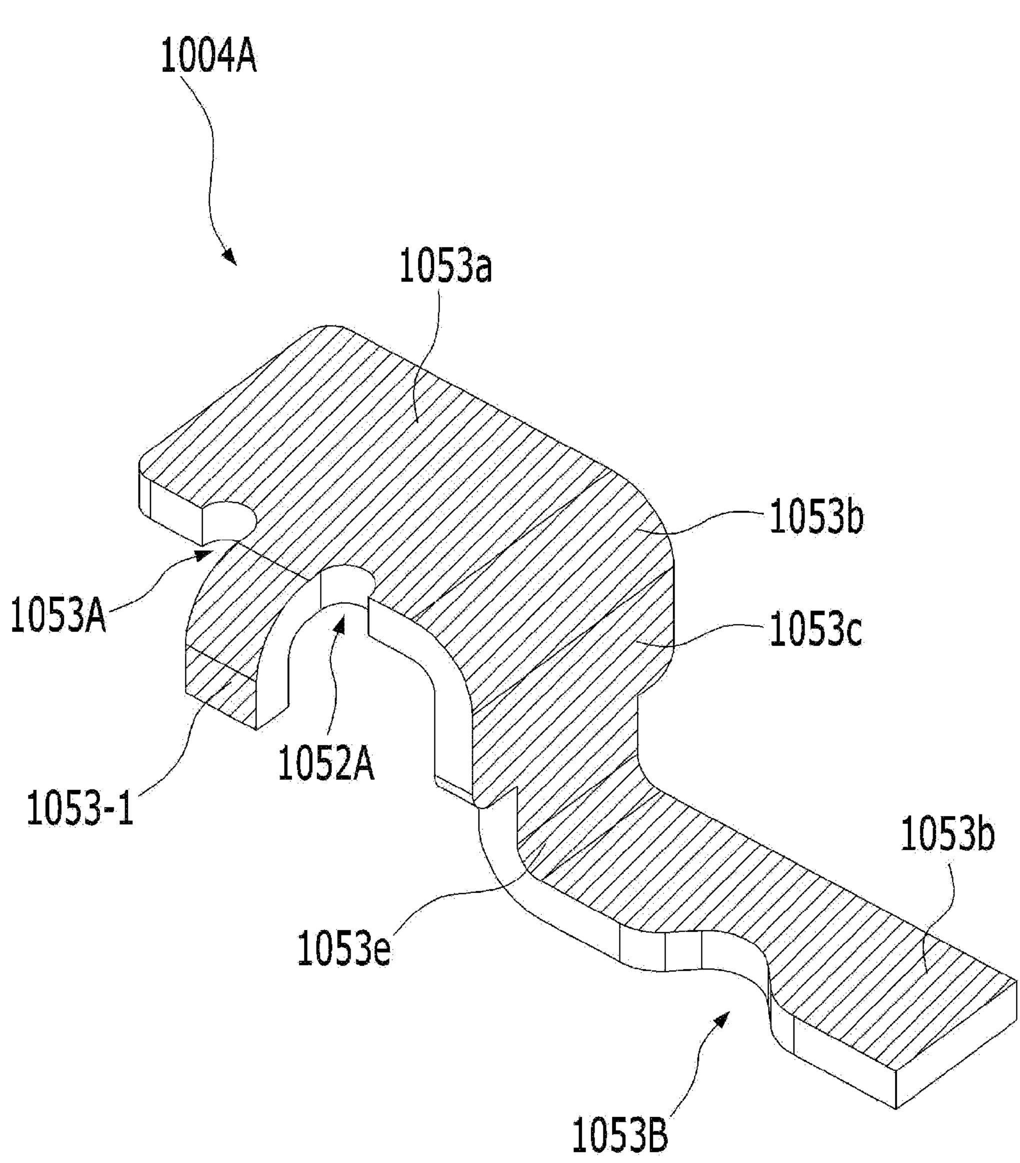
FIG. 24A is a perspective view of a 1-1$^{st}$ terminal of the first terminal unit.
Figure 24B:
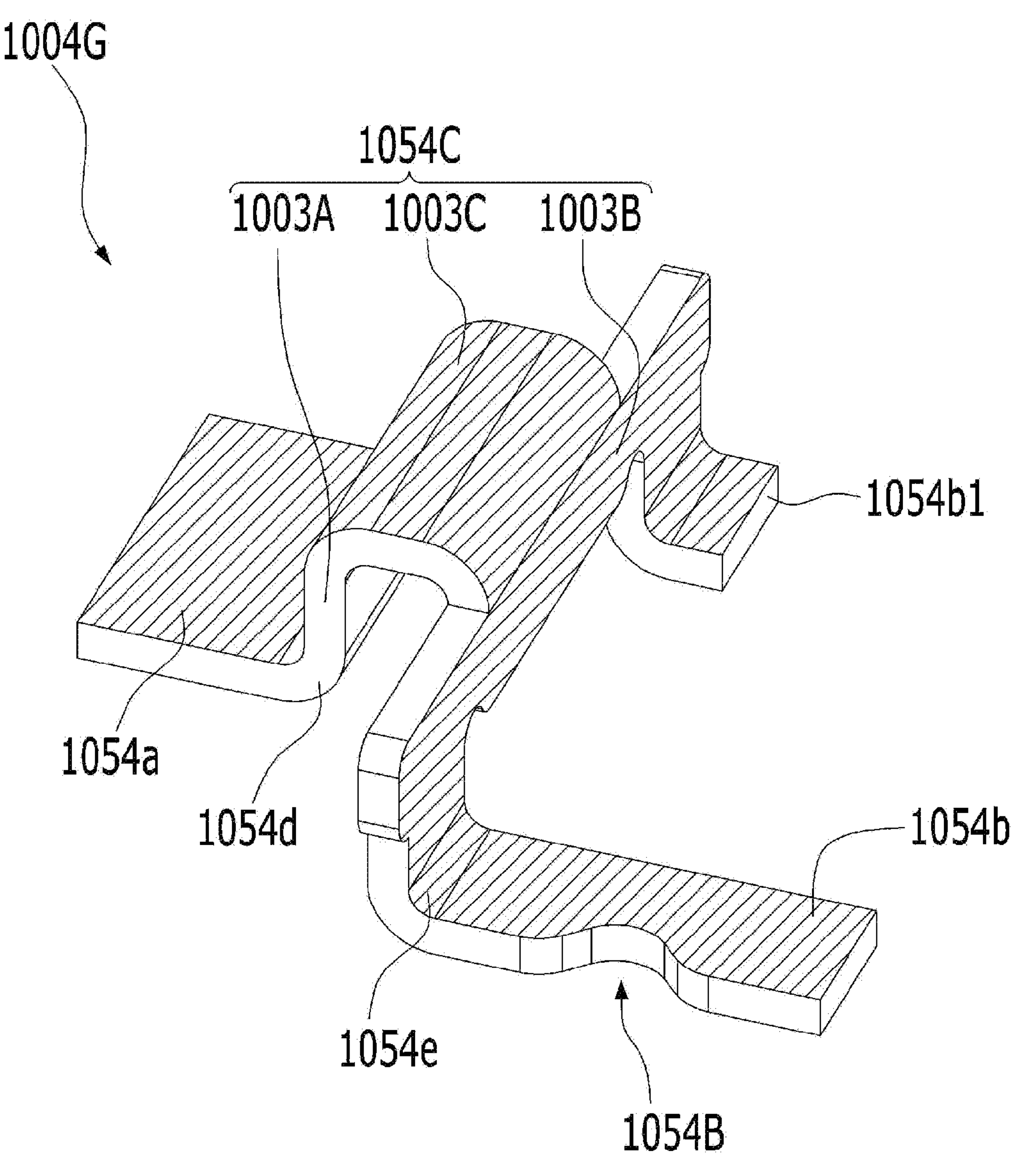
FIG. 24B is a perspective view of a 1-2$^{nd}$ terminal of the first terminal unit.
Figure 25A:
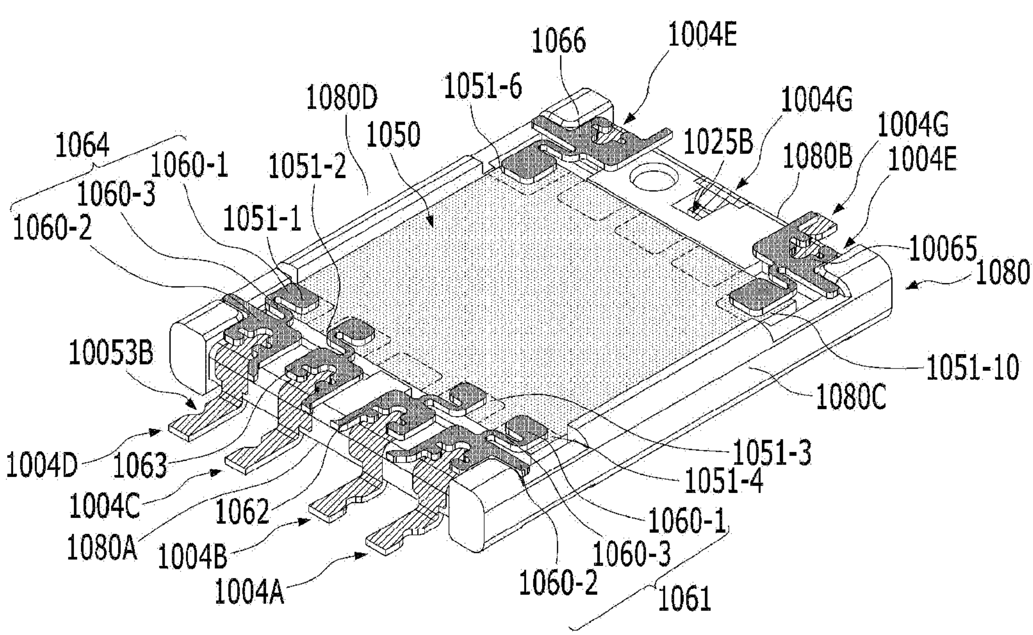
FIG. 25A is a perspective view of the holder, the liquid lens, the first terminal unit, and the second terminal unit.
Figure 25B:
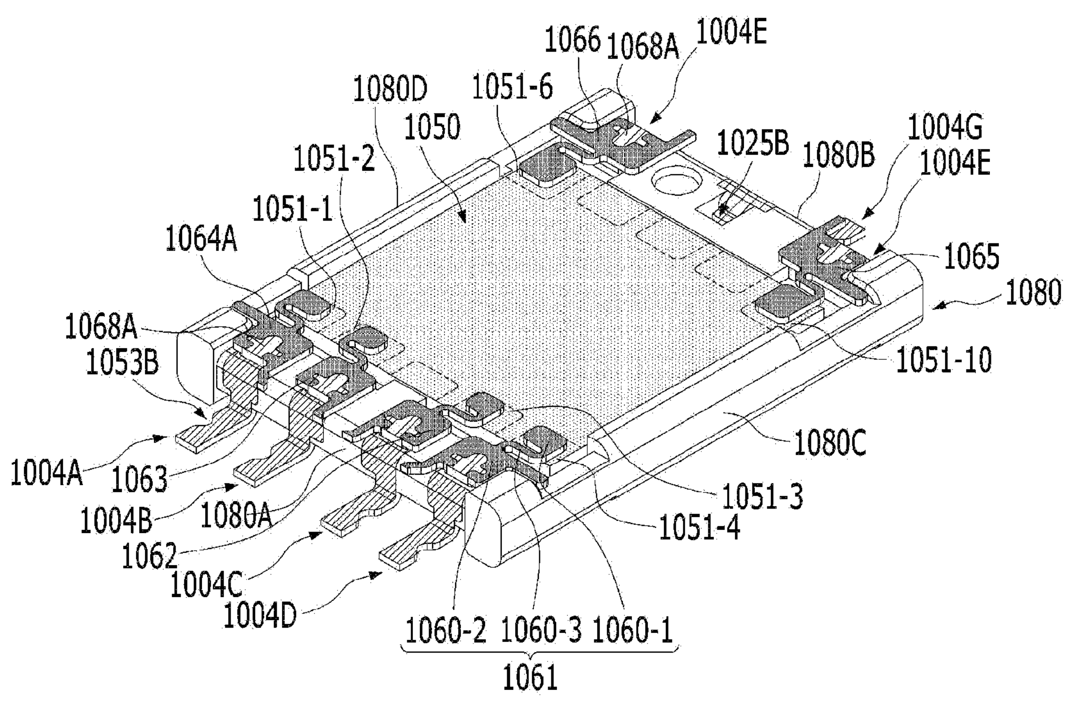
Figure 26A:
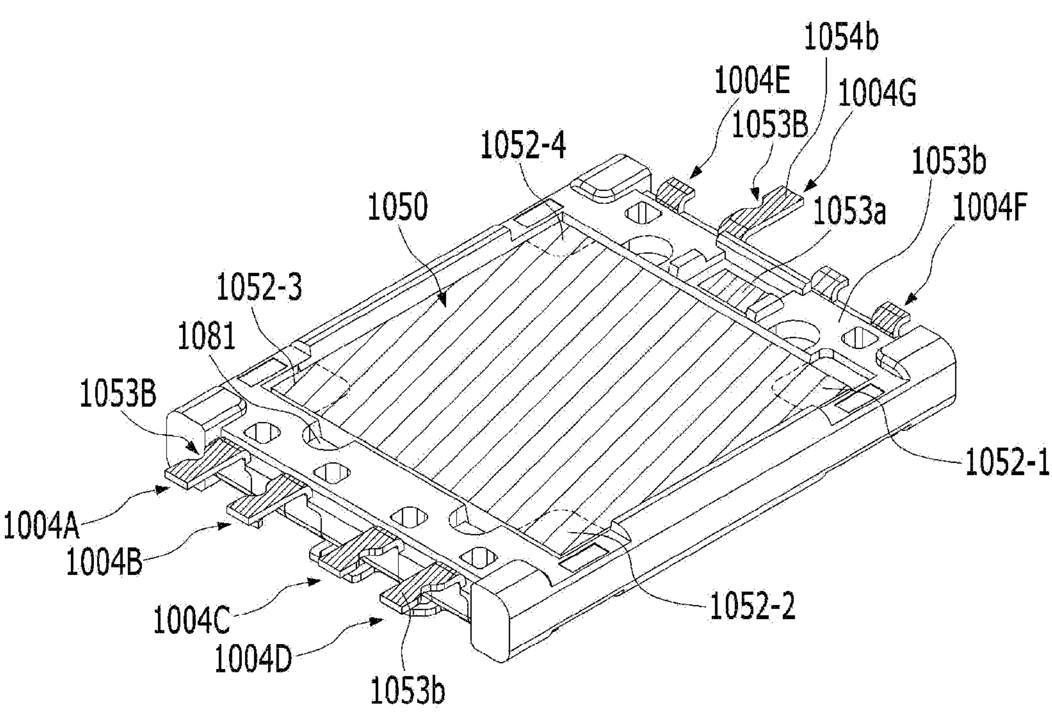
FIG. 26A is a lower perspective view of the holder, the liquid lens, and the first terminal unit of the first lens unit.
Figure 26B:
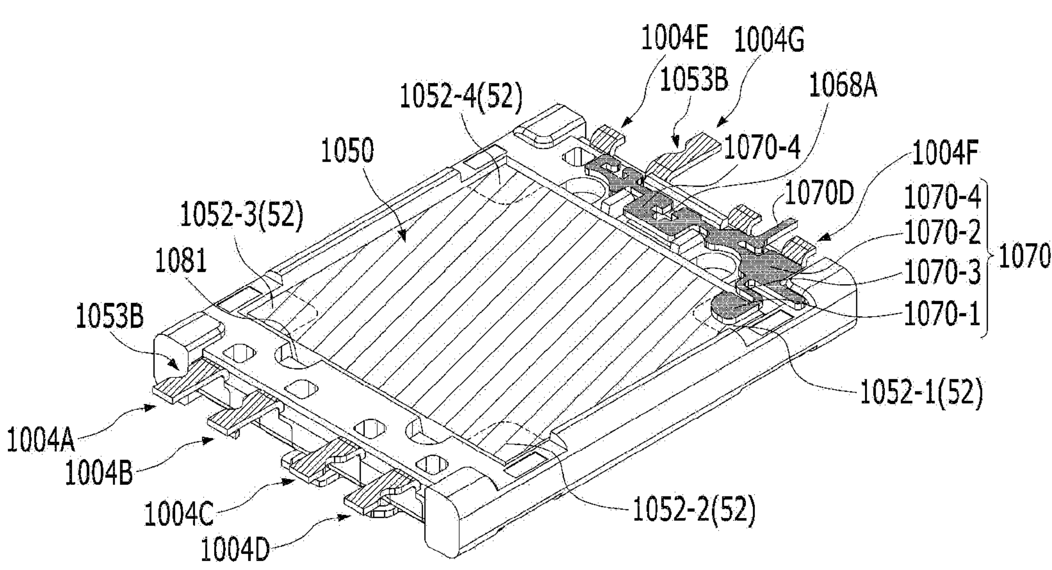
FIG. 26B is a lower perspective view of the holder, the liquid lens, the first terminal unit, and a 2-2$^{nd}$ terminal unit of the first lens unit.
Figure 27:
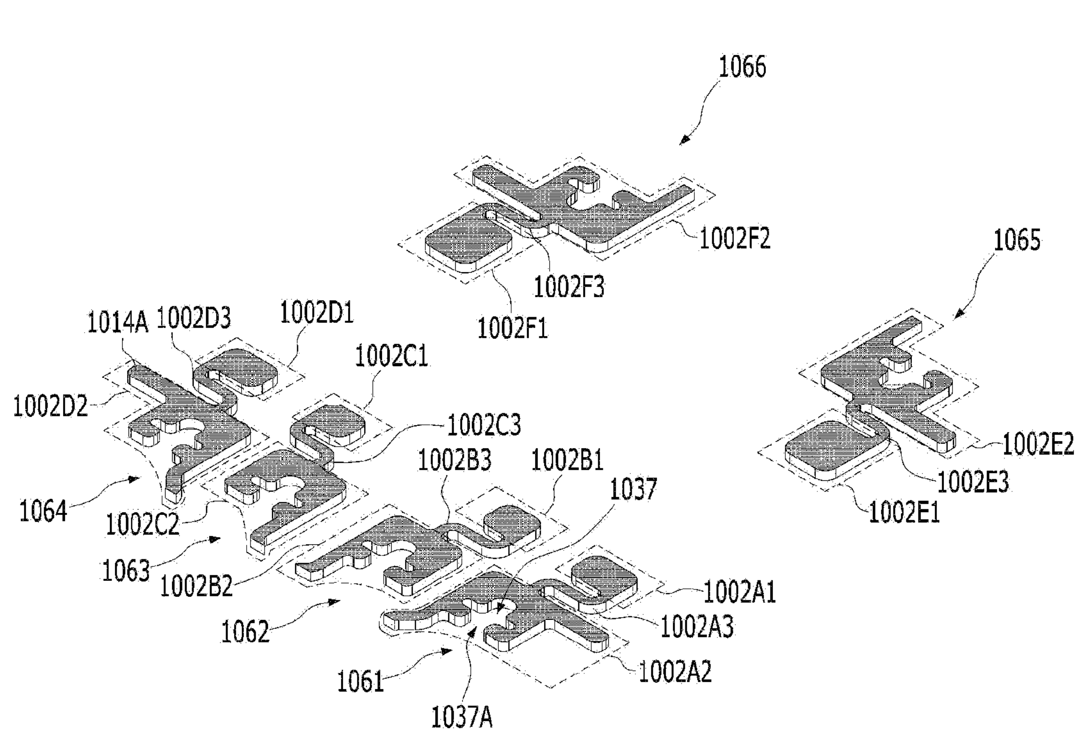
FIG. 27 is a perspective view of a 2-1$^{st}$ terminal unit.
Figure 28:
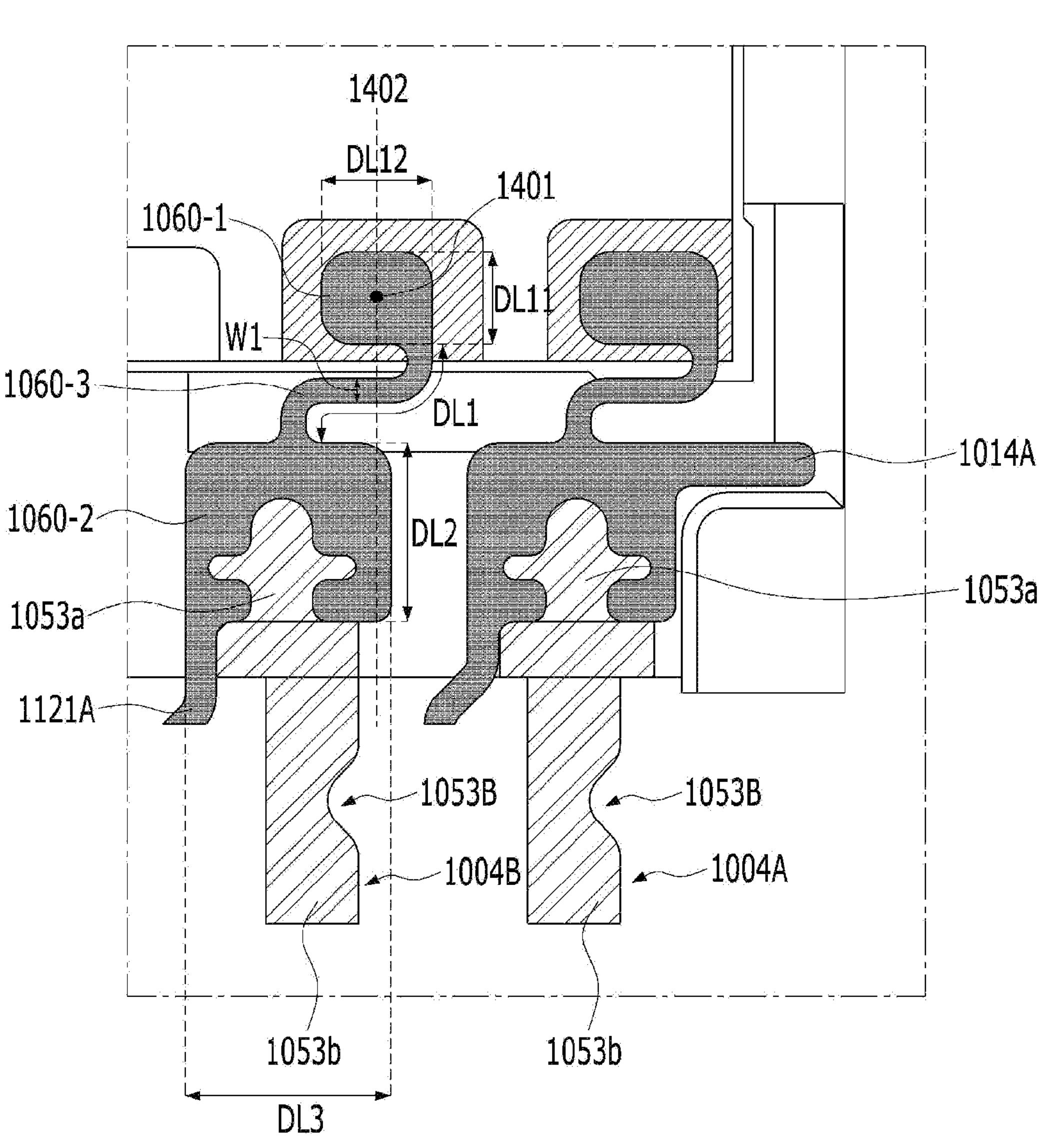
FIG. 28 is an enlarged view of some terminals of the 2-1$^{st}$ terminal unit.
Figure 29:
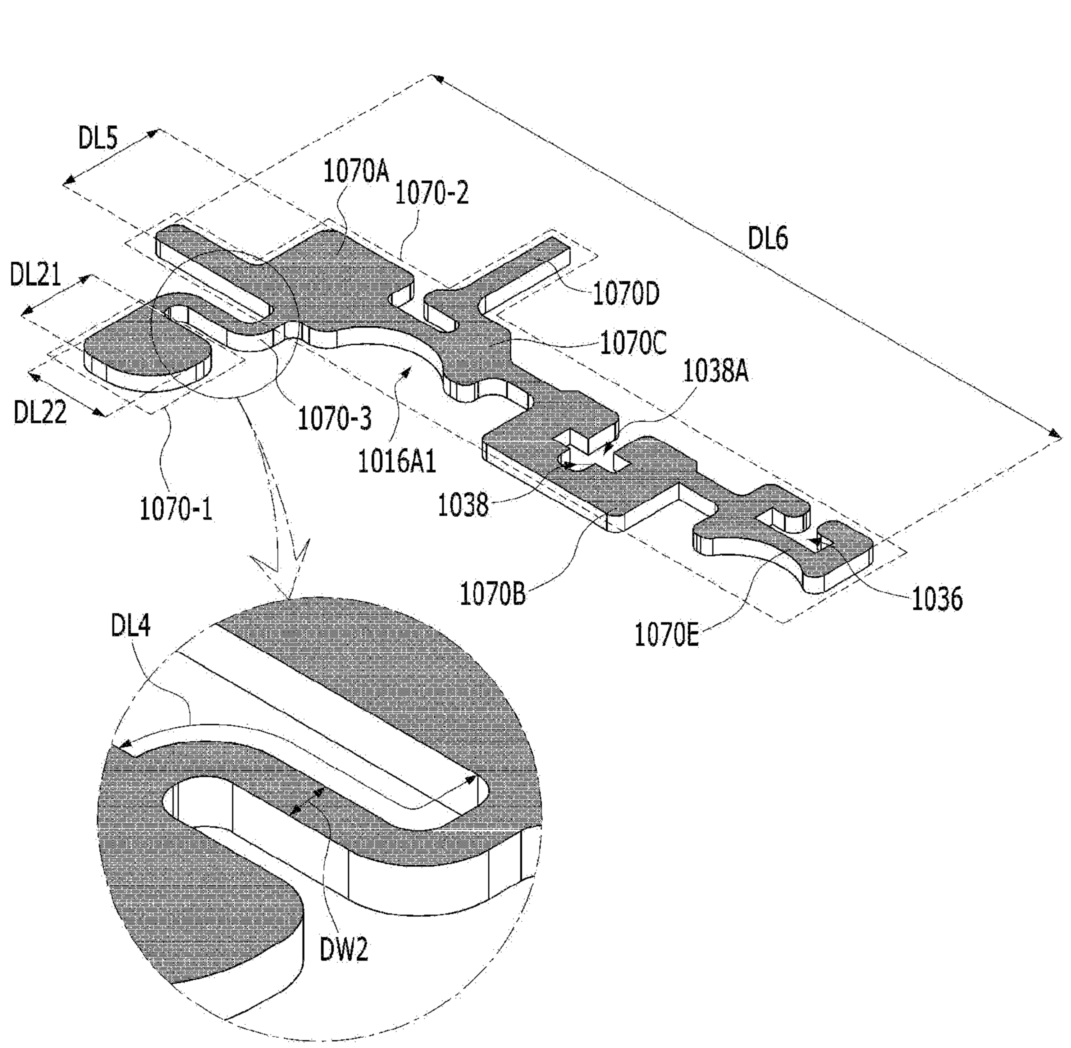
FIG. 29 is a perspective view of a 2-2$^{nd}$ terminal unit.

FIG. 21 is an exploded view of the first lens unit 1130, FIG. 22 is a bottom view of the liquid lens 1050, FIG. 23 is an upper perspective view of the holder 1080, the liquid lens 1050, and a first terminal unit 1040 of the first lens unit 1130, FIG. 24A is a perspective view of a 1-1$^{st}$ terminal 1004A of the first terminal unit 1040, FIG. 24B is a perspective view of a 1-2$^{nd}$ terminal 1004G of the first terminal unit 1040, FIG. 25A is a perspective view of the holder 1080, the liquid lens 1050, the first terminal unit 1040, and a second terminal unit 1060, FIG. 25B illustrates a first conductive adhesive member 1068A for coupling the first terminal unit 1040 and the second terminal unit 1060 in FIG. 25A to each other, FIG. 26A is a lower perspective view of the holder 1080, the liquid lens 1050, and the first terminal unit 1040 of the first lens unit 1130, FIG. 26B is a lower perspective view of the holder 1080, the liquid lens 1050, the first terminal unit 1040, and a third terminal unit 1070 of the first lens unit 1130, FIG. 27 is a perspective view of a 2-1$^{st}$ terminal unit 1060, FIG. 28 is an enlarged view of some terminals of the 2-1$^{st}$ terminal unit 1060, and FIG. 29 is a perspective view of a 2-2$^{nd}$ terminal unit 1070.

Referring to FIGS. 21 to 29, the first lens unit 1130 may include the liquid lens 1050, the terminal units 1040, 1060, and 1070, and the holder 1080. In another embodiment, the holder 1080 may be a separate component that is not included in the first lens unit.

The liquid lens 1050 may be disposed between the lens of the second lens unit 1112 and the lens of the third lens unit 1113, and may be spaced apart from the lens of the second lens unit 1112 and the lens of the third lens unit 1113 in the optical-axis direction.

The liquid lens 1050 may include a liquid lens region, which contains different types of liquids, a first electrode 1051, and a second electrode 1052. The first electrode 1051 may alternatively be referred to as an "upper electrode", and the second electrode 1052 may alternatively be referred to as a "lower electrode".

The liquid lens region may contain a first liquid that is conductive and a second liquid that is non-conductive, and an interface may be formed between the first liquid and the second liquid.

The liquid lens 1050 may include at least one heater, which generates heat in response to a drive signal (or a control signal). The heater may be implemented in the form of a resistor capable of generating heat in response to a drive signal (or a control signal), but the disclosure is not limited thereto.

The first electrode 1051 may be disposed on a first surface (e.g. an upper surface) of the liquid lens 1050, and the second electrode 1052 may be disposed on a second surface (e.g. a lower surface) of the liquid lens 1050 that is opposite the first surface thereof. For example, the first electrode 1051 and the second electrode 1052 may be provided separately from each other, or may be independent electrodes.

The first electrode 1051 may include a plurality of first electrodes 1051-1 to 1051-*n* (where "n" is a natural number greater than 1 (n>1), for example, n=10), which are spaced apart from each other. In an example, the first electrode 1051 may include 1-1$^{st}$ to 1-10$^{th}$ electrodes 1051-1 to 1051-10.

In an example, the plurality of first electrodes 1051 to 1054 may be individual terminals or individual electrodes, but the disclosure is not limited thereto. In another embodiment, at least two of the plurality of first electrodes may be connected to each other to constitute a common electrode.

The plurality of first electrodes 1051-1 to 1051-10 may be disposed near the liquid lens region. A drive signal for deforming the interface between the first liquid and the second liquid may be provided to the first electrode 1051 and the second electrode 1052.

Each of the plurality of first electrodes 1051-1 to 1051-10 may be exposed from the first surface (e.g. the upper surface) of the liquid lens 1050. In an example, each of the plurality of first electrodes 1051-1 to 1051-10 may include a portion that is exposed from the first surface (e.g. the upper surface) of the liquid lens 1050.

In an example, each of the plurality of first electrodes 1051-1 to 1051-10 may be formed so as to be spaced apart from the outer surface of the liquid lens 1050.

In an example, the tipper surface of each of the plurality of first electrodes 1051-1 to 1051-10 and the upper surface of the liquid lens 1050 may have a height difference with respect to each other in the optical-axis direction, but the disclosure is not limited thereto. In an example, the height of the upper surface of each of the plurality of first electrodes 1051-1 to 1051-10 may be lower than the height of the upper surface of the liquid lens 1050.

In an example, the first electrodes 1051-1 to 1051-10 may be electrically or physically separated from each other. A separate drive signal may be provided to each of at least two of the first electrodes 1051-1 to 1051-10.

In an example, a first drive signal (or a first control signal) may be applied across the 1-1$^{st}$ electrode 1051-1 and the common electrode. A second drive signal (or a second control signal) may be applied across the 1-2$^{nd}$ electrode 1051-2 and the common electrode. A third drive signal (or a third control signal) may be applied across the 1-3$^{rd}$ electrode 1051-3 and the common electrode. A fourth drive signal (or a fourth control signal) may be applied across the 1-4$^{th}$ electrode 1051-4 and the common electrode. In an example, the common electrode may be the second electrode 1052.

In an example, each of the first to fourth drive signals may take the form of voltage or current. In this case, each of the 1-1$^{st}$ to 1-4$^{th}$ electrodes 1051-1 to 1051-4 may correspond to a separate positive (+) electrode for controlling the liquid lens 1050, and the second electrode 1052 may be a common negative (−) electrode for controlling the liquid lens.

In the liquid lens 1050, the interface formed between the first liquid (e.g. the conductive liquid) and the second liquid (e.g. the non-conductive liquid) may be deformed in response to the first to fourth drive signals, and the focal length of the liquid lens 1050 may be controlled by the deformed interface. In this way, at least one of the AF function or the OIS function may be performed with respect to the lens assembly 1120.

Although the 1-1$^{st}$ to 1-4$^{th}$ electrodes 1051-1 to 1051-4 are illustrated in FIG. 21 as being disposed in a row on one side of the liquid lens 1050, the disclosure is not limited thereto. In another embodiment, each of the 1-1$^{st}$ to 1-4$^{th}$ electrodes may be disposed on a corresponding one of the four corner regions of the first surface (e.g. the upper surface) of the liquid lens 1050.

The second electrode 1052 may include at least one electrode.

In an example, the second electrode 1052 may include a plurality of second electrodes 1052-1 to 1052-4. In an example, the second electrode 1052 may include 2-1$^{st}$ to 2-4$^{th}$ electrodes 1052-1 to 1052-4. However, the number of second electrodes is not limited to four. In another embodiment, the number of second electrodes may be one or two or more.

The 2-1$^{st}$ to 2-4$^{th}$ electrodes 1052-1 to 1052-4 may be exposed to the second surface of the liquid lens 1050. In an example, each of the 2-1$^{st}$ to 2-4$^{th}$ electrodes 1052-1 to 1052-4 may include a portion that is exposed to the second surface of the liquid lens 1050. Here, the second surface of the liquid lens 1050 may be the surface opposite the first surface of the liquid lens 1050.

The 2-1$^{st}$ to 2-4$^{th}$ electrodes 1052-1 to 1052-4 may be formed or disposed on four corners of the second surface (e.g. the lower surface) of the liquid lens 1050, but the disclosure is not limited thereto. In another embodiment, the second electrode may be disposed on the side of the second surface of the liquid lens.

In an example, any one of the 2-1$^{st}$ to 2-4$^{th}$ electrodes 1051-1 to 1051-4 (e.g. the 2-1$^{st}$ electrode 52-1) may be a common electrode, for example, a common negative (−) electrode, with respect to the 1-1$^{st}$ to 1-4$^{th}$ electrodes 1051-1 to 1051-4 for controlling the liquid lens. In an example, a ground voltage may be provided to the common electrode (e.g. 1052-1), but the disclosure is not limited thereto.

In an example, the 2-1$^{st}$ to 2-4$^{th}$ electrodes 1051-1 to 1051-4 may form one and the same common electrode (e.g. the first electrode), but the disclosure is not limited thereto.

In another embodiment, another one of the 2-1$^{st}$ to 2-4$^{th}$ electrodes 1051-1 to 1051-4 may be an individual electrode, an individual terminal, or a second common electrode, which is independent of the common electrode. In an example, the common electrode and the second common electrode may be electrically and physically separated or isolated from each other, but the disclosure is not limited thereto. In another embodiment, the common electrode and the second common electrode may be connected to each other or may be integrally formed with each other.

In an embodiment, epoxy may be applied through separation spaces between the liquid lens 1050 and the solid lenses of the second and third lens units 1112 and 1113, and active alignment of the liquid lens 1050 may be performed.

In another embodiment, the functions or roles of the first electrode 1051 and the second electrode 1052 of the liquid lens 50 may be inverted. That is, for example, the second electrodes may be individual terminals that play the role of the above-described first electrodes.

The first electrode 1051 and the second electrode 1052 may be formed of a conductive material, for example, a conductive metal, but the disclosure is not limited thereto.

The holder 1080 accommodates or supports the liquid lens 1050 and the terminal units 1040, 1060, and 1070.

The holder 1080 may have a hole 1081A formed therein to accommodate the liquid lens 1050. In an example, the hole 1081A may be formed through the holder 1080 in the optical-axis direction. The liquid lens 1050 may be disposed or seated in the hole 1081A in the holder 1080.

The holder 1080 may have a shape that enables the same to be mounted on the first barrel portion 1110A of the lens barrel 1110.

The terminal units 1040, 1060, and 1070 may be disposed on the holder 1080.

The terminal units 1040, 1060, and 1070 may be conductively connected to the liquid lens 1050, and may be conductively connected to the conductive member 1090.

In an example, the terminal units 1040, 1060, and 1070 may conductively connect the electrodes 1051 and 1052 of the liquid lens 1050 to conductive portions 1091-1 to 1091-5 of the conductive member 1090 using conductive adhesive members 68A and 68B.

For example, the conductive adhesive member may be solder or a conductive adhesive (e.g. conductive epoxy), or may include at least one of solder or a conductive adhesive (e.g. conductive epoxy).

The terminal units 1040, 1060, and 1070 may include a first terminal unit 1040, which is disposed on the holder 1080, and second terminal units 1060 and 1070, which connect the electrodes 1051 and 1052 of the liquid lens 1050 to the first terminal unit 1040.

The first terminal unit 1040 may include a 1-1$^{st}$ terminal unit, which is connected to the first electrode 1051 of the liquid lens 1050, and a 1-2$^{nd}$ terminal unit, which is connected to the second electrode 1052 of the liquid lens 1050.

FIG. 7A illustrates an embodiment of the 1-1$^{st}$ terminal unit.

Referring to FIG. 7A, the 1-1$^{st}$ terminal unit may be disposed on the upper portion, the upper end, or the upper surface of the holder 1080, and may extend from the upper portion, the upper end, or the upper surface of the holder 1080 toward the conductive portion of the conductive member 1090.

The 1-1$^{st}$ terminal unit may include at least one 1-1$^{st}$ terminal. In an example, the 1-1$^{st}$ terminal unit may include a plurality of 1-1$^{st}$ terminals 1004A to 1004F.

In an example, the 1-1$^{st}$ terminal unit may include a first portion 1053*a*, which is disposed on the upper portion, the upper end, or the upper surface of the holder 1080, a second portion 1053*b*, which is connected or coupled to the conductive portions 1091-1 to 1091-4 of the conductive member 1090, and a third portion 1053*c*, which interconnects the first portion 1053*a* and the second portion.

The second portion 1053*b* of the 1-1$^{st}$ terminal unit may project from the side surfaces 1080A and 1080B of the holder 1080, and may be coupled to the conductive portions 1091-1 to 1091-4 by means of the conductive adhesive 1068B.

The first portion 1053*a* of the 1-1$^{st}$ terminal unit may be disposed on the upper surface 1008*a* of the holder 1080, the third portion 1053*c* thereof may be disposed on the side surfaces 1080A and 1080B of the holder 1080, one end of the third portion 1053*c* may be connected to one end of the first portion 1053*a*, and the other end of the third portion 1053*c* may be connected to one end of the second portion 1053*b*.

The 1-1$^{st}$ terminal unit may include a first bent portion 1053*d*, and the first bent portion 1053*d* may connect one end of the first portion 1053*a* to one end of the third portion 1053*c*, and may be bent from the upper surface 1008*a* of the holder 1080 toward the side surfaces 1080A and 1080B of the holder 1080.

The 1-1$^{st}$ terminal unit may further include a second bent portion 1053*e*. The second bent portion 1053*e* may connect the other end of the third portion 1053*c* to one end of the second portion 1053*b*, and may be bent from the side surfaces 1080A and 1080B of the holder 1080 in the outward direction of the holder 1080.

In an example, the third portion 1053*c* may form a right angle with the first portion 1053*a* and the second portion 1053*b*, but the disclosure is not limited thereto.

In an example, at least one (e.g. 1004A to 1004D) of the 1-1$^{st}$ terminals 1004A to 1004F may include at least one of the first to third portions 1053*a* to 1053*c* and the first and second bent portions 53*d* and 53*e*.

The 1-1$^{st}$ terminals 1004A to 1004F may be disposed on two side surfaces 1080A and 1080B of the holder 1080, which are located opposite each other. In an example, four 1-1$^{st}$ terminals 1004A, 1004D, 1004E, and 1004F may be disposed on four corners of the upper portion of the holder 1080, and two 1-1$^{st}$ terminals 1004B and 1004C may be disposed between two 1-1$^{st}$ terminals 1004A and 1004D disposed on two corners of the holder 1080.

For example, the shape of the first portion 1053*a* may be a shape that is bent once, for example, a "¬" shape, but the disclosure is not limited thereto.

At least one of the 1-1$^{st}$ terminals 1004A to 1004F may include at least one extension portion 1053-1, which is bent and extends from the first portion 1053*a*. Although the 1-1$^{st}$ terminal unit is illustrated in FIG. 24A as including one extension portion 1053-1, the disclosure is not limited thereto. In another embodiment, two or more extension portions may be provided.

The at least one extension portion 1053-1 may be located in the holder 1080, and may be enveloped by the holder 1080. In an example, the extension portion 1053-1 may not be exposed outside the holder 1080, but the disclosure is not limited thereto. In another embodiment, at least part of the extension portion 1053-1 may be exposed outside the holder 1080.

The first portion 1053*a* may have a recess 1053A formed in one side surface thereof which is adjacent to the extension portion 1053-1, in order to facilitate bending of the extension portion 1053-1. In an example, the recess 1053A may be formed adjacent to each of both sides of the extension portion 1053-1.

The upper surface of the first portion 1053*a* of the 1-1$^{st}$ terminal unit may be exposed from the upper surface of the holder 1080, the third portion 1053*c* and the first and second bent portions 1053*d* and 1053*e* may be exposed from the first and second side surfaces 1080A and 1080B of the holder 1080, and the second portion 1053*b* may project from the first side surface 1080A or the second side surface 1080B of the holder 1080.

The second portion 1053*b* of the 1-1$^{st}$ terminal unit may have a recess 1053B or a hole formed therein.

The recess 1053B may be formed in the side surface of the second portion 1053*b* of the 1-1$^{st}$ terminal unit. The recess 1053B in the second portion 1053*b* may be a region in which the conductive adhesive member 1068B is disposed or applied in order to be coupled to the conductive member 1090.

The recess 1053B may take a form depressed into the side surface of the second portion 1053*b*. In an example, the shape of the recess 1053B viewed from above may be a semicircular shape, a semi-elliptical shape, or a polygonal shape, such as a triangular shape, a quadrangular shape, or a cross shape.

In another embodiment, in place of the recess 1053B, a through-hole may be formed in the second portion 1053*b* of the 1-1$^{st}$ terminal unit.

FIG. 24B illustrates an embodiment of the 1-2$^{nd}$ terminal unit 1004G.

Referring to FIG. 24B, the 1-2$^{nd}$ terminal unit 1004G may include a first portion 1054*a* (or a first coupling portion), which is exposed downwards from the holder 1080, a second portion 1054*b* (or a second coupling portion), which projects from the side surface 1080B of the holder 1080, and a third portion 1054*c*, which interconnects the first portion 1054*a* and the second portion 1054*b*.

In an example, the 1-2$^{nd}$ terminal unit 1004G may include a first portion 1054*a*, which is connected or coupled to the third terminal unit 1070, a second portion 1054*b*, which is connected or coupled to the conductive portion 92-5 of the conductive member 1090, and a third portion 1054*c*, which interconnects the first portion 1054*a* and the second portion 1054*b*.

In addition, in an example, the 1-2$^{nd}$ terminal unit 1004G may include a first bent portion 1054*d*, and the first bent portion 1054*d* may connect one end of the first portion 1053*a* to one end of the third portion 1053*c*, and may be bent from one end of the first portion 1054*a* toward the upper surface 1008*a* of the holder 1080.

The 1-2$^{nd}$ terminal unit 1004G may further include a second bent portion 1054*e*. The second bent portion 1054*e* may connect the other end of the third portion 1054*c* to one end of the second portion 1054*b*, and may be bent from the side surface 1080B of the holder 1080 in the outward direction of the holder 1080.

The 1-2$^{nd}$ terminal unit 1004G may include an extension portion 1054*b*1, which is connected to one end of the third portion 1054*c* and projects or extends from the side surface of the holder 1080. In an example, the length by which the extension portion 1054*b*1 extends may be shorter than the length by which the second portion 1054*b* projects or extends from the side surface 1080B of the holder 1080.

The first portion 1054*a* of the 1-2$^{nd}$ terminal unit 1004G may be disposed below the upper surface 1008*a* of the holder 1080. The second portion 1054*b* may project from the side surface 1080B of the holder 1080. At least part of the third portion 1054*c* may be disposed on the upper surface 1008*a* and the side surface 1080B of the holder 1080.

The holder 1080 may have a hole 1025B formed therein to expose at least a portion of the 1-2$^{nd}$ terminal unit 1004G downwards from the holder 1080.

In an example, the holder 1080 may have therein a hole 1025B formed between the opening 81A and the side surface 1080B of the holder 1080.

The hole 1025B may be formed through the holder 1080 in the optical-axis direction, but the disclosure is not limited thereto. In another embodiment, the holder may have a recess depressed into the lower surface thereof to expose the lower surface of the first portion 1054*a* of the 2-1$^{st}$ terminal 1004G.

The second portion 1054*b* of the 1-2$^{nd}$ terminal unit 1004G may have a recess 1054B or a hole formed therein.

The recess 1054B may be formed in the side surface of the second portion 1054*b* of the 1-2$^{nd}$ terminal unit 1004G. The recess 1054B in the second portion 1054*b* may be a region in which the conductive adhesive member 1068B is disposed or applied in order to be coupled to the conductive member 1090.

The recess 1054B may take a form depressed into the side surface of the second portion 1054*b* of the 1-2$^{nd}$ terminal unit 1004G. In an example, the shape of the recess 1054B viewed from above may be a semicircular shape, a semi-elliptical shape, or a polygonal shape, such as a triangular shape, a quadrangular shape, or a cross shape.

In another embodiment, in place of the recess 1054B, a through-hole may be formed in the second portion 1054*b* of the 1-2$^{nd}$ terminal unit 1004G.

In an example, the first portion 1054*a* of the 2-1$^{st}$ terminal 1004G may be located at a lower position than the first portion 1053*a* of each of the 1-1$^{st}$ terminals 1004A to 1004F of the 1-1$^{st}$ terminal unit, but the disclosure is not limited thereto. In another embodiment, the former may be disposed at the same height as the latter.

The third portion 1054*c* of the 1-2$^{nd}$ terminal unit 1004G may include a first region 1003A, which is connected to the first portion 1054*a* and extends in the upward direction, a second region 1003B, which is connected to the second portion 1054*b* and extends in the upward direction, and a third region 1003C, which interconnects the first region 1003A and the second region 1003B.

In an example, the first region 1003A may be disposed in the hole 1025B, the second region 4B may be disposed on the side surface 1080B of the holder 1080, and the third region 1003C may be disposed on the upper surface 1008*a* of the holder 1080, which is adjacent to the side surface 1080B of the holder 1080.

In an example, the first region 1003A and the second region 1003B may have a linear shape, and the third region 1003C may have a curved or bent shape that is convex upwards, for example, a, "∩" shape, but the disclosure is not limited thereto. In another embodiment, the third region may have a linear shape.

In an example, the portion of the first region 1003A that is connected to the first portion 1054*a* may have a bent or curved shape, and the portion of the second region 1003B that is connected to the second portion 1054*b* may have a bent or curved shape.

In an example, at least part of the first portion 1054*a* of the 1-2$^{nd}$ terminal unit may overlap a portion of the 2-2$^{nd}$ terminal unit 1070 in the optical-axis direction.

In an example, the 1-2$^{nd}$ terminal unit may be disposed on the side surface 1080B of the holder 1080, and may be disposed between two 1-1$^{st}$ terminals 1004E and 1004F.

The first terminal unit 1040 may have a structure in which a separate terminal or conductor is coupled or bonded to the holder 1080, but the disclosure is not limited thereto. In another embodiment, the first terminal unit 1040 and the holder 1080 may be integrally formed with each other through insert injection molding.

The second terminal units 1060 and 1070 may include at least one terminal connecting the first terminal unit 1040 to the conductive member 1090.

In an example, the second terminal units 1060 and 1070 may include a 2-1$^{st}$ terminal unit 1060, which connects the 1-1$^{st}$ terminal unit to the conductive portions 1090-1 to 1090-4, and a 2-2$^{nd}$ terminal unit 1070, which connects the 1-2$^{nd}$ terminal unit 1004G to the conductive portion 1090-5.

In an example, the 2-1$^{st}$ terminal unit 1060 may include a plurality of 2-1$^{st}$ terminals 1061 to 1066, which are spaced apart from each other. In an example, the 2-1$^{st}$ terminal unit 1060 may include six terminals 1061 to 1066 spaced apart from each other.

The 2-2$^{nd}$ terminal unit 1070 may include at least one 2-2$^{nd}$ terminal. In an example, the 2-2$^{nd}$ terminal unit 1070 may include one 2-2$^{nd}$ terminal, but the disclosure is not limited thereto. In another embodiment, the 2-2$^{nd}$ terminal unit may include two or more 2-2$^{nd}$ terminals.

At least a portion of the second terminal units 1060 and 1070 may be disposed on the first terminal units 1004A to 1004G.

At least a portion of the 2-1$^{st}$ terminal unit 1060 may be disposed on the 1-1$^{st}$ terminal units 1004A to 1004F. In an example, at least a portion of the 2-1$^{st}$ terminal unit 1060 may be disposed on the first portions 1053*a* of the 1-1$^{st}$ terminal units 1004A to 1004F. In an example, at least a portion of the 2-1$^{st}$ terminal unit 1060 and the first portions 1053*a* of the 1-1$^{st}$ terminal units 1004A to 1004F may overlap each other in the optical-axis direction.

A conductive adhesive member 1068A may be disposed between at least a portion of the 2-1$^{st}$ terminal unit 1060 and the first portion 1053*a* of each of the 1-1$^{st}$ terminal units 1004A to 1004F to directly couple and conductively connect the two components to each other.

At least a portion of the 2-2$^{nd}$ terminal unit 1070 may be disposed below the 1-2$^{nd}$ terminal unit 1004G. In an example, at least a portion of the 2-2$^{nd}$ terminal unit 1070 may be disposed below the first portion 1054*a* of the 1-2$^{nd}$ terminal unit 1004G. In an example, at least a portion of the 2-2$^{nd}$ terminal unit 1070 may overlap the first portion 1054*a* of the 1-2$^{nd}$ terminal unit 1004G in the optical-axis direction.

A conductive adhesive member 1068B may be disposed between at least a portion of the 2-2$^{nd}$ terminal unit 1070 and the first portion 1054*a* of the 1-2$^{nd}$ terminal unit 1004G to directly couple and conductively connect the two components to each other.

In an example, each of the 2-1$^{st}$ terminals 1061 to 1066 may be coupled to a corresponding one of the first electrodes 1051-1 to 1051-4, 1051-6, and 1051-10 of the liquid lens 1050.

In an example, the 2-2$^{nd}$ terminal unit 1070 may be coupled to any one of the second electrodes 1052-1 to 1052-4.

Referring to FIG. 25A, the 2-1$^{st}$ terminal unit 1060 may include a first portion 1060-1 coupled to the first electrode 1051, a second portion 1060-2 coupled to the first portion 1053*a* of the first terminal unit 1040 disposed on the holder 1080, and a third portion 1060-3 interconnecting the first portion 1060-1 and the second portion 1060-2.

The first portion 1060-1 may be conductively connected to the first electrode 1051. In an example, the first portion 1060-1 may be directly coupled or connected to the first electrode 1051 by means of a conductive adhesive 1068-1 (refer to FIG. 33A), such as conductive epoxy or Ag epoxy.

The third portion 1060-3 may alternatively be referred to as a "connection portion". Although FIG. 25A illustrates only the first portion 1060-1, the second portion 1060-2, and the third portion 1060-3 of the 2-1$^{st}$ terminal 61 of the 2-1$^{st}$ terminal unit 1060, the description of the first to third portions 60-1, 60-2, and 60-3 of the first terminal 1061 may also apply to the other terminals 1062 to 1066 of the 2-1$^{st}$ terminal unit 1060.

In addition, in an example, the second portion 1060-2 of the 2-1$^{st}$ terminal unit 1060 may include a portion projecting from the side surfaces 1080A and 1080B of the holder 1080.

In an example, the 2-1$^{st}$ terminal unit 1060 may include a protruding portion 121A (refer to FIG. 28), which extends from one side surface (or side wall) of the second portion 1060-2 and projects from the side surfaces 1080A and 1080B of the holder 1080.

The first portion 1060-1 of the 2-1$^{st}$ terminal unit 1060 may overlap the first portions 1053*a* of the 1-1$^{st}$ terminals 1004A to 1004F of the 1-1$^{st}$ terminal unit in the direction of the optical axis OA.

Referring to FIG. 28, one end of the third portion 1060-3 may be connected or coupled to part of the first portion 1060-1.

In an example, one end of the third portion 1060-3 may be connected or coupled to any one corner or any one edge of the first portion 1060-1.

In an example, one end of the third portion 1060-3 may be connected or coupled to any one of the corners (or the edges) of the first portion 1060-1 that are adjacent to or face the third portion 1060-3 (or the second portion 1060-2).

Although one end of the third portion 1060-3 is illustrated in FIG. 28 as being connected or coupled to the right corner of the first portion 1060-1 when viewed in the direction from the third portion (or the second portion) toward the first portion 1060-1, the disclosure is not limited thereto. In another embodiment, one end of the third portion 1060-3 may be connected or coupled to the left corner (or the left edge) of the first portion 1060-1.

In still another embodiment, one end of the third portion 1060-3 may be connected or coupled to any one outer surface or any one outer side of the first portion 1060-1 that is adjacent to or faces the third portion 1060-3 (or the second portion 1060-2), and may be spaced apart from the corners of the first portion 1060-1.

In an example, the other end of the third portion 1060-3 may be connected or coupled to part of the second portion 1060-2.

In an example, referring to FIG. 28, one end of the third portion 1060-3 and the other end of the third portion 1060-3 may be located opposite each other with respect to a reference line 1402. The reference line 1402 may be a straight line that passes through the center 1401 of the first portion 1060-1 and is parallel to the direction from the first portion 1060-1 toward the second portion 1060-2 or to the lengthwise direction of the first portion 1060-1.

The width DW1 of the third portion 1060-3 of the 2-1$^{st}$ terminal unit 1060 is less than the length DL1 of the third portion 1060-3 of the 2-1$^{st}$ terminal unit 1060 (DW1<DL1). In this case, the length DL1 of the third portion 1060-3 may be the length in the direction in which the third portion 1060-3 extends from one end of the third portion 1060-3, which is connected to the first portion 1060-1, to the other end of the third portion 1060-3, which is connected to the second portion 1060-2. In addition, the width DW1 of the third portion 1060-3 may be the length of the third portion 1060-3 in a direction perpendicular to the direction in which the third portion 1060-3 extends.

The third portion 1060-3 may include at least one curved portion or bent portion.

The third portion 1060-3 may take the form of a leg, and may have the shape of a line that is bent or curved at least once.

The width DW1 of the third portion 1060-3 may be smaller than the width of the first portion 1060-1.

In an example, the width of the first portion 1060-1 may be the length DL11 of the first portion 1060-1 in the lengthwise direction or the length DL12 of the first portion 1060-1 in the crosswise direction.

Alternatively, in another example, the width of the first portion 1060-1 may be the diameter (e.g. the minimum diameter) of the first portion 1060-1.

In this case, the diameter of the first portion 1060-1 may be the length of a straight line that passes through two opposite points on the outer circumferential surface of the first portion 1060-1 and the center of the first portion 1060-1. Alternatively, in another example, the diameter of the first portion 1060-1 may be the length DL11 of the first portion 1060-1 in the lengthwise direction or the length DL12 thereof in the crosswise direction. In an example, the minimum diameter may be the smallest diameter, among the diameters of the first portion 1060-1.

In an example, the width DW1 of the third portion 1060-3 may be less than the length DL11 (or the minimum length) of the first portion 1060-1 in the first horizontal direction (or the lengthwise direction) (DW1<DL11).

In an example, the width DW1 of the third portion 1060-3 may be less than the length DL12 (or the minimum length) of the first portion 1060-1 in the second horizontal direction (or the crosswise direction) (DW1<DL12).

In an example, the area of the upper surface (or the lower surface) of the third portion 1060-3 may be smaller than the area of the upper surface or the lower surface of the first portion 1060-1.

In addition, the width DW1 of the third portion 1060-3 may be smaller than the width of the second portion 1060-2.

For example, the width of the second portion 1060-2 may be the length DL2 of the second portion 1060-2 in the lengthwise direction or the length DL3 of the second portion 1060-2 in the crosswise direction.

Alternatively, in another example, the width of the second portion 1060-2 may be the diameter (e.g. the minimum diameter) of the second portion 1060-2. In this case, the diameter of the second portion 1060-2 may be the length of a straight line that passes through two opposite points on the outer circumferential surface of the second portion 1060-2 and the center of the second portion 1060-2. In an example, the minimum diameter may be the smallest diameter, among the diameters of the second portion 1060-2.

In an example, the width DW1 of the third portion 1060-3 may be less than the length DL2 (or the minimum length) of the second portion 1060-2 in the first horizontal direction (or the lengthwise direction) (DW1<DL2).

In an example, the width DW1 of the third portion 1060-3 may be less than the length DL3 (or the minimum length) of the second portion 1060-2 in the second horizontal direction (or the crosswise direction) (DW1<DL3).

In an example, the area of the upper surface (or the lower surface) of the third portion 1060-3 may be smaller than the area of the upper surface or the lower surface of the second portion 1060-2.

The first portion 1060-1 of the 2-1$^{st}$ terminal unit 1060 may include a 1-1$^{st}$ portion, which overlaps the first electrode 1051 of the liquid lens 1050 in the optical-axis direction, and a 1-2$^{nd}$ portion, which does not overlap the first electrode 1051 in the optical-axis direction. In this case, the area of the upper surface (or the lower surface) of the 1-2$^{nd}$ portion may be smaller than the area of the upper surface (or the lower surface) of the 1-1$^{st}$ portion. In another embodiment, the first portion of the 2-1$^{st}$ terminal unit 1060 may not include the 1-2$^{nd}$ portion.

In an example, the width DW1 of the third portion 1060-3 may be smaller than the width of the 1-1$^{st}$ portion of the 2-1$^{st}$ terminal unit 1060. In addition, in an example, the width DW1 of the third portion 1060-3 may be less than the length (or the minimum length) of the 1-1$^{st}$ portion in the first horizontal direction (or the lengthwise direction). In addition, in an example, the width DW1 of the third portion 1060-3 may be less than the length (or the minimum length) of the 1-1$^{st}$ portion in the second horizontal direction (or the crosswise direction).

Since the width DW1 of the third portion 1060-3 of the 2-1st terminal unit 1060 is less than the width of the first portion 1060-1, the length DL11 of the first portion 1060-1 in the first horizontal direction, and the length DL12 of the first portion 1060-1 in the second horizontal direction, it is possible to reduce the stiffness of the 2-1st terminal unit 1060, thereby inhibiting electrical reliability from being deteriorated by thermal expansion or contraction of the conductive adhesive member 1068 (e.g. Ag epoxy).

Referring to FIG. 26B, the 2-2$^{nd}$ terminal unit 1070 may include a first portion 1070-1 coupled to the second electrode 1052, a second portion 1070-2 disposed on the holder 1080, and a third portion 1070-3 interconnecting the first portion 1070-1 and the second portion 1070-2. The third portion 1070-3 may alternatively be referred to as a "connection portion".

The first portion 1070-1 of the 2-2$^{nd}$ terminal unit 1070 may be conductively connected to the second electrode 1052.

In an example, the first portion 1070-1 may be coupled to the second electrode 1052 by means of a conductive adhesive. The conductive adhesive may be, for example, conductive epoxy or Ag epoxy, but the disclosure is not limited thereto.

The first portion 1070-1 may have a hole (not shown) formed therein. The hole may be a through-hole formed through the first portion 1070-1, and may expose a portion of the second electrode 1052. The contact area between the conductive adhesive, the first portion 1070-1, and the second electrode 1052 may be increased by the hole, whereby bonding strength may be increased and electrical reliability may be improved.

The shape of the hole viewed from above may be any of various shapes such as, for example, a polygonal shape, a circular shape, and a T-shape. Although not shown in FIG. 25A, a through-hole or a recess may also be formed in the first portion 1060-1 of the 2-1$^{st}$ terminal unit 1060.

Although FIG. 26B illustrates the case in which one 2-2$^{nd}$ terminal unit 1070 has the first portion 1070-1, the second portion 1070-2, and the third portion 1070-3, the disclosure is not limited thereto. In the case in which the 2-2$^{nd}$ terminal unit 1070 includes a plurality of 2-2$^{nd}$terminals, the description of the first to third portions 1070-1, 1070-2, and 1070-3 of the 2-2$^{nd}$ terminal unit 1070 may also apply to each of the plurality of 2-2$^{nd}$ terminals.

In addition, the second portion 1070-2 of the 2-2$^{nd}$ terminal unit 1070 may include a region 70D, which protrudes from the side surface (e.g. 80B) of the holder 1080.

The first portion 1070-1 of the 2-2$^{nd}$ terminal unit 1070 may overlap the second electrode 1052 of the liquid lens 1050 in the direction of the optical axis OA. In an example, the first portion 1070-1 of the 2-2$^{nd}$ terminal unit 1070 may overlap the 2-1$^{st}$ electrode 52-1 of the liquid lens 1050 in the direction of the optical axis OA.

The second portion 1070-2 of the 2-2$^{nd}$ terminal unit 1070 may include a region (e.g. 1070B, refer to FIG. 29) that overlaps the first portion 1054*a* of the 1-2$^{nd}$ terminal unit 1004G in the optical-axis direction.

The lower surface of the first portion 1054*a* of the 1-2$^{nd}$ terminal unit 1004G, which is exposed from the holder 1080, and one region of the second portion 1070-2 of the 2-2$^{nd}$ terminal unit 1070 may be coupled or conductively connected to each other via a conductive adhesive (e.g. conductive epoxy or Ag epoxy).

The description made with reference to FIG. 28 may also apply to the 2-1$^{st}$ terminals 1061 to 1066 in FIG. 27.

Referring to FIG. 29, the width DW2 of the third portion 1070-3 of the 2-2$^{nd}$ terminal unit 1070 is less than the length DL4 of the third portion 1070-3 of the 2-2$^{nd}$ terminal unit 1070 (DW2<DL4). In this case, the length DL4 of the third portion 1070-3 may be the length in the direction in which the third portion 1070-3 extends from one end of the third portion 1070-3, which is connected to the first portion 1070-1, to the other end of the third portion 1070-3, which is connected to the second portion 1070-2. In addition, the width DW2 of the third portion 1070-3 may be the length of the third portion 1070-3 in a direction perpendicular to the direction in which the third portion 1070-3 extends.

The third portion 1070-3 may include at least one curved portion or bent portion.

The third portion 1070-3 may take the form of a leg, and may have the shape of a line that is bent or curved at least once.

The width DW2 of the third portion 1070-3 may be smaller than the width of the first portion 1070-1. The width of the first portion 1070-1 may be the length of the first portion 1070-1 in the crosswise direction or the lengthwise direction.

In an example, the width DW2 of the third portion 1070-3 may be less than the length DL21 (or the minimum length) of the first portion 1070-1 in the first horizontal direction (or the lengthwise direction) (DW1<DL21).

In an example, the width DW2 of the third portion 1070-3 may be less than the length DL22 (or the minimum length) of the first portion 1070-1 in the second horizontal direction (or the crosswise direction) (DW1<DL22).

In an example, the area of the upper surface (or the lower surface) of the third portion 1070-3 may be smaller than the area of the upper surface or the lower surface of the first portion 1070-1.

In addition, the width DW2 of the third portion 1070-3 may be smaller than the width of the second portion 1070-2.

The width of the second portion 1070-2 may be the length of the second portion 1070-2 in the crosswise direction or the lengthwise direction.

In an example, the width DW2 of the third portion 1070-3 may be less than the length DL5 (or the minimum length) of the second portion 1070-2 in the first horizontal direction (or the lengthwise direction) (DW2<DL5).

In an example, the width DW2 of the third portion 1070-3 may be less than the length DL6 (or the minimum length) of the second portion 1070-2 in the second horizontal direction (or the crosswise direction) (DW2<DL6).

In an example, the area of the upper surface (or the lower surface) of the third portion 1070-3 may be smaller than the area of the upper surface or the lower surface of the second portion 1070-2.

The first portion 1070-1 of the 2-2$^{nd}$ terminal unit 1070 may include a 1-3$^{rd}$ portion, which overlaps the second electrode 1052 of the liquid lens 1050 in the optical-axis direction, and a 1-4$^{th}$ portion, which does not overlap the second electrode 1052 in the optical-axis direction. In this case, the area of the upper surface (or the lower surface) of the 1-4$^{th}$ portion may be smaller than the area of the upper surface (or the lower surface) of the 1-3$^{rd}$ portion. In another embodiment, the first portion of the 2-2$^{nd}$ terminal unit 1070 may not include the 1-4$^{th}$ portion.

In an example, the width DW2 of the third portion 1070-3 may be smaller than the width of the 1-3$^{rd}$ portion of the 2-2$^{nd}$ terminal unit 1070. In addition, in an example, the width DW2 of the third portion 1070-3 may be less than the length (or the minimum length) of the 1-3$^{rd}$ portion in the first horizontal direction (or the lengthwise direction). In addition, in an example, the width DW2 of the third portion 1070-3 may be less than the length (or the minimum length) of the 1-3$^{rd}$ portion in the second horizontal direction (or the crosswise direction).

Since the width DW2 of the third portion 1070-3 of the 2-2nd terminal unit 1070 is less than the width of the first portion 1070-1, the length DL21 of the first portion 1070-1 in the first horizontal direction, and the length DL22 of the first portion 1070-1 in the second horizontal direction, it is possible to reduce the stiffness of the terminal unit 1070, thereby inhibiting electrical reliability from being deteriorated by thermal expansion or contraction of the conductive adhesive member 1068 (e.g. Ag epoxy).

In the terminal units 1040, 1060, and 1070, the term "terminal unit" may alternatively be referred to as a "lead unit", a "connection terminal unit", an "electrode unit", or a "conductive unit".

The first terminal unit 1040 may protrude from the side surfaces 1080A and 1080B of the holder 1080.

In an example, one end 53*b* of each of the 1-1$^{st}$ to 1-4$^{th}$ terminals 1004A to 1004D may protrude from the first side surface 1080A of the holder 1080. In an example, one end of each of the 1-5$^{th}$ and 1-6$^{th}$ terminals 1004E and 1004F, one end of the 1-2$^{nd}$ terminal unit 1004G, and one end of the 2-2$^{nd}$ terminal unit 1070 may protrude from the second side surface 1080B of the holder 1080. In an example, the first side surface 1080A and the second side surface 1080B of the holder 1080 may be outer surfaces located opposite each other.

In an example, the length by which one end of each of the 1-5$^{th}$ and 1-6$^{th}$ terminals 1004E and 1004F protrudes may be shorter than the length by which one end 53*b* of each of the 1-1$^{st}$ to 1-4$^{th}$ terminals 1004A to 1004D protrudes.

In addition, in an example, the length by which one end of the 2-2$^{nd}$ terminal unit 1070 protrudes may be shorter than the length by which one end 53*b* of each of the 1-1$^{st}$ to 1-4$^{th}$ terminals 1004A to 1004D protrudes.

The terminal units 1040, 1060, and 1070 may be spaced apart from the conductive member 1090, and the terminal units 1040, 1060, and 1070 and the conductive member 1090 may be directly and conductively connected to each other by means of the conductive adhesive member 1068B.

One end of the 2-1$^{st}$ terminal unit 1060, for example the first portion 1060-1, may be coupled to the first electrode 1051 of the lens 1050 by means of the conductive adhesive member.

In addition, the other end of the 2-1$^{st}$ terminal unit 1060, for example the second portion 1060-2, may be coupled to the first portion 1053*a* of the 1-1$^{st}$ terminal unit 1040 by means of the conductive adhesive member 1068A (refer to FIG. 25B).

In addition, the second portions 1053*b* of the 1-1$^{st}$ terminals 1004A to 1004D of the 1-1$^{st}$ terminal unit may be coupled to the conductive portions 1091-1 to 1091-4 of the conductive member 1090 by means of the conductive adhesive member 1068B.

In addition, one end of the 2-2$^{nd}$ terminal unit 1070, for example the first portion 1070-1, may be coupled to the second electrode 1052 of the liquid lens 1050 by means of the conductive adhesive member.

In addition, the other end of the 2-2$^{nd}$ terminal unit 1070, for example the second portion 1070-2, may be coupled to the first portion 1054*a* of the 1-2$^{nd}$ terminal unit 1004G by means of the conductive adhesive member 1068A.

In addition, the second portion 1054*b* of the 1-2$^{nd}$ terminal unit 1004G may be coupled to the conductive portion (e.g. 91-5) of the conductive member 1090 by means of the conductive adhesive member 1068B.

The second portions 1053*b* and 1054*b* of the first terminal unit 1040 may be spaced apart from the conductive member 1090, and may overlap the conductive member 1090 in the vertical direction or the optical-axis direction. The conductive adhesive member 1068B may be disposed between the second portions 1053*b* and 1054*b* of the first terminal unit 1040 and the conductive member 1090. The vertical direction may be parallel to the optical-axis direction.

The 1-1$^{st}$ terminal unit may include at least one terminal disposed on a first side of the holder 1080, and may include at least one terminal disposed on a second side of the holder 1080.

In an example, the four 1-1$^{st}$ terminals 1004A to 1004D of the 1-1$^{st}$ terminal unit may be disposed on the first side of the holder 1080, and the two 1-1$^{st}$ terminals 1004E and 1004F and the 1-2$^{nd}$ terminal unit 1004G may be disposed on the second side of the holder 1080, opposite the first side thereof. Here, the first side of the holder 1080 may be a region on the holder 1080 that is adjacent to the first side surface 1080A of the holder 1080, and the second side of the holder 1080 may be another region on the holder 1080 that is adjacent to the second side surface 1080B of the holder 1080.

The conductive member 1090 may include a plurality of conductive portions 1091-1 to 1091-5.

In an example, the conductive member 1090 may include conductive portions 1091-1 to 1091-4 corresponding to the 1-1$^{st}$ terminals 1004A to 1004D of the 1-1$^{st}$ terminal unit and a conductive portion 1091-5 corresponding to the 1-2$^{nd}$ terminal unit 1004G.

Each of the conductive portions 1091-1 to 1091-5 may be coupled and conductively connected to a corresponding one of the 1-1$^{st}$ terminals 1004A to 1004D and the 1-2$^{nd}$ terminal 1004G by means of the conductive adhesive member 1068B.

Referring to FIG. 27, in an example, each of the plurality of 2-1$^{st}$ terminals 1061 to 1066 of the 2-1$^{st}$ terminal unit 1060 may include a respective one of first portions 1002A1 to 1002F 1 connected or coupled to the first electrode 1051, a respective one of second portions 1002A2 to 1002F2, each coupled to a corresponding one of the 1-1$^{st}$ terminal units, and a respective one of third portions 1002A3 to 1002F3 interconnecting the first portions 1002A1 to 1002F1 and the second portions 1002A2 to 1002F2.

At least one of the second portions 1002A2 to 1002F2 of the 2-1$^{st}$ terminals 1061 to 1066 may have at least one hole (or recess) 1037 formed therein.

In an example, the hole (or the recess) 1037 may be formed through the second portions 1002A2 to 1002F2, and the shape of the hole 1037 viewed from above may be a cross shape, but the disclosure is not limited thereto. In another embodiment, the shape of the hole may be a semicircular shape, a semi-elliptical shape, or a polygonal shape.

For example, the hole 1037 may be formed in the shape of a cross having different widths in the horizontal direction and the vertical direction.

In an example, the cross-shaped hole 1037 may include four extension portions extending in four directions. In the cross-shaped hole 1037, the width W32 (refer to FIG. 20A) of the extension portions extending in the horizontal direction and the width DW31 (refer to FIG. 30A) of the extension portions extending in the vertical direction may be different from each other.

In an example, the width W31 (refer to FIG. 30A) of the extension portions extending in the vertical direction may be larger than the width W32 of the extension portions extending in the horizontal direction (W31>W32). In another embodiment, the width of the extension portions extending in the vertical direction may be equal to or smaller than the width of the extension portions extending in the horizontal direction.

The conductive adhesive member 1068A may be disposed or charged in the hole 1037, and the contact area between the conductive adhesive member 1068A, the 1-1$^{st}$ terminal unit, and the 2-1$^{st}$ terminal unit may be increased by the hole 1037, whereby bonding strength may be increased and the reliability of conductive connection may be improved.

In addition, a portion of the hole (or the recess) 1037 may include at least one opening 1037A that is open toward the side surfaces of the second portions 1002A2 to 1002F2. In this case, the opening 1037A may be open toward the second side surfaces of the second portions 1002A2 to 1002F2, which are located opposite the first side surfaces of the second portions 1002A2 to 1002F2 that are connected to the third portions 1002A3 to 1002F3. By virtue of the opening 1037A, the conductive adhesive member 1068A may be smoothly introduced into the gap between the 1-1$^{st}$ terminal unit and the 2-1$^{st}$ terminal unit, and thus the 1-1$^{st}$ terminal unit and the 2-1$^{st}$ terminal unit may be easily bonded to each other.

In addition, since the opening 1037A is open toward the second side surfaces of the second portions 1002A2 to 1002F2, it is possible to inhibit the conductive adhesive member 1068A from coming into contact with the second portions 1002A2 to 1002F2 of the 2-1st terminal unit 1060. In addition, it is possible to inhibit the conductive adhesive member 1068A from flowing down into the bore in the holder 1080 or coming into contact with the liquid lens 1050. As a result, it is possible to inhibit the generation of foreign substances attributable to the conductive adhesive member and to inhibit the liquid lens 1050 from being damaged or malfunctioning.

Furthermore, if the conductive adhesive member 1068A comes into contact with the second portions 1002A2 to 1002F2 of the 2-1$^{st}$ terminal unit 1060, it may not be possible to sufficiently reduce the stiffness of the above-described 2-1$^{st}$ terminal unit 1060.

At least one of the second portions 1002A2 to 1002F2 of the 2-1$^{st}$ terminals 1061 to 1066 of the 2-1$^{st}$ terminal unit 1060 may include a portion 14A extending toward a third side or a fourth side of the holder 1080.

Referring to FIGS. 26B and 29, in an example, the 2-2$^{nd}$ terminal unit 1070 may include a first portion 1070-1 connected or coupled to the second electrode 1052, a second portion 1070-2 disposed on the holder 1080, and a third portion 1070-3 interconnecting the first portion 1070-1 and the second portion 1070-2.

In an example, the second portion 1070-2 may be disposed on the lower surface of the holder 1080.

In an example, the second portion 1070-2 may include a first region 1070A, which is connected to the third portion 1070-3, a second region 1070B, which is disposed below the first portion 1054*a* of the 1-2$^{nd}$ terminal unit 1004G and is coupled to the first portion 1054*a* of the 1-2$^{nd}$ terminal unit 1004G by means of the conductive adhesive member 1068A, and a third region 1070C, which interconnects the first region 1070A and the second region 1070B.

At least one hole (or recess) 1038 may be formed in the second region 1070B. In an example, the hole (or the recess) 1038 may be formed through the second portion 1070-2, and the shape of the hole 1038 viewed from above may be a cross shape, but the disclosure is not limited thereto. In another embodiment, the shape of the hole may be a semicircular shape, a semi-elliptical shape, or a polygonal shape.

The conductive adhesive member 1068A may be disposed or charged in the hole 1038, and the contact area between the conductive adhesive member 1068A, the 1-2$^{nd}$ terminal unit 1004G, and the 2-2$^{nd}$ terminal unit 1070 may be increased by the hole 1038, whereby bonding strength may be increased and the reliability of conductive connection may be improved.

In addition, a portion of the hole 1038 may include at least one opening 1038A that is open toward the side surface of the second portion 1070-2. In this case, the opening 1038A may be open toward the second side surface of the second portion 1070-2, which is located opposite the first side surface of the second portion 1070-2 that is connected to the third portion 1070-3. By virtue of the opening 1038A, the conductive adhesive member 1068A may be smoothly introduced into the gap between the 1-2$^{nd}$ terminal unit 1004G and the 2-2$^{nd}$ terminal unit 1070, and thus the 1-2$^{nd}$ terminal unit 1004G and the 2-2$^{nd}$ terminal unit 1070 may be easily bonded to each other.

In addition, since the opening 1038A is open toward the second side surface of the second portion 1070-2, it is possible to inhibit the conductive adhesive member 1068A from coming into contact with the second portion 1070-2 of the 2-2$^{nd}$ terminal unit 1070. In addition, it is possible to inhibit the conductive adhesive member 1068A from flowing down into the bore in the holder 1080 or coming into contact with the liquid lens 1050. As a result, it is possible to inhibit the generation of foreign substances attributable to the conductive adhesive member and to inhibit the liquid lens 1050 from being damaged or malfunctioning.

At least part of the first portion 1070-1 of the 2-2$^{nd}$ terminal unit 1070 may overlap a corresponding one (e.g. 1052-1) of the second electrodes 1052-1 to 1052-4 of the liquid lens 1050 in the optical-axis direction.

In an example, at least one recess 1016A1 may be formed in the third region 1070C of the second portion 1070-2. In an example, the length of the third region 1070C of the second portion 1070-2, in which the recess 1016A1 is formed, in the first horizontal direction (or the lengthwise direction) may shorter than the length of the first region 1070A in the second horizontal direction (or the crosswise direction) and/or the length of the second region 1070B in the first horizontal direction (or the lengthwise direction).

The second portion 1070-2 of the 2-2$^{nd}$ terminal unit 1070 may further include a fourth region 1070D, which is connected to the third region 1070C and protrudes or extends from the side surface 1080B of the holder 1080.

In addition, the second portion 1070-2 of the 2-2$^{nd}$ terminal unit 1070 may include a fifth region 1070E, which is connected to the second region 1070B and extends toward a region on the lower surface of the holder 1080, which is located on one side of the second region 1070B.

The second portion 1070-2 of the 2-2$^{nd}$ terminal unit 1070 may be coupled, fixed, or attached to the lower surface 1008*b* of the holder 1080 by means of an adhesive. The fifth region 70E may have a hole 1036 formed therein. The hole 1036 may have a shape similar to the hole 1038. The description of the hole 1038 may also apply to the hole 1036. The hole 1036 may increase the contact area between the adhesive, the second portion 1070-2 of the 2-2$^{nd}$ terminal unit 1070, and the lower surface 1008*b* of the holder 1080, thereby increasing the bonding strength between the holder 1080 and the 2-2$^{nd}$ terminal unit 1070.

The length (or the minimum length) DL5 of each of the first region 1070A and the second region 1070B of the second portion 1070-2 in the first horizontal direction (or the lengthwise direction) may be longer than the length of the third region 1070C in the first horizontal direction, but the disclosure is not limited thereto. In another embodiment, the former may be equal to the latter.

In still another embodiment, at least part of the second portion 1070-2 of the 2-2$^{nd}$ terminal unit 1070 may include a curved portion or a bent portion.

The holder 1080 may have an adhesive injection recess 1081 formed therein to receive an adhesive injected thereinto. The adhesive injection recess 1081 may be formed in the lower surface 1008*b* of the holder 1080. In another embodiment, the adhesive injection recess may be formed in the upper surface of the holder 1080.

The second lens unit 1112 may be disposed above the first lens unit 1130, and may be a region into which light is introduced from outside the lens assembly 1120. That is, the second lens unit 1112 may be disposed above the first lens unit 1130 in the lens barrel 1110.

The second lens unit 1112 may be implemented using a single lens, or may be implemented using two or more lenses. In an example, the two or more lenses of the second lens unit 110 may be aligned along a center axis to form an optical system.

Here, the center axis may be an optical axis OA of the optical system, which is formed by at least one of the second lens unit 1112, the first lens unit 1130, or the third lens unit 1113 included in the camera module 1100, or may be an axis parallel to the optical axis OA.

The optical axis OA may correspond to the center axis of the effective image area (or the active area) of the image sensor 1160. That is, the second lens unit 1112, the first lens unit 1130, the third lens unit 1113, and the image sensor 1160 may be disposed so as to be aligned along the optical axis OA through active alignment (AA).

Here, "active alignment" may mean an operation of aligning the optical axes of the first to third lens units 1111, 1112, and 1130 with each other and adjusting an axis or distance relationship between the image sensor 1160 and the lens units 1111, 1112, and 1130 in order to acquire an improved image.

In addition, each of the lenses included in the second lens unit 1112 may gradually increase in outer diameter in the downward direction (e.g. the −z-axis direction), but the embodiments are not limited thereto.

An exposure lens (not shown) may be provided in front of or on the front surface of the second lens unit 1112. In this case, the exposure lens may protrude so as to be exposed outside the lens barrel 1110. In order to protect the surface of the exposure lens, a cover glass or a coating layer may be provided in front of the exposure lens.

The third lens unit 1113 may be disposed below the first lens unit 1130 in the lens barrel 1110. The third lens unit 1113 may be disposed so as to be spaced apart from the second lens unit 1112 in the optical-axis direction (e.g. the z-axis direction).

The light introduced into the second lens unit 1112 from outside the camera module 1100 may be introduced into the third lens unit 1113 through the first lens unit 1130. The third lens unit 1113 may be implemented using a single lens, or may be implemented using two or more lenses that are aligned along the center axis to form an optical system.

Unlike the first lens unit 1130, each of the second lens unit 1112 and the third lens unit 1113 may be a solid lens, and may be made of glass or plastic. However, the embodiments are not limited to any specific material of each of the second lens unit 1112 and the third lens unit 1113.

Figure 30A:
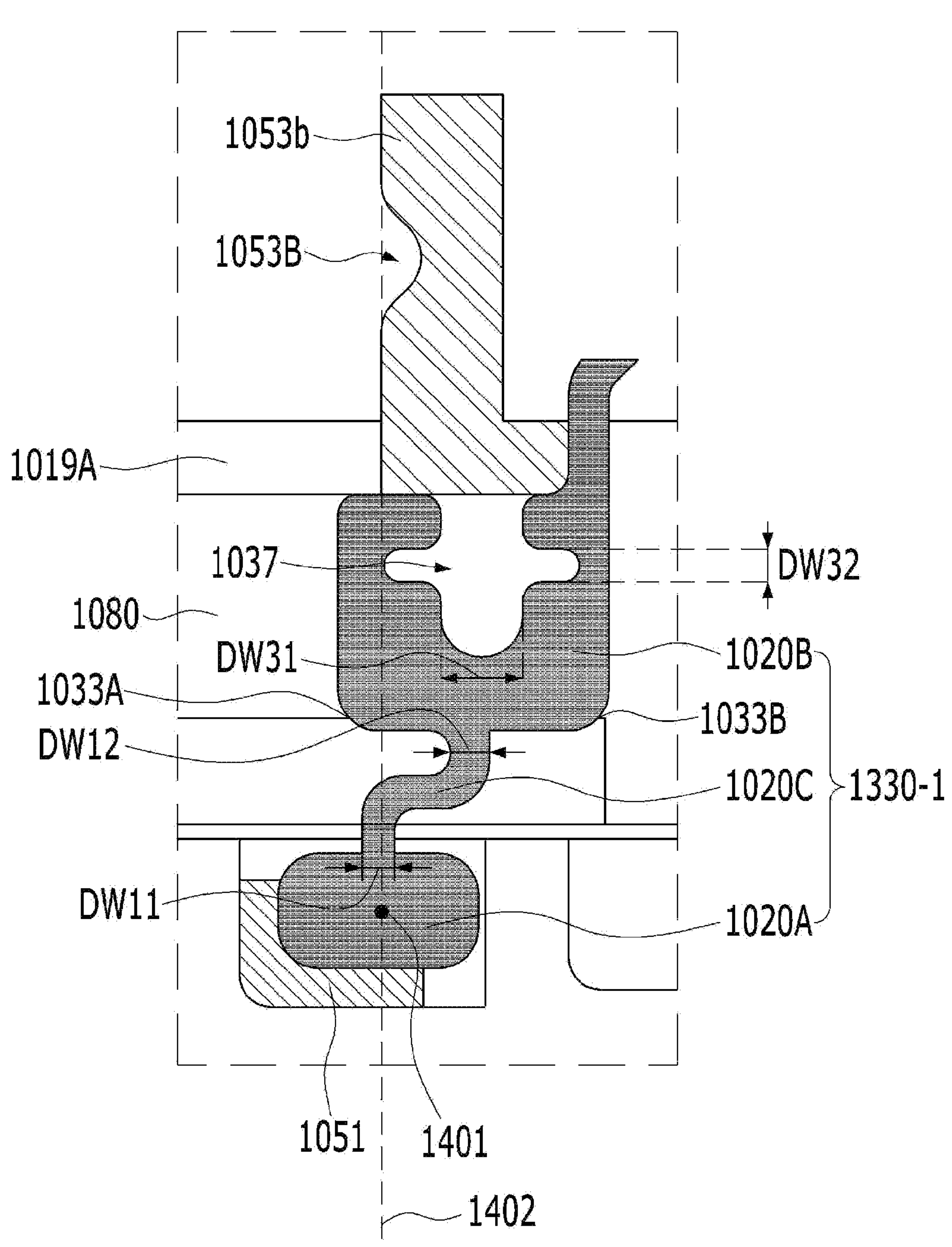
FIGS. 30A to 30D illustrate second terminal units according to other embodiments.

FIG. 30A illustrates a second terminal unit 1330-1 according to another embodiment.

Referring to FIG. 30A, the second terminal unit 1330-1 may include a first portion 1020A coupled to the electrode 1051 or 1052 of the liquid lens 1050, a second portion 1020B coupled to the first terminal unit 1040, and a third portion 1020C interconnecting the first portion 1020A and the second portion 1020B.

The second portion 1020B may be disposed on the holder 1080.

The shape of the first portion 1020A of the second terminal unit 1330-1 viewed from above may be a polygonal shape (e.g. a quadrangular shape, a rectangular shape, or a square shape), but the disclosure is not limited thereto. The shape of the first portion 1020A of the second terminal unit 1330-1 viewed from above in FIG. 20A may be a quadrangular shape (e.g. a rectangular shape) having curved or rounded corners. In still another embodiment, the shape of the first portion 1020A of the terminal unit viewed from above may be an elliptical or circular shape.

In FIGS. 27 and 29, the widths DW1 and DW2 of the third portions 1060-3 and 1070-3 of the second terminal units 1060 and 1070 may be constant from one ends of the third portions 1060-3 and 1070-3 to the other ends of the third portions 1060-3 and 1070-3, but the disclosure is not limited thereto.

As shown in FIG. 30A, the width of part of the third portion 1020C of the second terminal unit 1330-1 may be different from the width of another part of the third portion 1020C of the second terminal unit 1330-1.

In an example, the width DW11 of one end of the third portion 1020C, which is connected to the first portion 1020A, may be smaller than the width DW12 of the other end of the third portion 1020C, which is connected to the second portion 1020B. Alternatively, in another embodiment, the width of one end of the third portion 1020C, which is connected to the first portion 1020A, may be larger than the width of the other end of the third portion 1020C, which is connected to the second portion 1020B. The description of the second terminal unit in FIG. 30A may also apply to at least one of the 2-1$^{st}$ terminal unit 1060 or the 2-2$^{nd}$ terminal unit 1070.

In addition, part of the third portion 1020C may be disposed on the holder 1080. In an example, one end of the third portion 1020C, which is connected to the second portion 1020B, and a region adjacent thereto may be disposed on the holder 1080.

Referring to FIG. 30A, one end of the third portion 1020C may be connected or coupled to the outer surface or the outer side of the first portion 1020A, which is adjacent to and faces the third portion 1020C (or the second portion 1020B), and may be spaced apart from a corner (or an edge) of the first portion 1020A.

In addition, the other end of the third portion 1020C may be spaced apart from the corners (or the edges) 33A and 33B of the second portion 1020B that are adjacent to and face the first portion 1020A.

In an example, when viewed from above, one end of the third portion 1020C may overlap the reference line 1402. In addition, when viewed from above, the other end of the third portion 1020C, which is connected or coupled to the second portion 1020B, may be located on one side of the reference line 1402, and may not overlap the reference line 1402. Here, one side of the reference line 1402 may be the left side or the right side of the reference line 1402.

In another embodiment, one end of the third portion 1020C may be connected or coupled to any one of the corners (or the edges) of the first portion 1020A that are adjacent to and face the third portion 1020C (or the second portion 1020B).

In still another embodiment, the other end of the third portion 1020C may be connected or coupled to any one of the corners (or the edges) 1033A and 1033B of the second portion 1020B that are adjacent to and face the first portion 1020A (or the second portion 1020B).

Figure 30B:
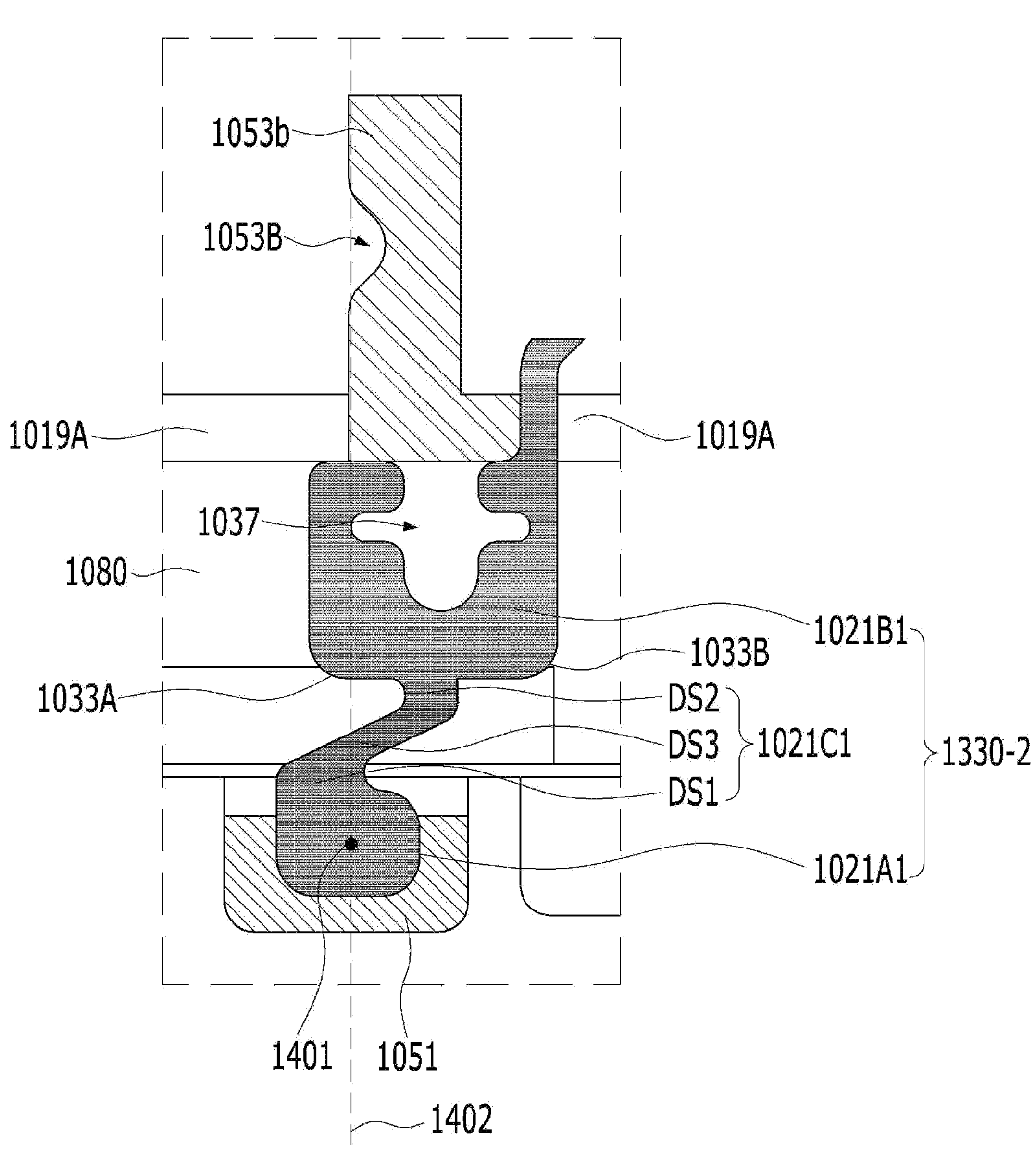

FIG. 30B illustrates a terminal unit 330-2 according to still another embodiment.

Referring to FIG. 30B, the terminal unit 330-2 may include a first portion 1021A1 coupled to the electrode 1051 or 1052 of the liquid lens 1050, a second portion 1021B1 disposed on the holder 1080 and coupled to the first terminal unit 1040, and a third portion 1021C1 interconnecting the first portion 1021A1 and the second portion 1021B1.

Referring to FIG. 30B, with regard to the shape of the first portion 1021A1 viewed from above, reference may be made to the description of the shapes of the first portions 1060-1, 1070-1, and 1020A shown in FIGS. 27 to 29 and 30A.

The third portion 1021C1 may include at least one linear portion and at least one curved portion or bent portion.

In an example, the third portion 1021C1 may include a first region S1 connected to the first portion 1021A1, a second region S2 connected to the second portion 1021B1, and a third region S3 interconnecting the first region S1 and the second region S2.

Each of the first region S1 and the second region S2 may include a curved or bent portion. The second region may take the form of a straight line or an oblique line, but the disclosure is not limited thereto.

The third portion 1021C1 may be formed such that the width thereof gradually decreases and then increases in the direction from the first region S1 toward the second region S2. In an example, the third portion 1021C1 may include a portion that gradually decreases and then increases in width in the direction from the first region S1 toward the second region S2.

In an example, the third portion 1021C1 may include a 3-1$^{st}$ portion (e.g. S1), which gradually decreases in width in the direction from the first region S1 toward the second region S2, and a 3-2$^{nd}$ portion (e.g. S2), which gradually increases in width in the direction from the first region S1 toward the second region S2. In addition, the third portion 1021C1 may further include a 3-3$^{rd}$ portion (e.g. S3), which is formed between the 3-1$^{st}$ portion (e.g. S1) and the 3-2$^{nd}$ portion (e.g. S2) and has a constant width.

In an example, the width of the first region S1 may be larger than the width of the third region S3, and the width of the second region S2 may be larger than the width of the third region S3.

In addition, part of the third portion 1021C1 may be disposed on the holder 1080. In an example, one end of the third portion 21C, which is connected to the second portion 1021B1, and a region adjacent thereto may be disposed on the holder 1080.

One end of the third portion 1021C1 may be connected or coupled to any one of two corners (or edges) of the first portion 1021A1 that are adjacent to and face the third portion 1021C1 (or the second portion 1021B1).

In another embodiment, one end of the third portion 1021C1 may be spaced apart from the two corners (or edges) of the first portion 1021A1.

The other end of the third portion 1021C1 may be connected or coupled to part of the second portion 1021B1.

The other end of the third portion 1021C1 may be connected or coupled to the side surface (or the side wall) of the second portion 1020B that is adjacent to and faces the first portion 1021A (or the second portion 1021B).

In an example, the other end of the third portion 1021C1 may be spaced apart from the corners (or the edges) 1033A and 1033B of the second portion 1020B that are adjacent to and face the first portion 1021A (or the second portion 1021B).

In another embodiment, the other end of the third portion 1021C1 may be connected or coupled to any one of the corners (or the edges) 1033A and 1033B of the second portion 1020B.

In an example, one end of the third portion 1021C1 and the other end of the third portion 1021C1 may be located opposite each other with respect to the reference line 1402. When viewed from above, one end of the third portion 1021C1 and the other end of the third portion 1021C1 may not overlap the reference line 1402.

Figure 30C:
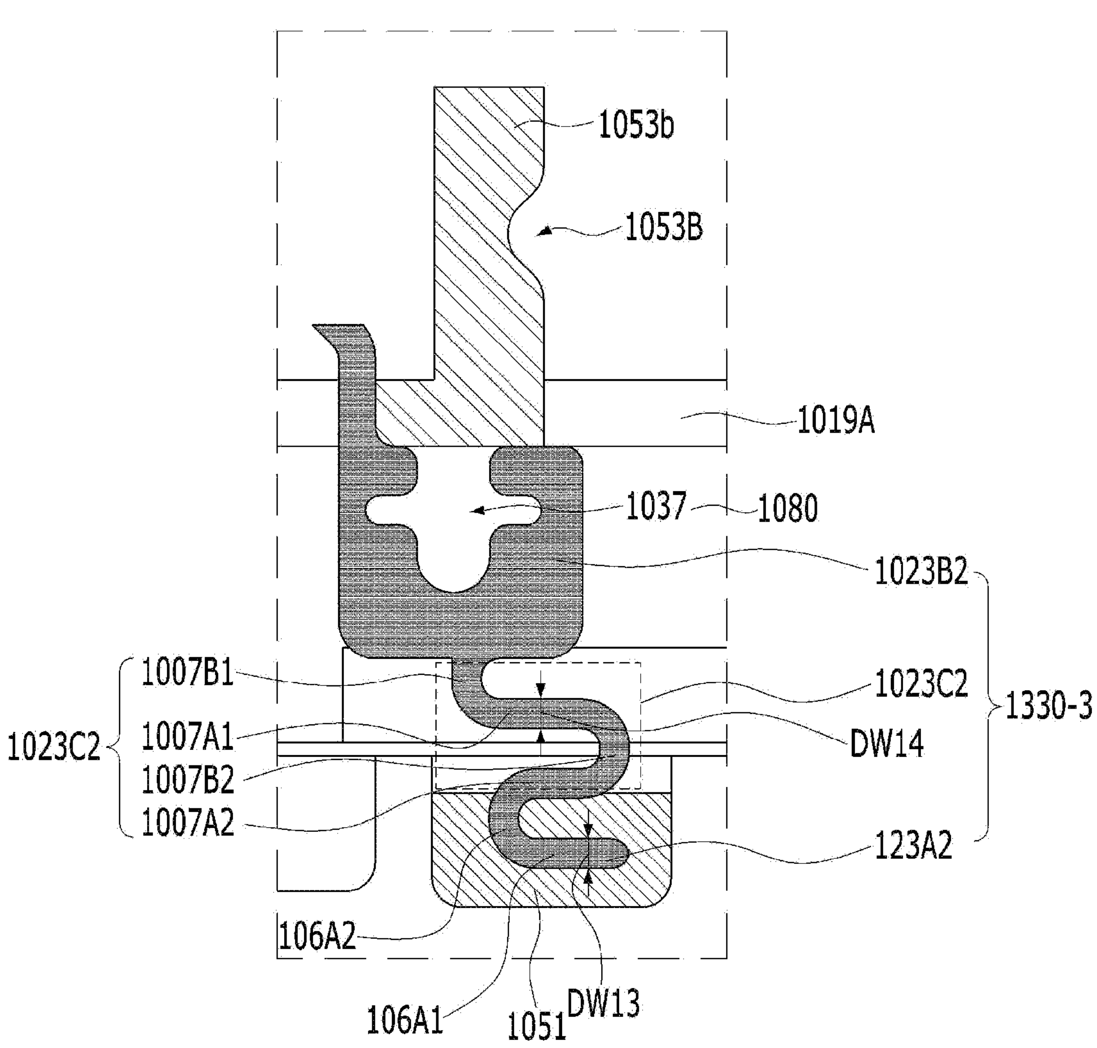

FIG. 30C illustrates a terminal unit 1330-3 according to still another embodiment.

Referring to FIG. 30C, the terminal unit 1330-3 may include a first portion 1023A2 coupled to the electrode 1051 or 1052 of the liquid lens 1050, a second portion 1023B2 disposed on the holder 1080 and coupled to the first terminal unit 1040, and a third portion 1023C2 interconnecting the first portion 1023A2 and the second portion 1023B2.

The first portion 1023A2 may include at least one curved, bent, or rounded portion. The third portion 1023C2 may include at least one curved, bent, or rounded portion.

The width DW13 of the first portion 1023A2 may be equal to the width DW14 of the third portion 1023C2.

The first portion 1023A2 may include at least one linear portion 1006A1 and at least one bent portion 1006A2. The at least one bent portion 1006A2 may be connected to one end of the third portion 1023C2.

The at least one linear portion 1006A1 of the first portion 1023A2 may be parallel to the horizontal direction (e.g. the crosswise direction). Here, the horizontal direction may be a direction that is perpendicular to the direction from the first portion 1023A2 toward the second portion 1023B2.

The third portion 1023C2 may include one or more linear portions 1007A1 and 1007A2 and one or more bent portions 1007B1 and 1007B2.

The linear portions 1007A1 and 1007A2 of the third portion 1023C2 may be parallel to the horizontal direction (e.g. the crosswise direction). In an example, the third portion 1023C2 may include a plurality of linear portions 1007A1 and 1007A2, which are spaced apart from each other, and a plurality of bent portions 1007B1 and 1007B2, which are spaced apart from each other.

Each of the plurality of linear portions 1007A1 and 1007A2 may be parallel to the horizontal direction (e.g. the crosswise direction). One (e.g. 1007A2) of the linear portions 1007A 1 and 1007A2 may be connected to one end (e.g. 1006A2) of the first portion 1023A2.

In addition, the bent portion 1007B1 may connect one (e.g. 1007A1) of the linear portions 1007A1 and 1007A2 to the second portion 1023B2. In addition, the bent portion 1007B2 may interconnect the two adjacent linear portions 1007A1 and 1007A2.

In another embodiment, one of the bent portions of the third portion may be connected to one end of the first portion. In still another embodiment, one of the linear portions of the third portion may be connected to the second portion.

The width of the linear portion and the width of the bent portion may be equal to each other. In another embodiment, the width of the bent portion may be larger than the width of the linear portion. In still another embodiment, the width of the bent portion may be smaller than the width of the linear portion.

Figure 30D:
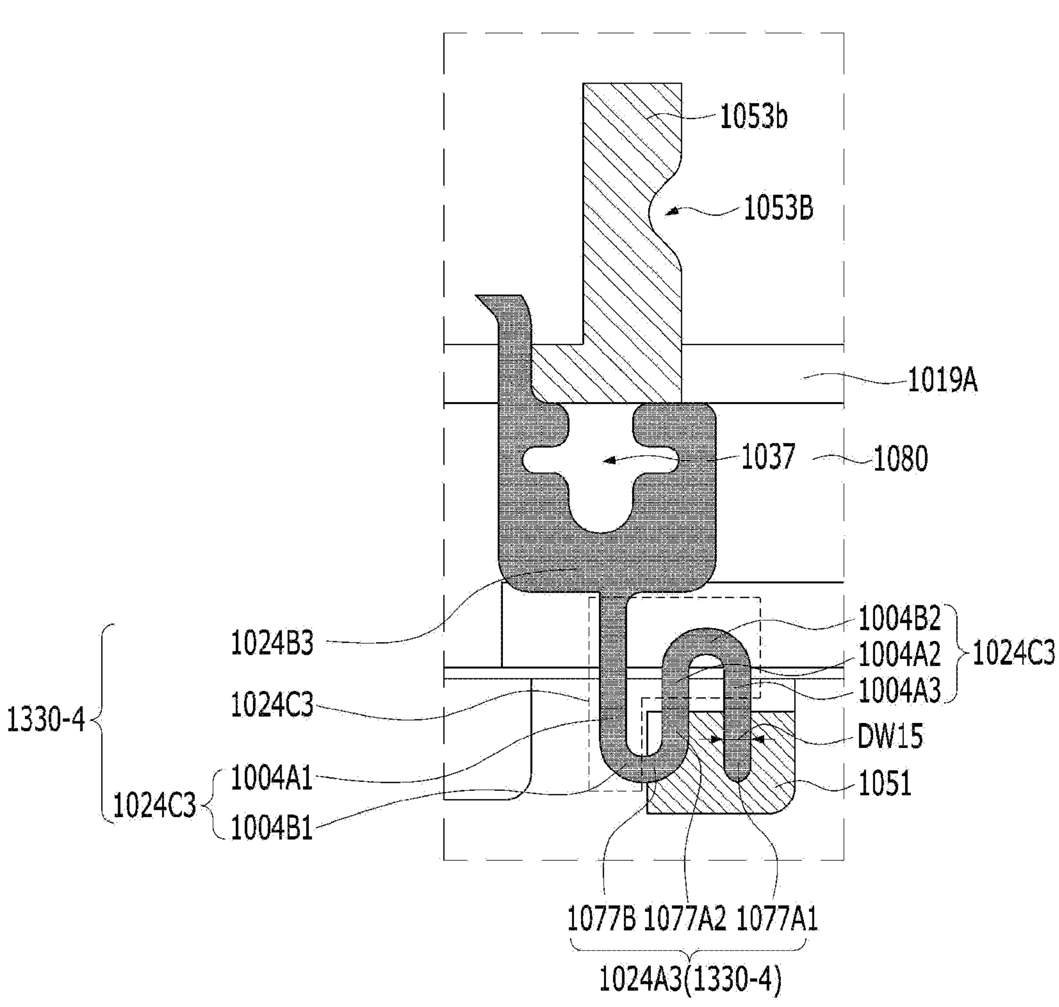

FIG. 30D illustrates a terminal unit 1330-4 according to still another embodiment.

Referring to FIG. 30D, the terminal unit 1330-4 may include a first portion 1024A3 coupled to the electrode 1051 or 1052 of the liquid lens 1050, a second portion 1024B3 disposed on the holder 1080 and coupled to the first terminal unit 1040, and a third portion 1024C3 interconnecting the first portion 1024A3 and the second portion 1024B3.

The first portion 1024A3 may include at least one curved, bent, or rounded portion. The third portion 1024C3 may include at least one curved, bent, or rounded portion.

The width DW15 of the first portion 1024A3 may be equal to the width DW15 of the third portion 1024C3.

The first portion 1024A3 may include one or more linear portions 1077A1 and 1077A2 and at least one bent portion 1077B. The at least one bent portion 1077B may be connected to one end (e.g. 1004A1) of the third portion 1024C3.

The one or more linear portions 1077A1 and 1077A2 of the first portion 1024A3 may be parallel to the vertical direction (e.g. the lengthwise direction). Here, the vertical direction may be a direction that is parallel to the direction from the first portion 1024A3 toward the second portion 1024B3. For example, the vertical direction may be a direction perpendicular to the horizontal direction in FIG. 30C.

The third portion 1024C3 may include one or more linear portions 1004A1, 1004A2, and 1004A3 and one or more bent portions 1004B1 and 1004B2.

The linear portions 1004A1, 1004A2, and 1004A3 of the third portion 1024C3 may be parallel to the vertical direction (e.g. the lengthwise direction). In an example, the third portion 1024C3 may include a plurality of linear portions 1004A1, 1004A2, and 1004A3, which are spaced apart from each other, and a plurality of bent portions 1004B1 and 1004B2, which are spaced apart from each other.

Each of the plurality of linear portions 1004A1, 1004A2, and 1004A3 may be parallel to the vertical direction.

In an example, one (e.g. 1004A1) of the linear portions 1004A1, 1004A2, and 1004A3 may be connected to one end of the second portion 23B3.

In an example, another one (e.g. 1004A2) of the linear portions 1004A1, 1004A2, and 1004A3 may be connected to a corresponding one (e.g. 1077A2) of the linear portions 1077A1 and 1077A2 of the first portion 1024A3. In addition, in an example, still another one (e.g. 1004A3) of the linear portions 1004A1, 1004A2, and 1004A3 may be connected to a corresponding one (e.g. 10077A1) of the linear portions 1077A1 and 1077A2 of the first portion 1024A3.

In addition, in an example, the bent portion 4B1 of the third portion 1024C3 may be connected to the bent portion 1077B of the first portion 1024A3. In addition, in an example, the bent portion 1004B2 of the third portion 1024C3 may interconnect the two adjacent linear portions 1004A2 and 1004A3 of the third portion 1024C3.

The width of the linear portion of the first portion 1024A3 and the width of the bent portion thereof may be equal to each other. In another embodiment, the width of the bent portion of the first portion may be larger than the width of the linear portion thereof. In still another embodiment, the width of the bent portion of the first portion may be smaller than the width of the linear portion thereof.

In addition, the width of the linear portion of the third portion 1024C3 and the width of the bent portion thereof may be equal to each other. In another embodiment, the width of the bent portion of the third portion may be larger than the width of the linear portion thereof. In still another embodiment, the width of the bent portion of the third portion may be smaller than the width of the linear portion thereof.

The description of the holes 1037 and 1038 and the extension portion 1014A in FIGS. 27 to 29 may apply to the embodiments shown in FIGS. 30A to 30D.

In general, a conductive adhesive member, for example Ag epoxy, may be used for conductive connection between a terminal unit and an electrode of a liquid lens. However, due to thermal expansion or contraction of the conductive adhesive member, the conductive connection between the terminal unit and the electrode of the liquid lens may be deteriorated, or may become defective. Thus, the reliability of the conductive connection between the two components may be reduced. In addition, due to thermal expansion or contraction of the conductive adhesive member (e.g. Ag epoxy), contact resistance between the conductive adhesive member and the terminal unit may vary, leading to deterioration in the reliability of the conductive connection between the two components.

According to the embodiments, since the third portions 1060-2 and 1070-2 of the second terminal units 1060 and 1070, which are connected to the first portions 1060-1 and 1070-1 of the second terminal units 1060 and 1070, take the form of a leg, it is possible to reduce the stiffness of the second terminal units, thereby inhibiting electrical reliability from being deteriorated by thermal expansion or contraction of the conductive adhesive member (e.g. Ag epoxy). To this end, according to the embodiments, the widths of the third portions 1060-2 and 1070-2 of the second terminal units 1060 and 1070 may be set to be less than the diameters of the first portions 1060-1 and 1070-1 of the second terminal units 1060 and 1070.

In an example, in the second terminal units 1060 and 1070, the thicknesses of the first portions 1060-1 and 1070-1, the thicknesses of the second portions 1060-2 and 1070-2, and the thicknesses of the third portions 1060-3 and 1070-3 may be equal to each other. In another embodiment, the thicknesses of the third portions 1060-3 and 1070-3 may be smaller than the thicknesses of the first portions 1060-1 and 1070-1 and the thicknesses of the second portions 1060-2 and 1070-2. In still another embodiment, the thicknesses of the third portions 1060-3 and 1070-3 may be larger than the thicknesses of the first portions 1060-1 and 1070-1 and the thicknesses of the second portions 1060-2 and 1070-2.

For example, the widths DW1 of the third portions 1060-3 and 1070-3 may be 1 to 3 times the thicknesses of the third portions 1060-3 and 1070-3. For example, the widths DW1 of the third portions 1060-3 and 1070-3 may be 1.2 to 2 times the thicknesses of the third portions 1060-3 and 1070-3. For example, the widths DW1 of the third portions 1060-3 and 1070-3 may be 1.25 to 1.5 times the thicknesses of the third portions 1060-3 and 1070-3.

When the widths DW1 of the third portions 1060-3 and 1070-3 are less than the thicknesses of the third portions

1060-3 and 1070-3, the third portions may be easily broken by an impact or the like, leading to electrical disconnection. Further, when the widths DW1 of the third portions 1060-3 and 1070-3 are more than 3 times the thicknesses of the third portions 1060-3 and 1070-3, it may not be possible to sufficiently reduce the stiffness of the second terminal units 1060 and 1070, thereby deteriorating the reliability of the conductive connection between the second terminal units 1060 and 1070 and the electrodes 1051 and 1052 of the liquid lens 1050.

In order to reduce the stiffness of the second terminal units 1060 and 1070 to thus ensure the reliability of the conductive connection between the second terminal units 1060 and 1070 and the electrodes 1051 and 1052 of the liquid lens 1050, the widths DW1 of the third portions 1060-3 and 1070-3 may be not more than 1.5 times the thickness of the third portions 1060-3 and 1070-3. Alternatively, for example, the widths DW1 of the third portions 1060-3 and 1070-3 may be 1 to 1.2 times the thicknesses of the third portions 1060-3 and 1070-3.

Figure 31:
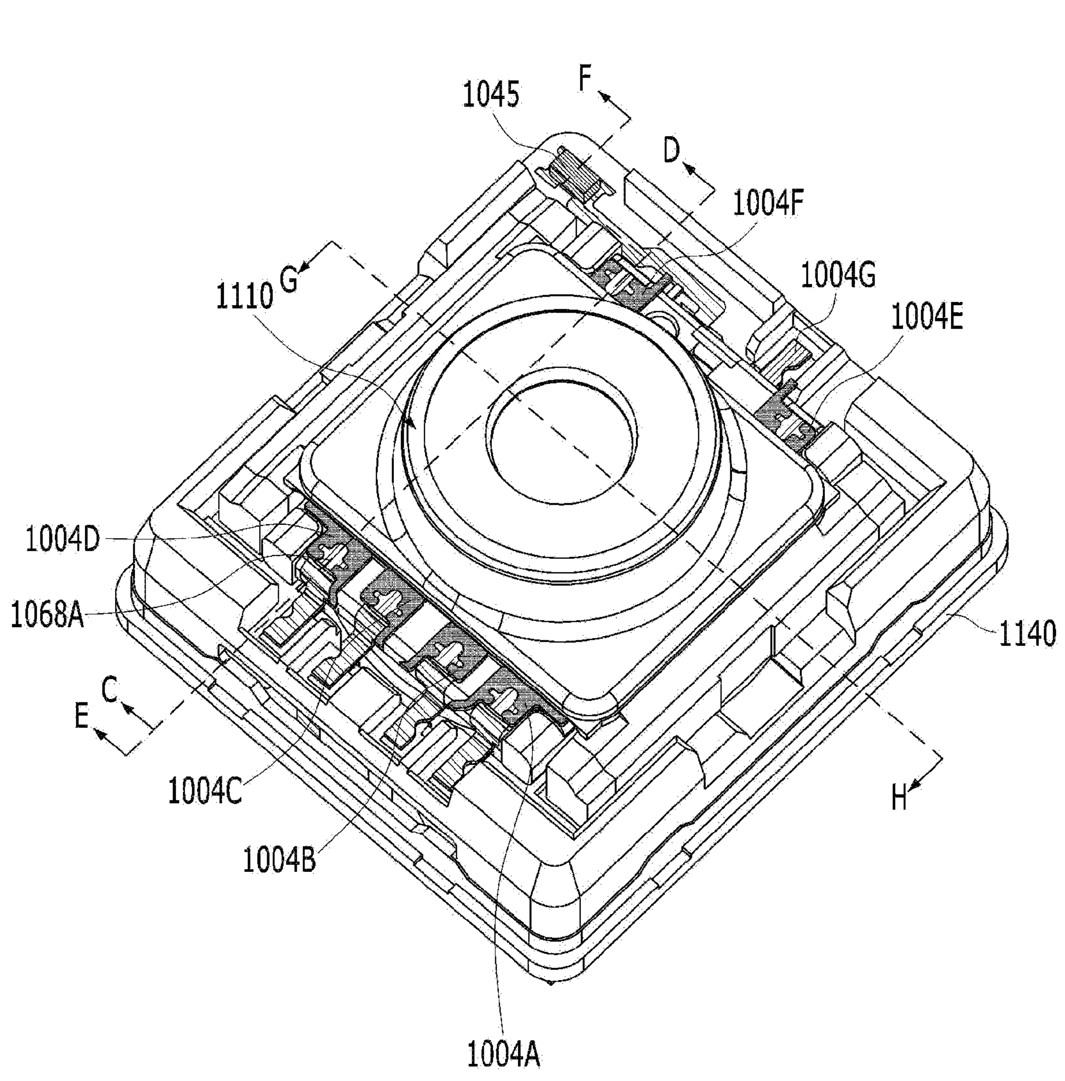
FIG. 31 is a perspective view of the first lens unit, a conductive member, and the lens holder accommodated in the lens barrel.
Figure 32:
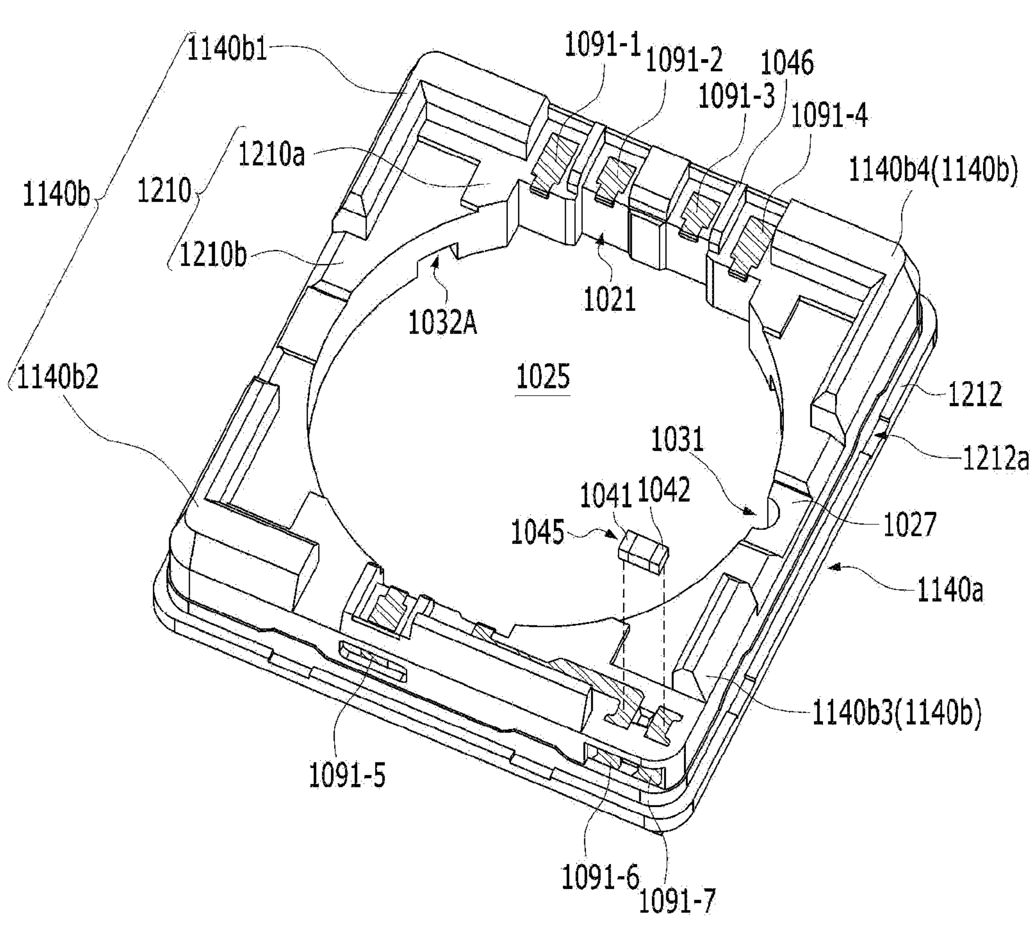
FIG. 32 is a perspective view of the conductive member and the lens holder.
Figure 33A:
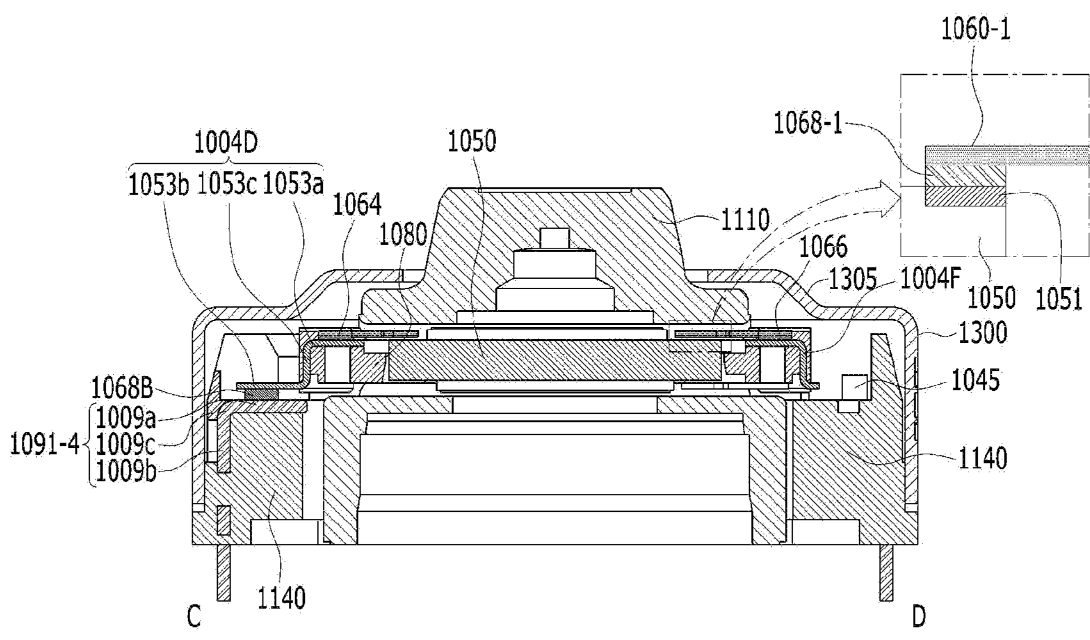
FIG. 33A is a cross-sectional view taken along line CD in the first lens unit and the lens holder in FIG. 31.
Figure 33B:
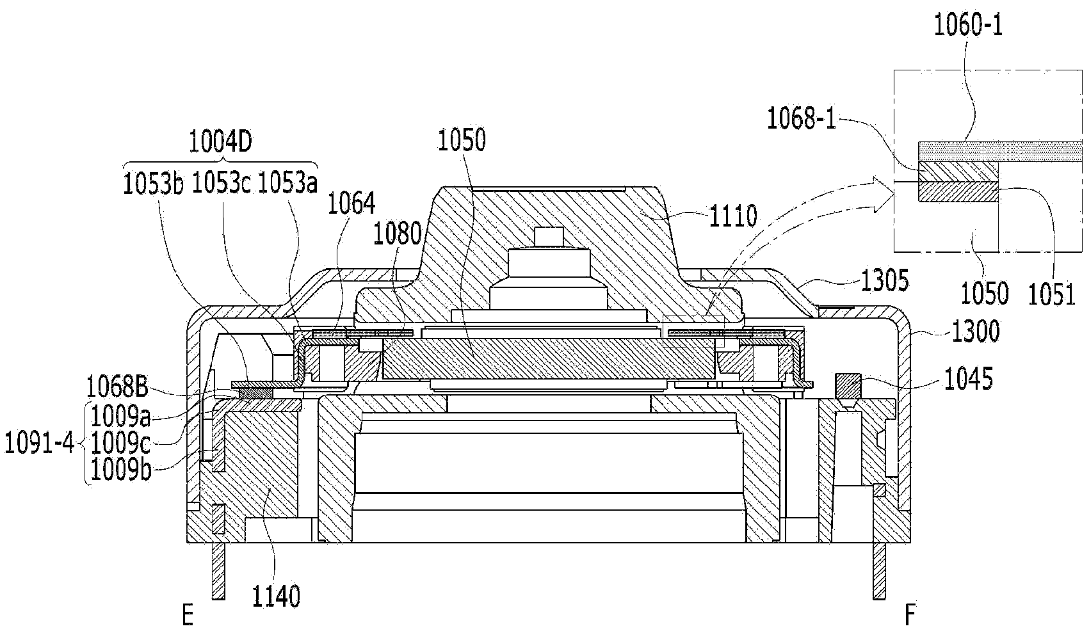
FIG. 33B is a cross-sectional view taken along line EF in the first lens unit and the lens holder in FIG. 31.
Figure 33C:
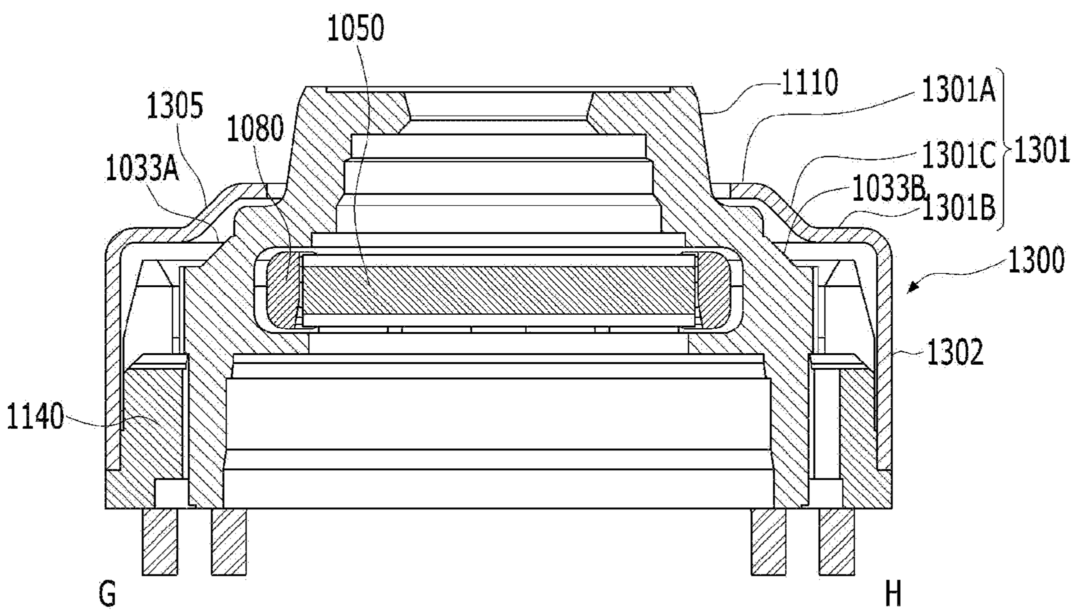
FIG. 33C is a cross-sectional view taken along line GH in the first lens unit and the lens holder in FIG. 31.
Figure 34A:
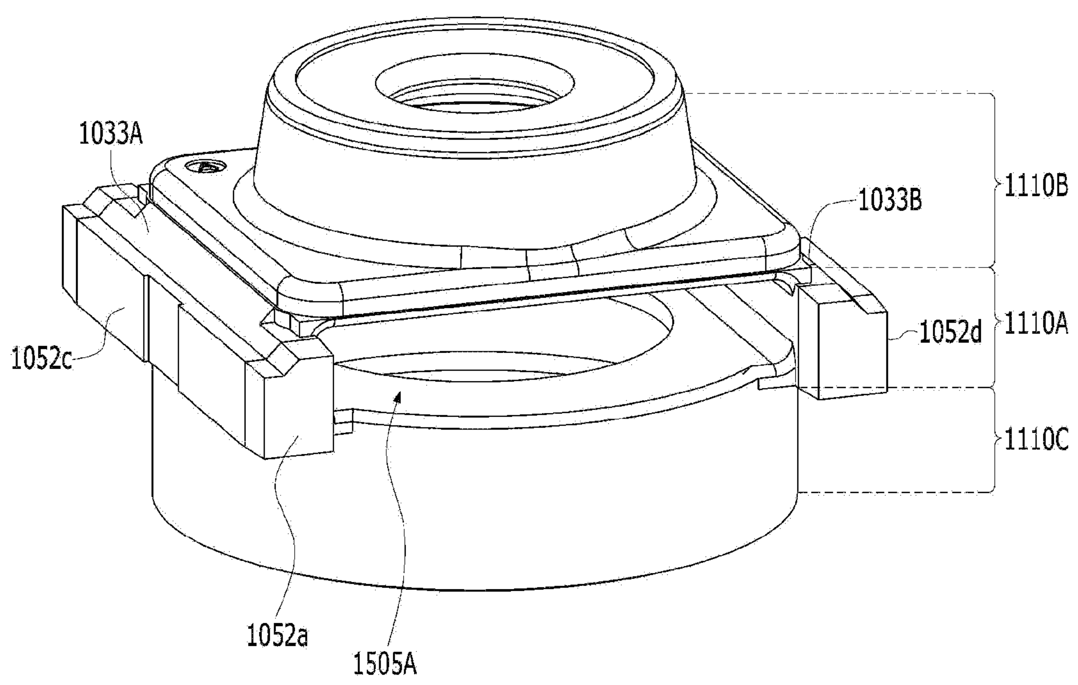
FIG. 34A is a front perspective view of the lens barrel.
Figure 34B:
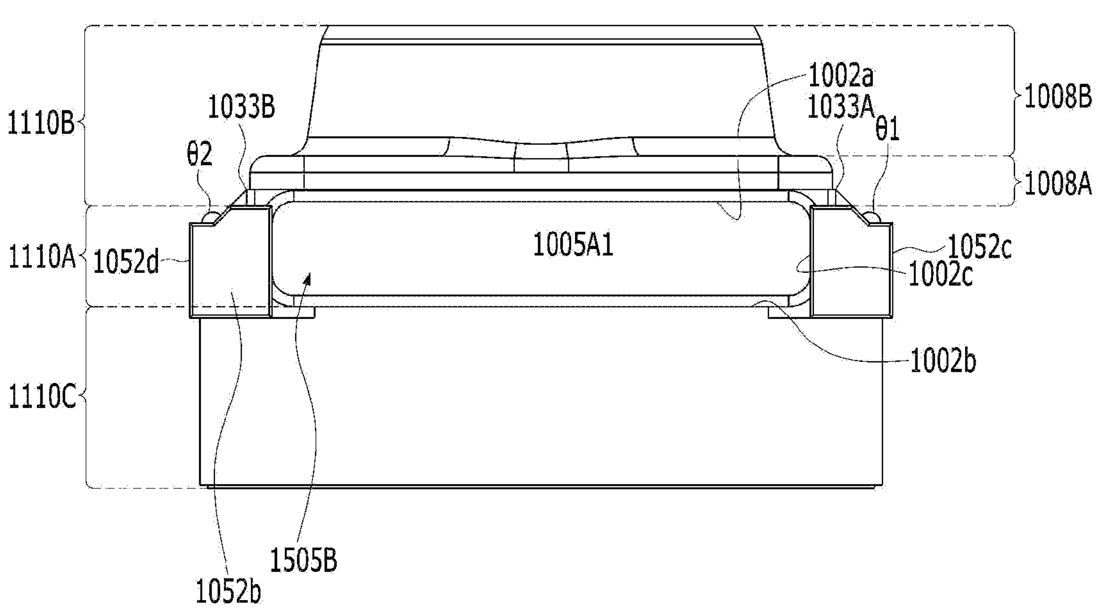
FIG. 34B is a rear side view of the lens barrel.
Figure 35:
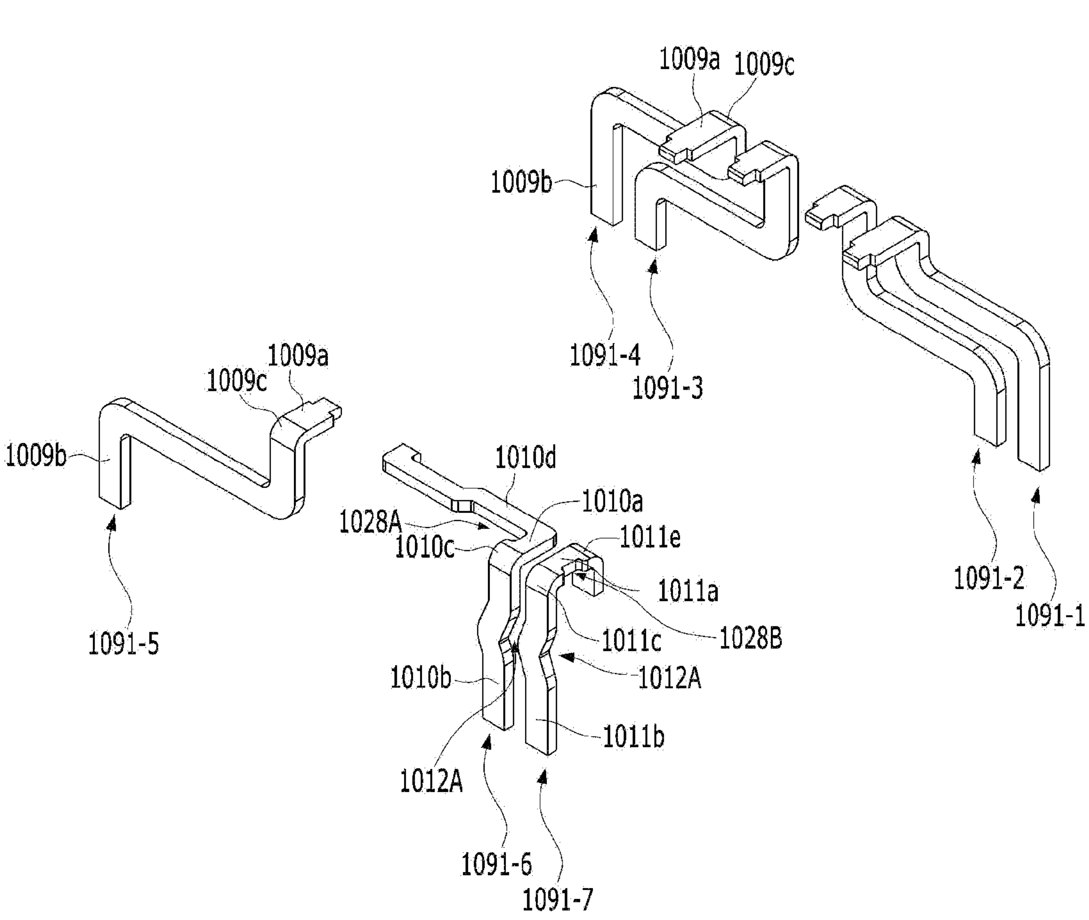
FIG. 35 is a perspective view of conductive portions of the conductive member.
Figure 36A:
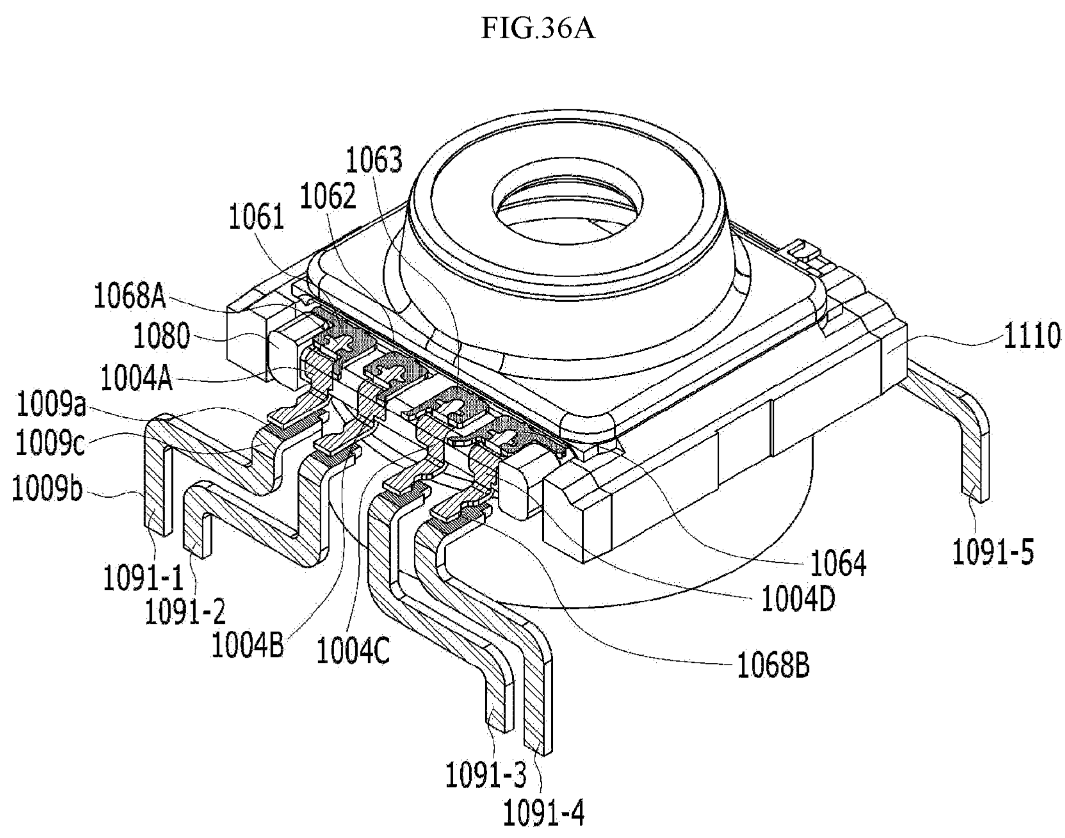
FIG. 36A is a perspective view of a liquid lens unit and the conductive member accommodated in the lens barrel.
Figure 36B:
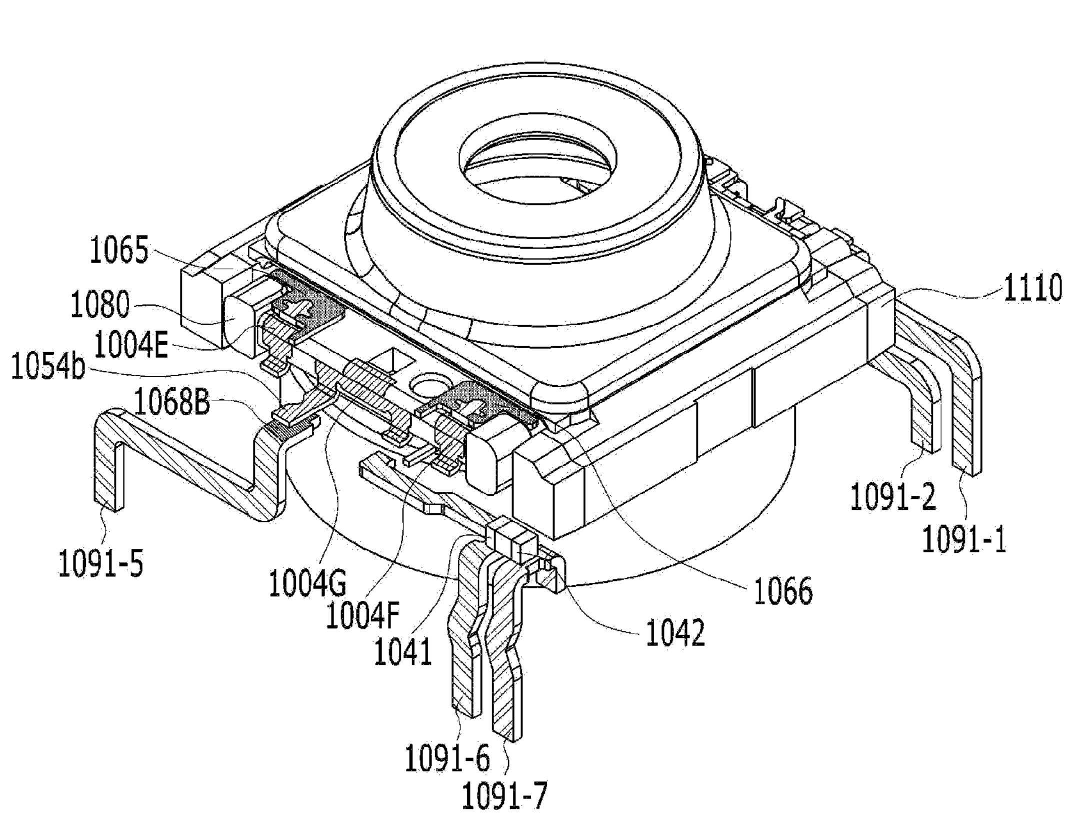
FIG. 36B is a perspective view of the liquid lens unit, the conductive member, and a thermistor accommodated in the lens barrel.

FIG. 31 is a perspective view of the first lens unit 1130, the conductive member 1090, and the lens holder 1140 accommodated in the lens barrel 1110, FIG. 32 is a perspective view of the conductive member 1090 and the lens holder 1140, FIG. 33A is a cross-sectional view taken along line CD in the first lens unit 1130 and the lens holder 1140 in FIG. 14, FIG. 33B is a cross-sectional view taken along line EF in the first lens unit 1130 and the lens holder 1140 in FIG. 14, FIG. 33C is a cross-sectional view taken along line GH in the first lens unit 1130 and the lens holder 1140 in FIG. 14, FIG. 34A is a front perspective view of the lens barrel 1110, FIG. 34B is a rear side view of the lens barrel 1110 in FIG. 34A, FIG. 35 is a perspective view of the conductive portions 1091-1 to 1091-7 of the conductive member 1090, FIG. 36A is a perspective view of the liquid lens unit 120 and the conductive member 1090 accommodated in the lens barrel 1110, and FIG. 36B is a perspective view of the liquid lens unit 120, the conductive member 1090, and the thermistor 1045 accommodated in the lens barrel 1110.

Referring to FIGS. 31 to 36B, the lens holder 1140 may be disposed under the holder 1080, and may accommodate or support the lens barrel 1110.

Referring to FIG. 31, the lens holder 1140 may include a body 1140*a* and at least one protruding portion 1140*b*, which protrudes from the upper surface 1201 of the body 1140*a* in the optical-axis direction.

The body 1140*a* may have a hole 1025 or a cavity formed therein to allow at least a portion of the lens barrel 1110 to be disposed or accommodated therein.

In an example, at least part of a third barrel portion 1110C of the lens barrel 1110 may be disposed in the hole 1025 in the lens holder 1140.

The hole 1025 may have a shape that is the same as or coincides with the shape of at least a portion of the lens barrel 1110. The shape of the hole 1025 viewed from above may be, for example, a circular shape, an elliptical shape, or a polygonal shape, but the disclosure is not limited thereto. In an example, the hole 1025 may be formed through the lens holder 1140 in the optical-axis direction.

The protruding portion 1140*b* may be provided in a plural number.

In an example, the lens holder 1140 may include protruding portions 1140*b*1 to 1140*b*4, which are located on the upper surface 1201 of the body 1140*a* so as to be spaced apart from each other.

In an example, the lens holder 1140 may include protruding portions 1140*b*1 to 1140*b*4 disposed on the corner regions of the body 1140*a*.

In the embodiment, the lens holder 1140 may include a lower surface facing the upper surface of the sensor base 1180. A first adhesive 1161 may be disposed between the upper surface of the sensor base 1180 and the lower surface of the lens holder 1140, and may be bonded to the upper surface of the sensor base 1180 and the lower surface of the lens holder 1140.

The lens holder 1140 may include a partition wall 1146 disposed on the body 1140*a*.

The partition wall 1146 may be disposed on a portion of the body 1140*a* that is located between two adjacent conductive portions 1091-1 and 1091-2, 1091-2 and 1091-3, or 1091-3 and 1091-4 disposed on the body 1140*a*. In an example, the partition wall 1146 may be provided in a plural number.

The plurality of partition walls 1046 may be disposed on the upper surface of the body 1140*a* so as to be spaced apart from each other, and a portion of at least one conductive portion may be disposed between two adjacent partition walls.

The conductive portions 1091-1 to 1091-5 may be disposed on a first side and a second side of the lens holder 1140. The partition walls 1046 may be disposed on at least one of the first side or the second side of the lens holder 1140.

The first side of the lens holder 1140 may be one side of the lens holder 1140 that corresponds to the first side or the first side surface 1080A of the holder 1080, and the second side of the lens holder 1140 may be another side of the lens holder 1140 that corresponds to the second side or the second side surface 1080B of the holder 1080. In an example, the first side and the second side of the lens holder 1140 may be located opposite each other.

When the second portions 1060-2 and 1070-2 of the second terminal units 1060 and 1070 are coupled to the conductive portions 1091-1 to 1090-5 by means of the conductive adhesive member 1068B, the partition walls 1146 may serve to inhibit an electrical short between adjacent conductive portions.

The upper surface 1201 of the body 1140*a* may include a first surface 1201*a* and a second surface 1201*b*, which has a height difference with respect to the first surface 1201*a*.

In an example, the height of the second surface 1201*b* may be lower than the height of the first surface 1201*a*. In an example, the distance from the lower surface of the lens holder 1140 to the second surface 1201*b* may be shorter than the distance from the lower surface of the lens holder 1140 to the first surface 1201*a*.

The lens holder 1140 may have a recess 1027 formed in the second surface 1201*b*.

The recess 1027 may be recessed in the second surface 1201*b*. In an example, the recess 1027 may be formed adjacent to each of a third side and a fourth side of the lens holder 1140. In an example, the recess 1027 may be formed in the center of at least one of the third side or the fourth side.

The third side of the lens holder 1140 may be one side of the lens holder 1140 that corresponds to the third side or the third side surface 1180C of the holder 1080, and the fourth side of the lens holder 1140 may be another side of the lens holder 1140 that corresponds to the fourth side or the fourth side surface 1080D of the holder 1080. In an example, the third side and the fourth side of the lens holder 1140 may be located opposite each other.

The partition walls 1146 may be disposed between the protruding portions 1140*b*1 to 1140*b*4, but the disclosure is not limited thereto. In another embodiment, the partition walls may be disposed on the protruding portions.

The lens holder 1140 may include a stair 1212 or a stepped portion.

The stair 1212 may be formed on the outer side surface of the lens holder 1140.

The stair 1212 may be formed on the lower end of the outer side surface of the lens holder 1140.

A side plate 1302 of the cover 1300 may be disposed on the stair 1212. In an example, the stair 1212 and the lower end of the side plate 1302 of the cover 1300 may be coupled to each other, but the disclosure is not limited thereto. In another embodiment, the stair 1212 and the lower end of the side plate 1302 of the cover 1300 may be spaced apart from each other.

The lens holder 1140 may have formed therein a recess 132A that serves as a bonding tank, into which an adhesive, for example glue, is applied.

The recess 132A may be formed in the lower surface or the lower portion of the lens holder 1140. In an example, the recess 132A may be formed in the lower portion or the lower surface of the body 1140*a*.

In an example, the recess 132A may be formed in the inner circumferential surface or the inner side surface of the lens holder 1140, which is defined by the hole 1025.

The recess 132A may extend from the lower surface of the lens holder 1140, and may be spaced apart from the upper surface of the lens holder 1140. An adhesive may be injected into the recess 132A, and the lens holder 1140 and the lens barrel 1110 may be coupled to each other by means of the injected adhesive.

A vent hole (or a recess) 1031, which is a passage through which gas is discharged, may be formed in the inner circumferential surface of the lens holder 1140. The vent hole 1310 may form a passage between the lens holder 1140 and the lens assembly 1120 so that the gas generated in the course of curing of the adhesive 1161 is discharged to the lens assembly 1120.

The conductive member 1090 may be disposed on the lens holder 1140.

The first to fifth conductive portions 1091-1 to 1091-5 of the conductive member 1090 may be coupled to the first terminal unit 1040 of the first lens unit 1130, and may be conductively connected to the first terminal unit 1040. The first to fifth conductive portions 1091-1 to 1091-5 of the conductive member 1090 may be coupled to the thermistor 1045, and may be conductively connected to the thermistor 1045.

In addition, the conductive member 1090 may be coupled to the terminals 1195 of the substrate 1190, and may be conductively connected to the terminals 1195. In an example, each of the conductive portions 1091-1 to 1091-7 of the conductive member 1090 may be conductively connected to a corresponding one of the terminals 1195 of the substrate 1190 via solder or a conductive adhesive member.

The conductive member 1090 may be spaced apart from the cover 1300.

The conductive member 1090 may include a plurality of conductive portions 1091-1 to 1091-7, which are spaced apart from each other. Although seven conductive portions are illustrated in FIG. 32, the disclosure is not limited thereto. The conductive member 1090 may include any number of conductive portions equal to or greater than one.

The conductive portion may alternatively be referred to as a "terminal", a "lead", an "electrode", a "bonding portion", or a "lead frame".

The conductive member 1090 may be integrally formed with the lens holder 1140 through insert injection molding. In another embodiment, the conductive portions of the conductive member 1090 may be structured such that separate terminals are bonded to the lens holder 1140.

In still another embodiment, each of the conductive portions of the conductive member 1090 may include a conductive layer formed on the surface of the lens holder 1140. In this case, the conductive layer may be formed on the surface of the lens holder 1140 using a molded interconnection device (MID) technology.

Referring to FIG. 35, each of the first to fifth conductive portions 1091-1 to 1091-5 may include a first coupling portion 1009*a* to be coupled to the second portions 1060-2 and 1070-2 of the second terminal units 1060 and 1070, a second coupling portion 1009*b* to be connected or coupled to a corresponding one of the terminals 1195 of the substrate 1190, and a connection portion 1009*c* interconnecting the first coupling portion 1009*a* and the second coupling portion 1009*b*.

In addition, the sixth conductive portion 1091-6 may include a first coupling portion 1010*a* to be coupled to the first terminal 1041 of the thermistor 1045, a second coupling portion 1010*b* to be connected or coupled to a corresponding one of the terminals 1195 of the substrate 1190, and a connection portion 1010*c* interconnecting the first coupling portion 1010*a* and the second coupling portion 1010*b*.

In addition, the sixth conductive portion 1091-6 may include an extension portion 1010*d* connected to the first coupling portion 1010*a* and extending toward the 1-2$^{nd}$ terminal unit 1004G. In an example, the upper surface of the extension portion 1010*d* may be exposed from the lens holder 1140, but the disclosure is not limited thereto. In another embodiment, the upper surface of the extension portion 1010*d* may be disposed in the lens holder 1140, rather than being exposed. In an example, the extension portion 1010*d* may include at least one of a linear shape or a curved or bent shape.

In addition, the seventh conductive portion 1091-7 may include a first coupling portion 1011*a* to be coupled to the second terminal 1042 of the thermistor 1045, a second coupling portion 1011*b* to be connected or coupled to a corresponding one of the terminals 1195 of the substrate 1190, and a connection portion 1011*c* interconnecting the first coupling portion 1011*a* and the second coupling portion 1011*b*.

In addition, the seventh conductive portion 1091-7 may include an extension portion 1011*d* connected to the first coupling portion 1011*a* and extending from the first coupling portion 1011*a*. The extension portion 1011*d* may be bent and extend from the first coupling portion 1011*a* toward the lower surface of the lens holder 1140. In addition, the seventh conductive portion 1071-7 may include a bent portion 1011*e* interconnecting the first coupling portion 1011*a* and the extension portion 1011*d*.

The first coupling portion 1010*a* of the sixth conductive portion 1091-6 may have a recess 1028A formed therein, and the first coupling portion 1011*a* of the seventh conductive portion 1091-7 may have a recess 1028B formed therein.

The recess 1028A may be formed in the first side surface of the first coupling portion 1010*a*, and the region on the first coupling portion 1010*a* in which the recess 1028A is formed may be a region in which the conductive adhesive member 1068B is disposed or applied in order to be coupled to the first terminal 1041 of the thermistor 1045.

The second side surface of the first coupling portion 1010*a* may be a side surface located opposite the first side surface of the first coupling portion 1010*a*, the second side surface of the first coupling portion 1011*a* may be a side surface located opposite the first side surface of the first coupling portion 1011*a*, and the second side surface of the first coupling portion 1010*a* and the second side surface of the first coupling portion 1011*a* may face each other.

The recess 1028B may be formed in the first side surface of the first coupling portion 1011*a*, and the region on the first coupling portion 1011*a* in which the recess 1028B is formed may be a region in which the conductive adhesive member 1068B is disposed or applied in order to be coupled to the second terminal 1042 of the thermistor 1045.

The recess 1028A may be depressed in the first side surface of the first coupling portion 1010*a*, and the recess 1028B may be depressed in the first side surface of the first coupling portion 1011*a*. In an example, the shape of each of the recesses 1028A and 1028B viewed from above may be a semicircular shape, a semi-elliptical shape, or a polygonal shape, such as a triangular shape, a quadrangular shape, or a cross shape.

The recesses 1028A and 1028B may increase the contact area between the conductive adhesive member 1068B and the first coupling portions 1010*a* and 1011*a*, thereby increasing the coupling strength between the first and second terminals 1041 and 1042 of the thermistor 1045 and the conductive portions 1091-6 and 1091-7 and improving the reliability of the conductive connection therebetween.

The first coupling portions 1009*a*, 1010*a*, and 1011*a* may be in contact with the conductive adhesive member 1068B.

The conductive adhesive member 1068B may include at least one of solder or a conductive adhesive. In an example, the conductive adhesive member 1068B may include Ag epoxy. The conductive adhesive member 1068B may be disposed between the plurality of partition walls 1046 of the lens holder 1140.

The first coupling portions 1009*a* of the first to fifth conductive portions 1091-1 to 1091-5 may be disposed on the first side and the second side of the lens holder 1140. In an example, the first coupling portions 1009*a* may be disposed on the upper surface, the upper portion, or the upper end of each of the first side and the second side of the lens holder 1140.

The upper surface of the first coupling portion 1009*a* may include a portion that is exposed from the upper surface of the lens holder 1140. The exposed portion of the first coupling portion 1009*a* may be coplanar with the first surface 1201*a*, but the disclosure is not limited thereto. In another embodiment, the exposed portion of the first coupling portion 1009*a* may be located at a lower or higher position than the first surface 1201*a*.

In addition, the exposed portion of the first coupling portion 1009*a* may be located at a lower position than the upper ends or the upper surfaces of the partition walls 1046 (or the protruding portions 1140*b*).

In addition, in an example, the width of one end of the first coupling portion 1009*a* may be smaller than the width of the other end of the first coupling portion 1009*a*, which is connected to the connection portion 1009*c*, but the disclosure is not limited thereto. In another embodiment, the width of one end of the first coupling portion 1009*a* may be equal to or larger than the width of the other end thereof.

In an example, the first coupling portions 1010*a* and 1011*a* of the sixth and seventh conductive portions 1091-6 and 1091-7 may be disposed on any one corner of the lens holder 1140. In an example, the first coupling portions 1010*a* and 1011*a* of the sixth and seventh conductive portions 1091-6 and 1091-7 may be disposed on the corner of the lens holder 1140 that is located between the second side and the fourth side of the lens holder 1140.

Referring to FIGS. 36A and 36B, the upper surfaces of the first coupling portions 1009*a* of the first to fifth conductive portions 1091-1 to 1091-5 may be disposed below the lower surfaces of the second portions 1053*b* and 1054*b* of the first terminal unit 1040.

The first coupling portions 1009*a* of the first to fifth conductive portions 1091-1 to 1091-5 may overlap the second portions 1053*b* and 1054*b* of the first terminal unit 1040 in the vertical direction or the optical-axis direction.

In addition, the upper surfaces of the first coupling portions 1010*a* and 1011*a* of the sixth and seventh conductive portions 1091-6 and 1091-7 may be disposed below the lower surfaces of the first and second electrodes 1041 and 1042 of the thermistor 1045.

The first coupling portions 1010*a* and 1011*a* of the sixth and seventh conductive portions 1091-6 and 1091-7 may overlap the first and second electrodes 1041 and 1042 of the thermistor 1045 in the vertical direction or the optical-axis direction.

In an example, the second coupling portions 1009*b*, 1010*b*, and 1011*b* of the conductive portions 1091-1 to 1091-7 may be disposed in the lens holder 1140, and the lens holder 1140 may have at least one opening 1049 formed therein to expose at least part of the second coupling portions 1009*b*, 1010*b*, and 1011*b*. In an example, the opening 1049 may be formed in the first side and the second side of the lens holder 1140. In another embodiment, the second coupling portions of the conductive portions 1091-1 to 1091-7 may be disposed on the outer surface of the lens holder 1140, and may be exposed from the outer surface of the lens holder 1140.

In an example, the second coupling portions 1009*b*, 1010*b*, and 1011*b* of the conductive portions 1091-1 to 1091-7 may protrude downwards from the lower surface of the lens holder 1140, but the disclosure is not limited thereto. In another embodiment, the second coupling portions may not protrude downwards from the lower surface of the lens holder 1140.

In an example, the second coupling portions 1009*b*, 1010*b*, and 1011*b* of the conductive portions 1091-1 to 1091-7 may include at least one of a linear shape or a curved shape (or a bent shape). In this case, the linear shape may include at least one of a first linear shape parallel to the optical axis or a second linear shape perpendicular to the optical axis.

In an example, the connection portions 1009*c*, 1010*c*, and 1011*c* may have a curved or bent shape.

Each of the conductive portions 1091-1 to 1091-7 may be formed such that the width of at least part thereof is different from the width of another part thereof.

The second coupling portion 1010*b* of the sixth conductive portion 1091-6 may have at least one recess 1012A formed therein, and the second coupling portion 1011*b* of the seventh conductive portion 1091-7 may have at least one recess 1012B formed therein.

The recess 1012A may be formed in the second side surface of the second coupling portion 1010*b*, and may be depressed in the second side surface of the second coupling portion 1010*b*.

The recess 1012B may be formed in the first side surface of the second coupling portion 1011*b*, and may be depressed in the first side surface of the second coupling portion 1011*b*.

The second side surface of the second coupling portion 1010*b* and the second side surface of the second coupling portion 1011*b* may face each other. The first side surface of the second coupling portion 1011*b* may be a side surface located opposite the second side surface of the second coupling portion 1011*b*, and the first side surface of the second coupling portion 1010*b* may be a side surface located opposite the second side surface of the second coupling portion 1010*b*.

In an example, when the second coupling portions 1010*b* and 1011*b* are viewed from the front, the shape of each of the recesses 1012A and 1012B may be a semicircular shape, a semi-elliptical shape, or a polygonal shape, such as a triangular shape, a quadrangular shape, or a cross shape.

Although each of the second coupling portions 10*b* and 11*b* is illustrated in FIG. 35 as having therein one recess 1012A or 1012B, the disclosure is not limited thereto. In another embodiment, each of the second coupling portions 1010*b* and 1011*b* have a plurality of recesses formed therein.

The first and second terminals of the thermistor may be coupled to the first coupling portions of the conductive portions of the lens holder through a primary soldering process using surface mounter technology (SMT), and thereafter, a secondary soldering process may be performed in order to couple the second coupling portions of the conductive portions to the terminals of the substrate.

However, the heat generated during the secondary soldering process may be transferred to the solder (hereinafter referred to as "first solder"), by which the first coupling portions are coupled to the first and second terminals of the thermistor, through the second coupling portions, which may cause the first solder to melt, leading to deterioration in the reliability of the conductive connection between the first coupling portions and the first and second terminals of the thermistor.

The recesses 1012A and 1012B according to the embodiment may reduce the transfer of the heater generated during the secondary soldering process to the first solder, thereby inhibiting deterioration in the reliability of the conductive connection between the first coupling portions 1010*a* and 1011*a* and the first and second terminals 1041 and 1042 of the thermistor 1045 when the secondary soldering process is performed.

Although the conductive adhesive member 1068B is described as being provided separately from the conductive member 1090, the conductive adhesive member 1068B may be embodied as a component of the conductive member 1090.

In the embodiment, the second portions 1053*b* and 1054*b* of the first terminal unit 1040 of the first lens unit 1130 may be embedded in the conductive adhesive member 1068B. Accordingly, conductive connection may be achieved without applying external pressure to the first terminal unit 1040 of the first lens unit 1130.

The thermistor 1045 may detect the temperature of the camera module 1100. For example, the thermistor 1045 may detect the temperature of the liquid lens 1050.

For example, the thermistor 1045 may be embodied as a thermistor in which a resistance value varies depending on changes in temperature, but the disclosure is not limited thereto. The thermistor 1045 may include a first electrode 1041 and a second electrode 1042, and a drive signal (e.g. drive voltage or drive current) may be supplied to the first electrode 1041 and the second electrode 1042.

The first and second electrodes 1041 and 1042 of the thermistor 1045 may be conductively connected to the sixth and seventh conductive portions 1091-6 and 1091-7 via the conductive adhesive member 1068B.

The cover 1300 may cover the lens holder 1140, and may accommodate the lens holder 1140.

The cover 1300 may define the external appearance of the camera module 1100. The cover 1300 may be formed in the shape of a polyhedron, for example, a hexahedron, which is open at the lower surface thereof.

The cover 1300 may be a nonmagnetic body. The cover 1300 may be made of a metal material.

For example, the cover 1300 may be embodied as a metal plate.

The cover 1300 may be connected to the ground of the substrate 1190. Accordingly, the cover 1300 may be grounded. The cover 1300 may block electromagnetic interference (EMI). In this case, the cover 1300 may be referred to as an "EMI shield can". In another embodiment, the cover 1300 may not be conductively connected to the ground of the substrate 1190.

The cover 1300 may include an upper plate 1301 and a side plate 1302 extending from the upper plate 1301. The upper plate 1301 of the cover 1300 may have a bore (or a hole) 303 formed therein to expose at least a portion of the lens barrel 1110 therethrough.

The cover 1300 may have a recess 1304 formed in the lower end of the side plate 1302 thereof so as to correspond to the recess 212*a* in the stepped portion 1212 of the lens holder 1140.

Referring to FIGS. 34A and 34B, the lens barrel 1110 may include a first barrel portion 1110A in which the first lens unit 1130 is disposed or accommodated, a second barrel portion 1110B in which the second lens unit 1112 is disposed or accommodated, and a third barrel portion 1110C in which the third lens unit 1113 is disposed or accommodated.

The second barrel portion 1110B may be disposed on the first barrel portion 1110A, and the third barrel portion 1110C may be disposed under the first barrel portion 1110A.

The first barrel portion 1110A may include a body and an accommodation space 1005A defined in the body. The first lens unit 1130 may be disposed in the accommodation space 1005A in the body of the first barrel portion 1110A. The accommodation space 1005A may have a shape suitable for accommodating the first lens unit 1130. Here, the "accommodation space" may alternatively be referred to as a "space".

In an example, the first barrel portion 1110A may include an inner upper surface 1002*a*, an inner lower surface 1002*b*, and an inner side surface 2*c* interconnecting the inner upper surface 1002*a* and the inner lower surface 1002*b* in order to define the accommodation space 1005A.

The first barrel portion 1110A may include a first side surface (or a first outer side surface) 1052*a* and a second side surface (or a second outer side surface) 1052*b*, which are located opposite each other, and a third side surface (or a third outer side surface) 1052*c* and a fourth side surface (or a fourth outer side surface) 1052*d*, which interconnect the first side surface 1052*a* and the second side surface 1052*b* and are located opposite each other. In an example, the accommodation space 1005A in the first barrel portion 1110A may be defined inside the first to fourth side surfaces 1052*a* to 1052*d* of the first barrel portion 110A.

At least one of the first side surface 1052*a* or the second side surface 1052*b* of the first barrel portion 1110A may have at least one opening 1505A or 1505B formed therein to allow the first lens unit 1130 to be inserted thereinto or to be assembled thereto.

By virtue of the first and second openings 1505A and 1505B, the accommodation space 1005A in the first barrel portion 1110A may be open toward the outside of the body of the first barrel portion 1110A.

In an example, one end of the first lens unit 1130 may project outside the first opening 1505A in the first barrel portion 1110A, and the other end of the first lens unit 1130 may project outside the second opening 1505B in the first barrel portion 1110A.

The second barrel portion 1110B may protrude from the upper portion of the body of the first barrel portion 1110A. In an example, the second barrel portion 1110B may protrude from the upper part of the first barrel portion 1110A in the optical-axis direction or the upward direction.

In an example, the second barrel portion 1110B may include a first body 1008A and a second body 1008B disposed on the first body 1008A.

At least part of the second barrel portion 11101B may be exposed through the bore 1303 in the cover 1300. In an example, the second body 1008B of the second barrel portion 1110B may be exposed through the bore 1303 in the cover 1300. In an example, the second body 1008B of the second barrel portion 1110B may project outside the cover 1300 through the bore 1303 in the cover 1300.

The diameter of the bore 1303 in the cover 1300 may be larger than the diameter of the outer circumference of the second body 1008B.

Inclined portions 1033A and 1033B, which correspond to an inclined portion 1301C of the cover 1300, may be formed on the outer circumferential surface of the lens barrel 1110 at a position between the first barrel portion 1110A and the second barrel portion 1110B.

The upper plate 1301 of the cover 1300 may include a first stage (or a "first portion") 1301A, which is contiguous with the bore 1303, a second stage (or a "second portion") 1301B, which has a height difference with respect to the first stage 1301A in the optical-axis direction and is contiguous with the side plate 1302, and an inclined portion 1301C, which interconnects the first stage 1301A and the second stage 1301B.

The second stage 1301B may be located at a lower position than the first stage 1301A. The inclined portion 1301C may include an inclined surface that is inclined at a predetermined angle with respect to the first stage 1301A or the second stage 1301B.

For example, the inclined portion 1301C may be formed in the shape of a ring or a cylinder that surrounds the first barrel portion 1110A and the second barrel portion 1110B of the lens barrel 1110, but the disclosure is not limited thereto.

The inclined portion 1301C of the cover 1300 and the inclined portions 1033A and 1033B of the lens barrel 1110 may face or overlap each other in the optical-axis direction.

In an example, the inclined portion 1301C of the cover 1300 and the inclined portions 1033A and 1033B of the lens barrel 1110 may be spaced apart from each other by a predetermined constant distance.

Since the upper plate of the cover 1300 has a two-stage structure having a height difference and the lens barrel 1110 is provided with the inclined portions 1033A and 1033B corresponding to the two-stage structure, the height of the edge portion of the camera module may be reduced, and thus the size of the camera module in the optical-axis direction may be reduced.

In an example, the inclined portions 1033A and 1033B may be disposed on the outer circumferential surface of the lens barrel 1110 at a position between the first barrel portion 1110A and the first body 1008A of the second barrel portion 1110B.

In an example, the lens barrel 1110 may include the first inclined portion 1033A, which is formed between the third side surface 52*c* of the first barrel portion 1110A and the outer side surface of the second barrel portion 1110B, and the second inclined portion 1033B, which is formed between the fourth side surface 52*d* of the first barrel portion 1110A and the outer side surface of the second barrel portion 1110B.

The first inclined portion 1033A may include a first inclined surface, and the second inclined portion 1033B may include a second inclined surface. The included angle θ1 between the first inclined surface and the upper surface of the first barrel portion 1110A may be an obtuse angle, and the included angle θ2 between the second inclined surface and the upper surface of the first barrel portion 1110A may be an obtuse angle.

The second body 1008B of the second barrel portion 11101B may be formed in a cylindrical shape, but the disclosure is not limited thereto. The second body of the second barrel portion may be formed in any of various shapes.

The second barrel portion 1110B may have an accommodation space formed therein to accommodate the second lens unit 1112, and the third barrel portion 1110C may have an accommodation space formed therein to accommodate the third lens unit 1113.

The inside of the first barrel portion 1110A, the inside of the second barrel portion 1110B, and the inside of the third barrel portion 1110C may communicate with one another.

The second barrel portion 1110B may have an opening formed therein to expose at least a portion of the second lens unit 1112, for example an uppermost lens, therethrough.

In addition, in order to inhibit deterioration in the performance of the liquid lens 1050 due to a decrease in the temperature of the liquid lens 1050, the liquid lens 1050 may include a heater for controlling the temperature of the liquid lens 1050.

Figure 37A:
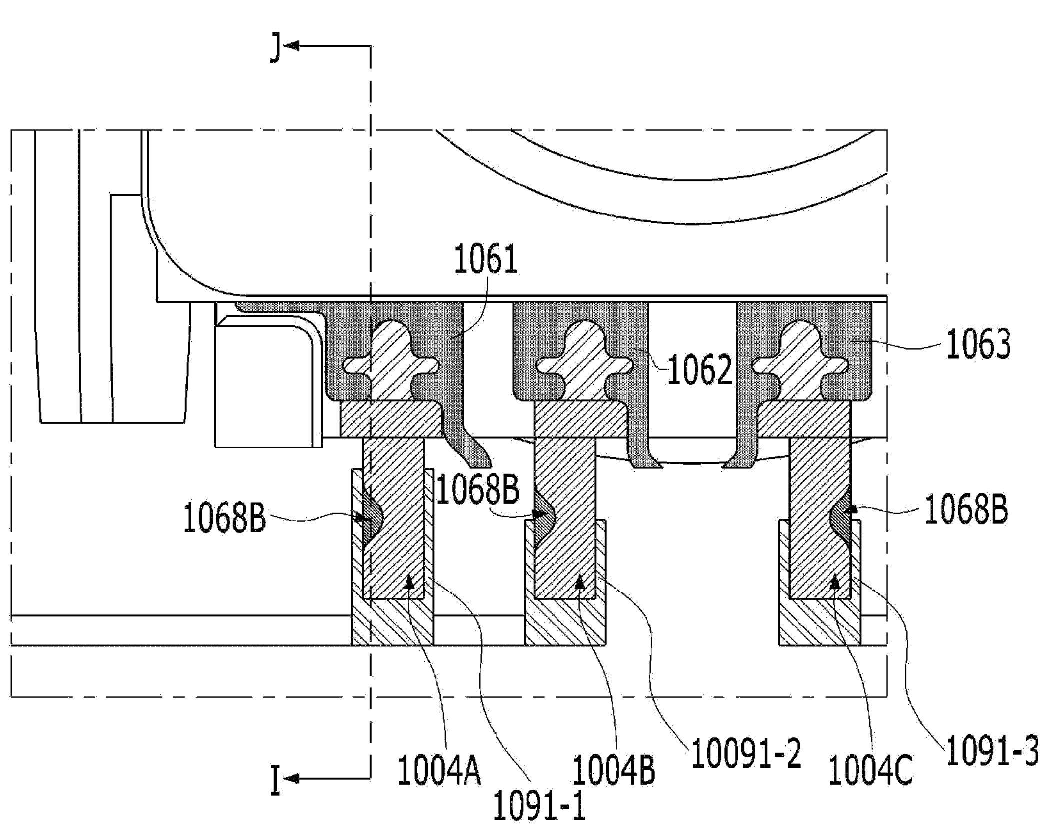
FIG. 37A is a top view of a first conductive portion, a 1-1st terminal, and a conductive adhesive member.
Figure 37B:
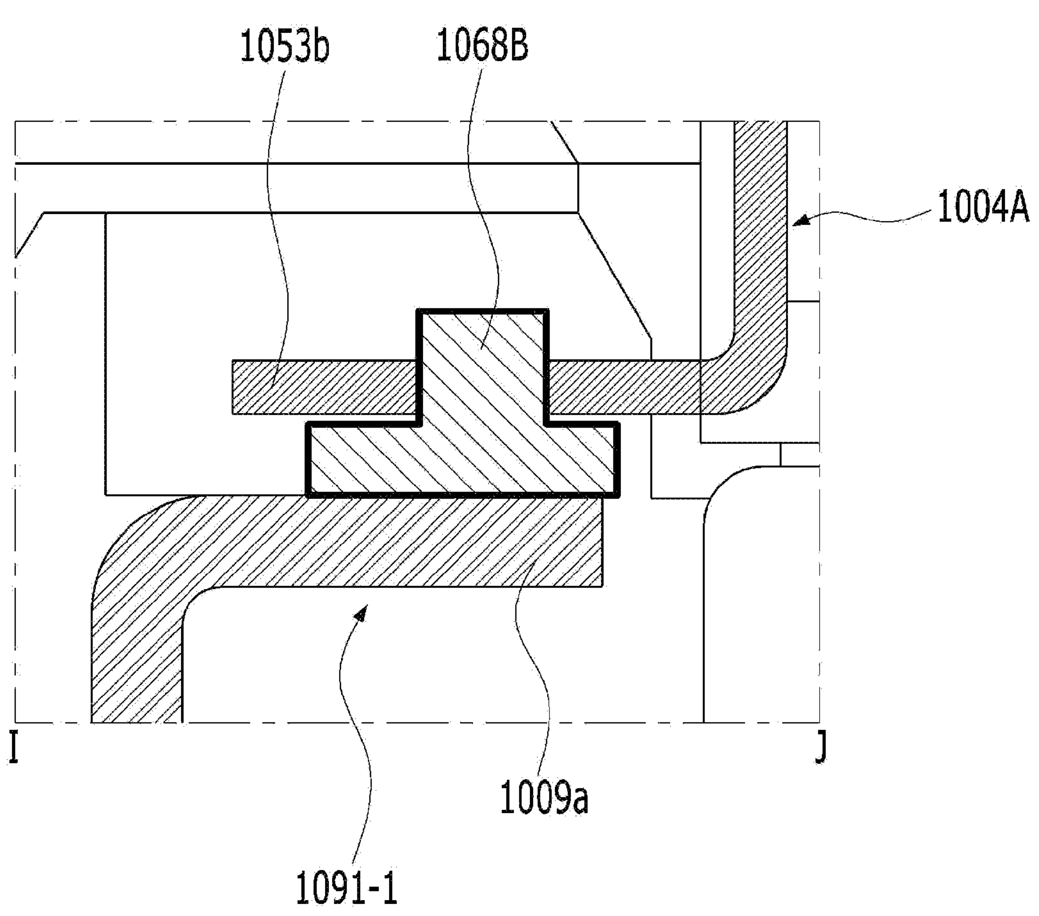
FIG. 37B is a cross-sectional view taken along line IJ in the first conductive portion, the 1-1st terminal, and the conductive adhesive member in FIG. 37A.

FIG. 37A is a top view of the first conductive portion 1091-1, the 1-1$^{st}$ terminal 1004A, and the conductive adhesive member 1068B, and FIG. 37B is a cross-sectional view taken along line IJ in the first conductive portion 1091-1, the 1-1$^{st}$ terminal 1004A, and the conductive adhesive member 1068B in FIG. 37A.

Referring to FIGS. 37A and 37B, the upper surface of the first portion 1009*a* of the first conductive portion 1091-1 and the lower surface of the second portion 1053*b* of the 1-1$^{st}$ terminal 1004A may be coupled to each other by means of the conductive adhesive member 1068B disposed therebetween. The conductive adhesive member 1068B may smoothly flow to the upper surface of the second portion 1053*b* of the 1-1$^{st}$ terminal 1004A along the recess 1053B formed in the second portion 1053*b* of the 1-1$^{st}$ terminal 1004A, and a portion of the conductive adhesive member 1068B may be disposed on the upper surface of the second portion 1053*b* of the 1-1$^{st}$ terminal 1004A.

Accordingly, the contact area between the conductive adhesive member 1068B, the second portion 1053*b* of the 1-1$^{st}$ terminal 1004A, and the first portion 1009*a* of the first conductive portion 1091-1 may be increased, whereby the bonding strength therebetween may be increased, the reliability of the conductive connection therebetween may be improved, and it is possible to ensure stable resistance between the first terminal unit and the conductive portion.

The recess 1054B may also be formed in the second portion 1054$b$ of the 1-2$^{nd}$ terminal unit 1004G, and the description made with reference to FIGS. 37A and 37B may also apply to the 1-2$^{nd}$ terminal unit 1004G and the fifth conductive portion 1091-5.

Figure 38:
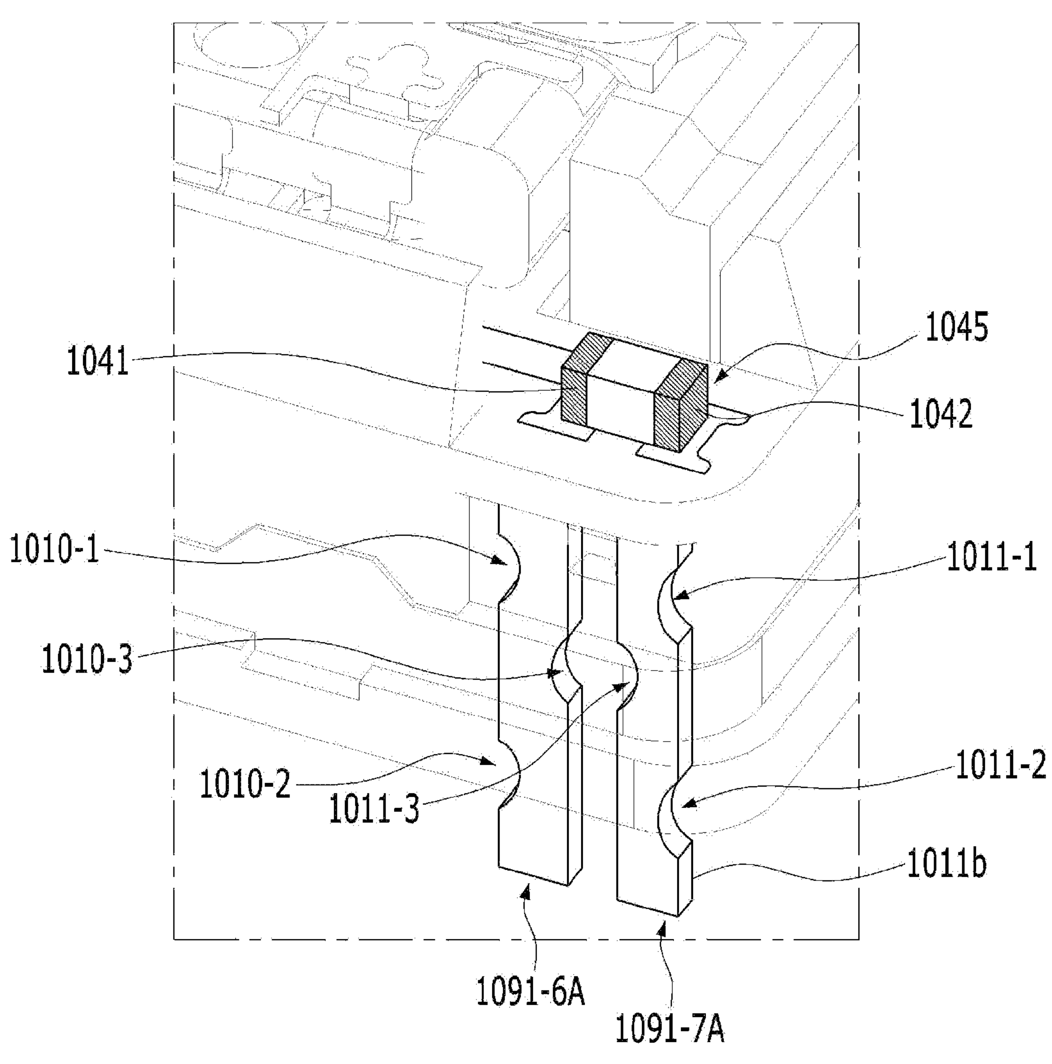
FIG. 38 illustrates second portions of sixth and seventh conductive portions according to another embodiment.
Figure 39:
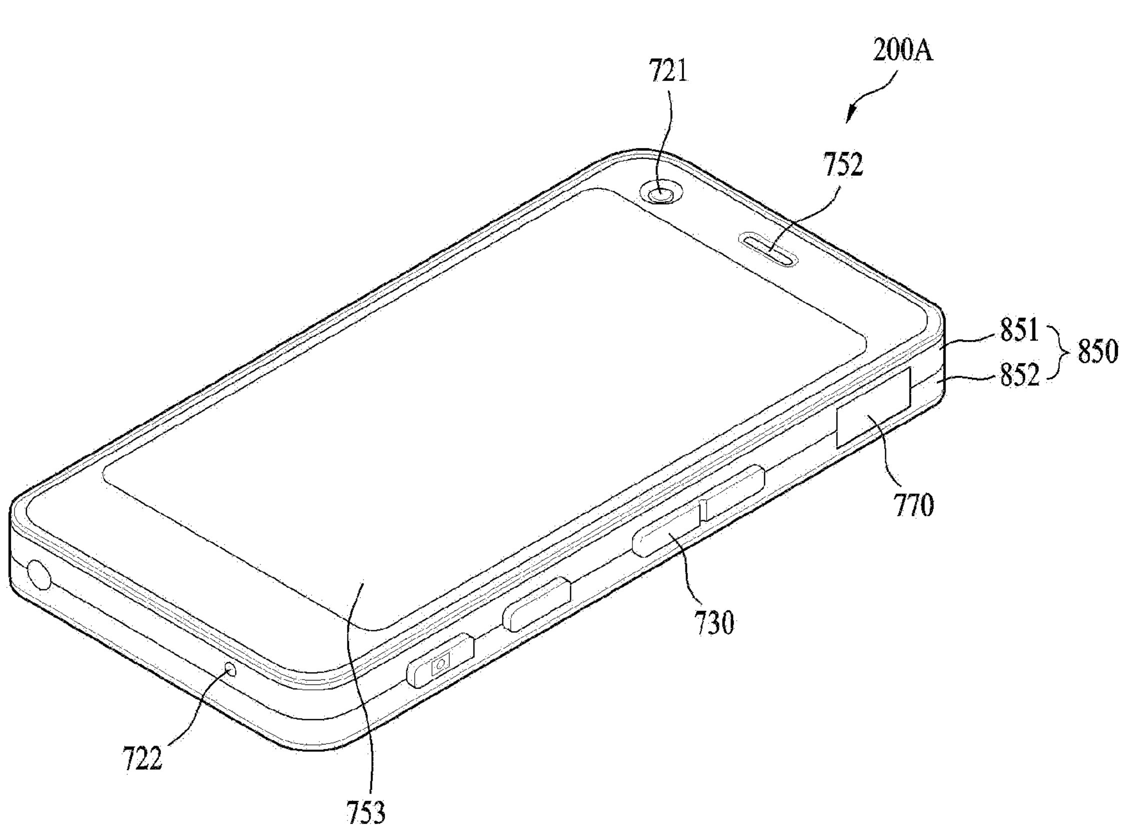
FIG. 39 is a perspective view of a portable terminal according to an embodiment.
Figure 40:
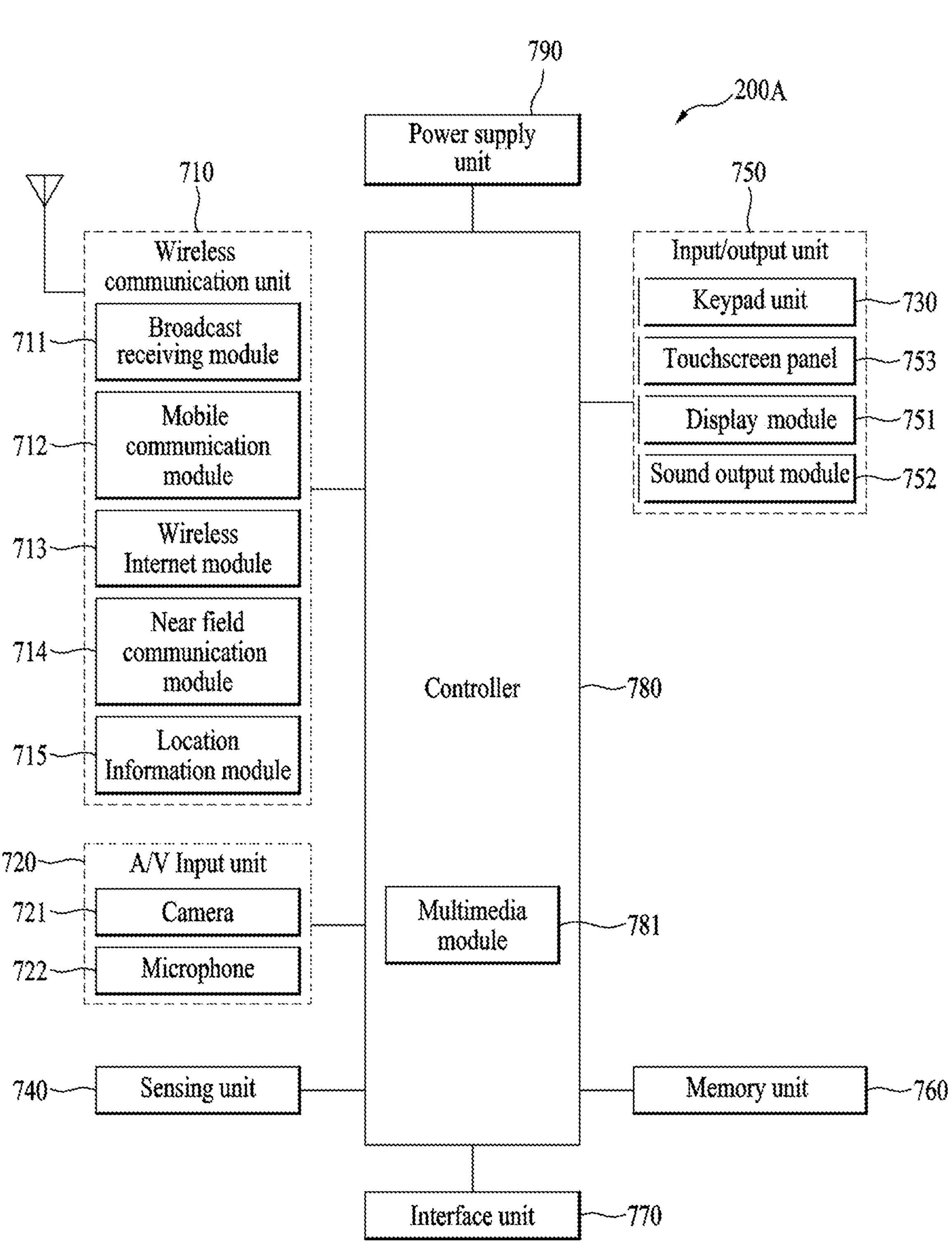
FIG. 40 is a configuration diagram of the portable terminal shown in FIG. 39.

FIG. 38 illustrates second portions 1010$b$ and 1011$b$ of sixth and seventh conductive portions 1091-6 and 1091-7 according to another embodiment.

Referring to FIG. 38, the second portion 1010$b$ of the sixth conductive portion 1091-6 may have formed therein a plurality of first recesses 1010-1 to 1010-3, which are spaced apart from each other, and the second portion 1011$b$ of the sixth conductive portion 1091-6 may have formed therein a plurality of second recesses 1011-1 to 1011-3, which are spaced apart from each other.

The first recesses 1010-1 to 1010-3 may be formed in a first side surface and a second side surface of the second portion 1010$b$. In an example, the first recesses 1010-1 to 1010-3 may be alternately disposed or arranged on the first side surface and the second side surface of the second portion 1010$b$ in the direction from the upper end of the second portion 1010$b$ toward the lower end thereof.

The first recesses 1010-1 to 1010-3 may be formed in a first side surface and a second side surface of the second portion 11$b$. In an example, the second recesses 1011-1 to 1011-3 may be alternately disposed or arranged on the first side surface and the second side surface of the second portion 1011$b$ in the direction from the upper end of the second portion 1011$b$ toward the lower end thereof. Accordingly, it is possible to increase the heat dissipation area of the second portions 1010$b$ and 1011$b$ and to inhibit the rigidity or strength of the second portions 1010$b$ and 1011$b$ from being reduced.

With regard to the thermistor 1045 and the sixth and seventh conductive portions 1091-6 and 1091-7 & 1091-6A and 1091-7A shown in FIGS. 36B and 38, reference may be made to the description of the embodiments in FIGS. 1 to 17.

In addition, the camera module 100 according to the embodiment may be included in an optical instrument for the purpose of forming an image of an object present in a space using reflection, refraction, absorption, interference, and diffraction, which are characteristics of light, for the purpose of increasing visibility, for the purpose of recording and reproduction of an image using a lens, or for the purpose of optical measurement or image propagation or transmission.

For example, the optical device according to the embodiment may be a cellular phone, a mobile phone, a smartphone, a portable smart device, a digital camera, a laptop computer, a digital broadcasting terminal, a personal digital assistant (PDA), a portable multimedia player (PMP), a navigation device, etc., without being limited thereto, and may also be any of devices for capturing images or pictures.

FIG. 41 is a perspective view of a portable terminal 200A according to an embodiment, and FIG. 42 is a configuration diagram of the portable terminal 200A shown in FIG. 41.

Referring to FIGS. 41 and 42, the portable terminal 200A (hereinafter referred to as a "terminal") may include a body 850, a wireless communication unit 710, an A/V input unit 720, a sensor 740, an input/output unit 750, a memory 760, an interface 770, a controller 780, and a power supply unit 790.

The body 850 shown in FIG. 41 may have a bar shape, without being limited thereto, and may be any of various types such as, for example, a slide type, a folder type, a swing type, or a swivel type, in which two or more sub-bodies are coupled so as to be movable relative to each other.

The body 850 may include a case (a casing, a housing, a cover, or the like) defining the external appearance thereof. In an example, the body 850 may be divided into a front case 851 and a rear case 852. A variety of electronic components of the terminal may be mounted in the space formed between the front case 851 and the rear case 852.

The wireless communication unit 710 may include one or more modules, which enable wireless communication between the terminal 200A and a wireless communication system or between the terminal 200A and a network in which the terminal 200A is located. In an example, the wireless communication unit 710 may include a broadcast reception module 711, a mobile communication module 712, a wireless Internet module 713, a nearfield communication module 714, and a location information module 715.

The audio/video (A/V) input unit 720 serves to input audio signals or video signals, and may include a camera 721 and a microphone 722.

The camera 721 may include the camera module 100.

The sensor 740 may sense the current state of the terminal 200A, such as the open or closed state of the terminal 200A, the position of the terminal 200A, the presence or absence of a user's touch, the orientation of the terminal 200A, or the acceleration/deceleration of the terminal 200A, and may generate a sensing signal to control the operation of the terminal 200A. For example, when the terminal 200A is a slide-type phone, whether the slide-type phone is open or closed may be detected. In addition, the sensor 740 serves to sense whether power is supplied from the power supply unit 790 or whether the interface 770 is coupled to an external device.

The input/output unit 750 serves to generate visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals. In an example, the display module 751 may include at least one of a liquid crystal display, a thin-film transistor liquid crystal display, an organic light-emitting diode, a flexible display, or a 3D display.

The sound output module 752 may output audio data received from the wireless communication unit 710 in a call-signal reception mode, a call mode, a recording mode, a voice recognition mode, or a broadcast reception mode, or may output audio data stored in the memory 760.

The touchscreen panel 753 may convert variation in capacitance, caused by a user's touch on a specific region of a touchscreen, into electrical input signals.

The memory 760 may store programs for the processing and control of the controller 780, and may temporarily store input/output data (e.g. a phone book, messages, audio, still images, pictures, and moving images). For example, the memory 760 may store images captured by the camera 721, for example, pictures or moving images.

The interface 770 serves as a passage for connection between the terminal 200A and an external device. The interface 770 may receive data or power from the external device, and may transmit the same to respective components inside the terminal 200A, or may transmit data inside the terminal 200A to the external device. For example, the interface 770 may include a wired/wireless headset port, an external charger port, a wired/wireless data port, a memory card port, a port for connection of a device having an identification module, an audio input/output (I/O) port, a video input/output (I/O) port, and an earphone port.

The controller 780 may control the overall operation of the terminal 200A. For example, the controller 780 may perform control and processing related to voice calls, data communication, and video calls.

The controller 780 may include a multimedia module 781 for multimedia playback. The multimedia module 781 may be provided inside the controller 180, or may be provided separately from the controller 780.

The controller 780 may perform pattern recognition processing, by which writing or drawing input to the touch-screen is perceived as characters or images.

The power supply unit 790 may supply power required to operate the respective components upon receiving external power or internal power under the control of the controller 780.

The features, structures, effects, and the like described above in the embodiments are included in at least one embodiment of the present disclosure, but are not necessarily limited to only one embodiment.

Furthermore, the features, structures, effects, and the like exemplified in the respective embodiments may be combined with other embodiments or modified by those skilled in the art. Therefore, content related to such combinations and modifications should be construed as falling within the scope of the present disclosure.

INDUSTRIAL APPLICABILITY

Embodiments may be used for a camera module capable of improving the reliability of a conductive connection between a terminal unit and an electrode of a liquid lens and for an optical device including the same.

The invention claimed is:

1. A camera module comprising:

a substrate;

a lens barrel disposed on the substrate; and a lens unit disposed on the lens barrel, wherein the lens unit comprises a liquid lens unit, wherein the liquid lens unit comprises:

a holder;

a liquid lens disposed in the holder and comprising an electrode; and a terminal unit disposed on the holder and conductively connected to the liquid lens, wherein the terminal unit comprises:

a first portion coupled to the electrode of the liquid lens;

a second portion disposed on the holder; and a third portion comprising a first connection region connected to the first portion and a second connection region connected to the second portion, wherein the third portion comprises a first extension part extending in a first horizontal direction from the first connection region, a second extension part bent from the first extension part and extending in a second horizontal direction, and a third extension part bent from the second extension part and extending in the first horizontal direction toward the second connection region, wherein the third portion has a width smaller than a width of the first portion, and wherein the first connection region and first extension part are located to a left side of a reference line and the second connection region and third extension part are located to a right side of the reference line, and the first connection region and the first extension part and the second connection region and the third extension part are spaced apart from the reference line and not overlapped with the reference line when viewed from above, and the reference line is a straight line that passes through a center of the first portion and a center of the second extension part and is in parallel to a direction extending from the first portion toward the second portion.

2. The camera module according to claim 1, comprising: a conductive adhesive member disposed between the first portion and the electrode of the liquid lens.

3. The camera module according to claim 1, wherein the third portion of the terminal unit comprises at least one curved portion or bent portion.

4. The camera module according to claim 1, wherein the third portion of the terminal unit comprises portions having different widths.

5. The camera module according to claim 1, wherein one end of the third portion, connected to the first portion of the terminal unit, has a width smaller than a width of another end of the third portion, connected to the second portion of the terminal unit.

6. The camera module according to claim 1, wherein the first and second connection regions of the third portion of the terminal unit are not overlapped with the reference line.

7. The camera module according to claim 1, wherein the third portion comprises a portion increasing in width and a portion decreasing in width in a direction from the first connection region toward the second connection region.

8. The camera module according to claim 1, wherein the width of the third portion is 1.25 to 1.5 times a thickness of the third portion.

9. The camera module according to claim 1, wherein the width of the third portion is less than a length of the third portion measured from the first connection region of the third portion, connected to the first portion, to the second connection region of the third portion, connected to the second portion.

10. The camera module according to claim 1, comprising a lens holder disposed on the substrate and coupled to the lens barrel.

11. The camera module according to claim 10, comprising a sensor base disposed between the lens holder and the substrate.

12. The camera module according to claim 10, wherein one end of the second portion of the terminal unit protrudes from a side surface of the holder.

13. The camera module according to claim 12, comprising a conductive member disposed on the lens holder, and wherein the one end of the second portion of the terminal unit is conductively connected to the conductive member.

14. A camera module comprising:

a substrate;

a lens barrel disposed on the substrate; and a lens unit disposed on the lens barrel, wherein the lens unit comprises a liquid lens unit, wherein the liquid lens unit comprises:

a holder;

a liquid lens disposed in the holder and comprising an electrode; and a terminal unit disposed on the holder and conductively connected to the liquid lens, wherein the terminal unit comprises a first portion coupled to the electrode of the liquid lens, a second portion disposed on the holder, and a third portion comprising a first connection region connected to the first portion and a second connection region connected to the second portion, wherein the third portion comprises a first extension part extending in a first horizontal direction from the first connection region, a second extension part bent from the first extension part and extending in a second horizontal direction, and a third extension part bent from the second extension part and extending in the first horizontal direction toward the second connection region, and wherein the first connection region and first extension part are located to a left side of a reference line and the second connection region and third extension part are located to a right side of the reference line, and the first connection region and the first extension part and the second connection region and the third extension part are spaced apart from the reference line and not overlapped with the reference line when viewed from above, and the reference line is a straight line that passes through a center of the first portion and a center of the second extension part, and is in parallel to a direction extending from the first portion toward the second portion.

15. The camera module according to claim 14, wherein the at least one curved portion has a width smaller than a width of the first portion.

16. The camera module according to claim 14, comprising a conductive adhesive member disposed between the first portion and the electrode of the liquid lens.

17. The camera module according to claim 14, comprising:

a lens holder disposed on the substrate and coupled to the lens barrel; and a sensor base disposed between the lens holder and the substrate.

18. The camera module according to claim 17, comprising a conductive member disposed on the lens holder, and wherein one end of the second portion of the terminal unit is conductively connected to the conductive member.

19. A camera module comprising:

a substrate;

a lens holder disposed on the substrate;

a lens barrel coupled to the lens holder;

a holder disposed on the lens barrel;

a liquid lens disposed in the holder and comprising an electrode;

a first conductive portion disposed on the lens holder;

a first terminal unit disposed on the holder and coupled to the first conductive portion; and a second terminal unit connecting the first terminal unit to the electrode of the liquid lens, wherein the second terminal unit comprises a first portion coupled to the electrode of the liquid lens, a second portion coupled to the first terminal unit, and a third portion comprising a first connection region connected to the first portion and a second connection region connected to the second portion, wherein the third portion comprises a first extension part extending in a first horizontal direction from the first connection region, a second extension part bent from the first extension part and extending in a second horizontal direction, and a third extension part bent from the second extension part and extending in the first horizontal direction toward the second connection region, and wherein the first connection region and first extension part are located to a left side of a reference line and the second connection region and third extension part are located to a right side of the reference line, and the first connection region and the first extension part and the second connection region and the third extension part are spaced apart from the reference line and not overlapped with the reference line when viewed from above, and the reference line is a straight line that passes through a center of the first portion and a center of the second extension part, and is in parallel to a direction extending from the first portion toward the second portion.

* * * * *